United States Patent
Judd et al.

(10) Patent No.: US 8,630,581 B2
(45) Date of Patent: *Jan. 14, 2014

(54) REPEATERS FOR WIRELESS COMMUNICATION SYSTEMS

(71) Applicant: Andrew LLC, Hickory, NC (US)

(72) Inventors: Mano D. Judd, Rockwall, TX (US); Breck W. Lovinggood, Garland, TX (US); David T. Tennant, Flossmoor, IL (US); Gregory A. Maca, Lynchburg, VA (US); William P. Kuiper, Lucas, TX (US); James L. Alford, Somerset, NJ (US); Michael D. Thomas, Rolling Hills Estates, CA (US); Jonathan C. Veihl, New Lenox, IL (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,540

(22) Filed: Jan. 18, 2013

(65) Prior Publication Data

US 2013/0130620 A1 May 23, 2013

Related U.S. Application Data

(63) Continuation of application No. 13/220,541, filed on Aug. 29, 2011, now Pat. No. 8,358,970, which is a
(Continued)

(51) Int. Cl.
*H04B 7/14* (2006.01)
(52) U.S. Cl.
USPC ......... 455/24; 455/11.1; 455/63.1; 455/278.1

(58) Field of Classification Search
USPC .......... 455/11.1, 24, 63.1, 562.1, 276.1, 63.2, 455/63.3, 63.4, 67.11, 67.13, 277.1, 22, 455/278.1
See application file for complete search history.

(56) References Cited

U.S. PATENT DOCUMENTS 2,866,194 A 12/1958 Stassis
3,728,733 A 4/1973 Robinson
(Continued)

FOREIGN PATENT DOCUMENTS

EP 0122143 A2 10/1984
EP 0559557 A1 9/1993
(Continued)

OTHER PUBLICATIONS

"An Introduction to SnapTrack™ Server-Aided GPS Technology" (11 pages); source: www.snaptrackinc.com.
(Continued)

*Primary Examiner* — John J Lee
(74) *Attorney, Agent, or Firm* — Wood, Herron & Evans, LLP

(57) ABSTRACT

A repeater and associated method of use includes at least one antenna element for communicating in one direction and at least one antenna element for communicating in another direction. A radio frequency uplink path and a radio frequency downlink path are coupled between the antennas. At least one of the radio frequency uplink path or the radio frequency downlink path includes an adaptive cancellation circuit. The adaptive cancellation circuit is configured to generate a cancellation signal without requiring an injected signal. The cancellation signal, when added to a radio frequency signal in the respective uplink and downlink paths, substantially reduces feedback signals present in the radio frequency signal.

16 Claims, 65 Drawing Sheets

Related U.S. Application Data

(63) continuation of application No. 12/538,508, filed on Aug. 10, 2009, now Pat. No. 8,010,042, which is a continuation of application No. 10/181,109, filed as application No. PCT/US01/01446 on Jan. 16, 2001, now Pat. No. 7,577,398, which is a continuation-in-part of application No. 09/694,225, filed on Oct. 23, 2000, now Pat. No. 6,934,511, which is a continuation-in-part of application No. 09/483,234, filed on Jan. 14, 2000, now Pat. No. 6,745,003, and a continuation-in-part of application No. 09/357,032, filed on Jul. 20, 1999, now Pat. No. 6,731,904, and a continuation-in-part of application No. 09/483,649, filed on Jan. 14, 2000, now abandoned, said application No. PCT/US01/01446 is a continuation-in-part of application No. 09/687,862, filed on Oct. 13, 2000, now abandoned, which is a continuation-in-part of application No. 09/438,649, filed on Feb. 25, 2000, now abandoned, said application No. PCT/US01/01446 is a continuation-in-part of application No. 09/513,543, filed on Feb. 25, 2000, now Pat. No. 7,068,973, and a continuation-in-part of application No. 09/506,245, filed on Feb. 17, 2000, now Pat. No. 6,445,904, and a continuation-in-part of application No. 09/483,649, filed on Jan. 14, 2000, and a continuation-in-part of application No. 09/483,234, filed on Jan. 14, 2000, now Pat. No. 6,745,003, which is a continuation-in-part of application No. 09/357,032, filed on Jul. 20, 1999, now Pat. No. 6,731,904.

(60) Provisional application No. 60/245,010, filed on Nov. 1, 2000.

(56) References Cited

U.S. PATENT DOCUMENTS

| | | |
|---|---|---|
| 3,731,315 A | 5/1973 | Sneleg |
| 3,917,998 A | 11/1975 | Welti |
| 4,032,922 A | 6/1977 | Provencher |
| 4,041,389 A | 8/1977 | Oades |
| 4,099,036 A | 7/1978 | Migeon |
| 4,124,852 A | 11/1978 | Steudel |
| 4,162,499 A | 7/1979 | Jones, Jr. et al. |
| 4,189,675 A | 2/1980 | Frosch et al. |
| 4,198,600 A | 4/1980 | Oguchi et al. |
| 4,246,585 A | 1/1981 | Mailloux |
| 4,301,533 A | 11/1981 | Acampora et al. |
| 4,317,217 A | 2/1982 | Davidson et al. |
| 4,318,104 A | 3/1982 | Enein |
| 4,338,605 A | 7/1982 | Mims |
| 4,352,202 A | 9/1982 | Carney |
| 4,360,813 A | 11/1982 | Fitzsimmons |
| 4,383,331 A * | 5/1983 | Davidson ................ 455/24 |
| 4,407,001 A | 9/1983 | Schmidt |
| 4,446,463 A | 5/1984 | Irzinski |
| 4,475,243 A * | 10/1984 | Batlivala et al. .............. 455/22 |
| 4,475,246 A | 10/1984 | Batlivala et al. |
| 4,527,163 A | 7/1985 | Stanton |
| 4,566,013 A | 1/1986 | Steinberg et al. |
| 4,570,165 A | 2/1986 | Tsurumaru et al. |
| 4,605,932 A | 8/1986 | Butscher et al. |
| 4,689,631 A | 8/1987 | Gans et al. |
| 4,701,935 A | 10/1987 | Namiki |
| 4,727,590 A | 2/1988 | Kawano et al. |
| 4,777,652 A | 10/1988 | Stolarczyk |
| 4,789,993 A | 12/1988 | Ryu |
| 4,825,172 A | 4/1989 | Thompson |
| 4,843,402 A | 6/1989 | Clement |
| 4,849,763 A | 7/1989 | DuFort |
| 4,849,963 A | 7/1989 | Kawano et al. |
| 4,879,711 A | 11/1989 | Rosen |
| 4,890,110 A | 12/1989 | Kuwahara |
| 4,963,879 A | 10/1990 | Lin |
| 4,972,346 A | 11/1990 | Kawano et al. |
| 4,973,971 A | 11/1990 | Sinsky et al. |
| 4,980,665 A | 12/1990 | Schotz |
| 4,980,692 A | 12/1990 | Rudish et al. |
| 4,983,988 A | 1/1991 | Franke |
| 4,994,813 A | 2/1991 | Shiramatsu et al. |
| 5,019,793 A | 5/1991 | McNab |
| 5,034,752 A | 7/1991 | Pourailly et al. |
| 5,054,120 A | 10/1991 | Ushiyama et al. |
| 5,086,302 A | 2/1992 | Miller |
| 5,089,823 A | 2/1992 | Vasile |
| 5,093,923 A | 3/1992 | Leslie |
| 5,105,199 A | 4/1992 | Ukmar |
| 5,115,514 A | 5/1992 | Leslie |
| 5,128,687 A | 7/1992 | Fay |
| 5,194,873 A | 3/1993 | Sickles, II |
| 5,230,800 A | 7/1993 | Nelson |
| 5,231,407 A | 7/1993 | McGirr et al. |
| 5,241,410 A | 8/1993 | Streck et al. |
| 5,243,354 A | 9/1993 | Stern et al. |
| 5,248,980 A | 9/1993 | Raguenet |
| 5,267,297 A | 11/1993 | Kawano et al. |
| 5,280,297 A | 1/1994 | Profera, Jr. |
| 5,280,472 A | 1/1994 | Gilhousen et al. |
| 5,291,211 A | 3/1994 | Tropper |
| 5,321,412 A | 6/1994 | Kopp et al. |
| 5,327,150 A | 7/1994 | Cherrette |
| 5,345,247 A | 9/1994 | Aldama et al. |
| 5,345,600 A | 9/1994 | Davidson |
| 5,349,694 A | 9/1994 | Kawano et al. |
| 5,351,060 A | 9/1994 | Bayne |
| 5,379,455 A | 1/1995 | Koschek |
| 5,392,054 A | 2/1995 | Bottomley et al. |
| 5,444,864 A | 8/1995 | Smith |
| 5,463,401 A | 10/1995 | Iwasaki |
| 5,485,170 A | 1/1996 | McCarrick |
| 5,486,835 A | 1/1996 | Hock |
| 5,512,906 A | 4/1996 | Speciale |
| 5,513,176 A | 4/1996 | Dean et al. |
| 5,548,837 A | 8/1996 | Hess et al. |
| 5,552,798 A | 9/1996 | Dietrich et al. |
| 5,587,715 A | 12/1996 | Lewis |
| 5,589,843 A | 12/1996 | Meredith et al. |
| 5,596,329 A | 1/1997 | Searle et al. |
| 5,600,333 A | 2/1997 | Justice et al. |
| 5,604,462 A | 2/1997 | Gans et al. |
| 5,610,617 A | 3/1997 | Gans et al. |
| 5,619,210 A | 4/1997 | Dent |
| 5,628,049 A | 5/1997 | Suemitsu |
| 5,633,647 A | 5/1997 | Tines |
| 5,633,736 A | 5/1997 | Griffith et al. |
| 5,644,622 A | 7/1997 | Russell et al. |
| 5,646,631 A | 7/1997 | Arntz |
| 5,652,578 A | 7/1997 | Snow |
| 5,663,736 A | 9/1997 | Webb et al. |
| 5,710,804 A | 1/1998 | Bhame et al. |
| 5,714,957 A | 2/1998 | Searle et al. |
| 5,751,250 A | 5/1998 | Arntz |
| 5,754,138 A | 5/1998 | Turcotte et al. |
| 5,754,139 A | 5/1998 | Turcotte et al. |
| 5,758,287 A | 5/1998 | Lee et al. |
| 5,767,807 A | 6/1998 | Pritchett |
| 5,770,970 A | 6/1998 | Ikeda et al. |
| 5,805,113 A | 9/1998 | Ogino et al. |
| 5,825,327 A | 10/1998 | Krasner |
| 5,831,574 A | 11/1998 | Krasner |
| 5,832,365 A | 11/1998 | Chen et al. |
| 5,835,848 A | 11/1998 | Bi et al. |
| 5,848,054 A | 12/1998 | Mosebrook et al. |
| 5,854,611 A | 12/1998 | Gans et al. |
| 5,856,804 A | 1/1999 | Turcotte et al. |
| 5,862,459 A | 1/1999 | Charas |
| 5,880,695 A | 3/1999 | Brown et al. |
| 5,930,293 A | 7/1999 | Light et al. |
| 5,930,694 A | 7/1999 | Shima |
| 5,937,332 A | 8/1999 | Karabinis |

(56) References Cited

U.S. PATENT DOCUMENTS

| | | |
|---|---|---|
| 5,943,618 A | 8/1999 | Jackson et al. |
| 5,963,847 A | 10/1999 | Ito et al. |
| 5,987,304 A | 11/1999 | Latt |
| 6,009,324 A | 12/1999 | Pravitz et al. |
| 6,029,048 A | 2/2000 | Treatch |
| 6,029,848 A | 2/2000 | Cha et al. |
| 6,043,790 A | 3/2000 | Derneryd et al. |
| 6,049,315 A | 4/2000 | Meyer |
| 6,052,558 A | 4/2000 | Cook et al. |
| 6,067,053 A | 5/2000 | Runyon et al. |
| 6,078,787 A | 6/2000 | Schefte et al. |
| 6,115,762 A | 9/2000 | Bell et al. |
| 6,125,109 A | 9/2000 | Fuerter |
| 6,128,471 A | 10/2000 | Quelch et al. |
| 6,128,557 A | 10/2000 | Fenton et al. |
| 6,133,868 A | 10/2000 | Butler et al. |
| 6,134,437 A | 10/2000 | Karabinis et al. |
| 6,141,335 A | 10/2000 | Kuwahara et al. |
| 6,156,344 A | 12/2000 | Kim et al. |
| 6,157,344 A | 12/2000 | Bateman et al. |
| 6,160,514 A | 12/2000 | Judd |
| 6,172,654 B1 | 1/2001 | Martek |
| 6,188,873 B1 | 2/2001 | Wickman et al. |
| 6,198,460 B1 | 3/2001 | Brankovic |
| 6,222,502 B1 | 4/2001 | Falbo et al. |
| 6,222,503 B1 | 4/2001 | Gietema et al. |
| 6,256,484 B1 | 7/2001 | Conner et al. |
| 6,285,878 B1 | 9/2001 | Lai |
| 6,348,986 B1 | 2/2002 | Doucet et al. |
| 6,445,904 B1 | 9/2002 | Lovinggood et al. |
| 6,448,930 B1 | 9/2002 | Judd |
| 6,483,471 B1 | 11/2002 | Petros |
| 6,731,904 B1 | 5/2004 | Judd |
| 6,745,003 B1 | 6/2004 | Maca et al. |
| 6,864,853 B2 | 3/2005 | Judd et al. |
| 6,934,511 B2 | 8/2005 | Lovinggood et al. |
| 7,068,973 B1 | 6/2006 | Lovinggood et al. |
| 7,577,398 B2 | 8/2009 | Judd et al. |
| 8,010,042 B2 | 8/2011 | Judd et al. |
| 8,358,970 B2 | 1/2013 | Judd et al. |
| 2003/0104781 A1 | 6/2003 | Son |

FOREIGN PATENT DOCUMENTS

| | | |
|---|---|---|
| EP | 0605182 A2 | 7/1994 |
| EP | 0936693 A1 | 8/1999 |
| GB | 2286749 A | 8/1995 |
| JP | 2000183797 A | 6/2000 |
| WO | 9534102 A1 | 12/1995 |
| WO | 9742720 A1 | 11/1997 |
| WO | 9809372 A1 | 3/1998 |
| WO | 9811626 A1 | 3/1998 |
| WO | 9839851 A1 | 9/1998 |
| WO | 9850981 A1 | 11/1998 |
| WO | 0152447 A2 | 7/2001 |

OTHER PUBLICATIONS

5-Page International Search Report from PCT/US2001/001446 (Published As WO2001/052447) mailed Jan. 25, 2002.

* cited by examiner

SIDE VIEW

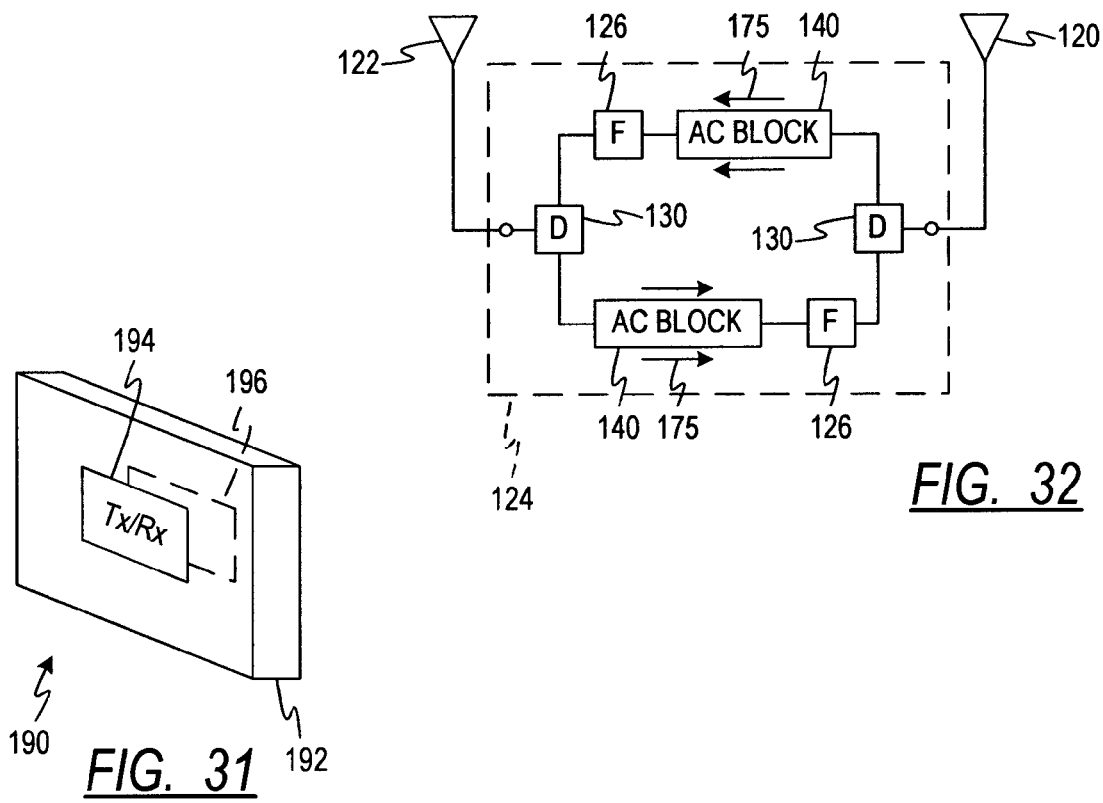
FIG. 31
FIG. 32
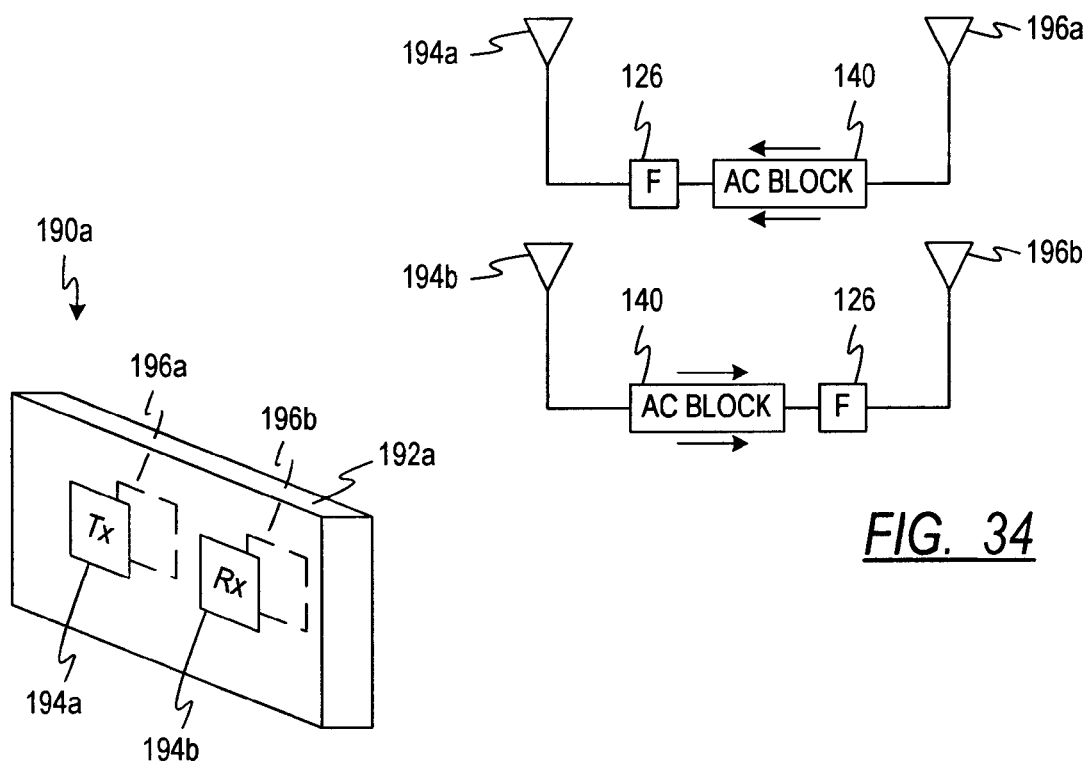
FIG. 33
FIG. 34

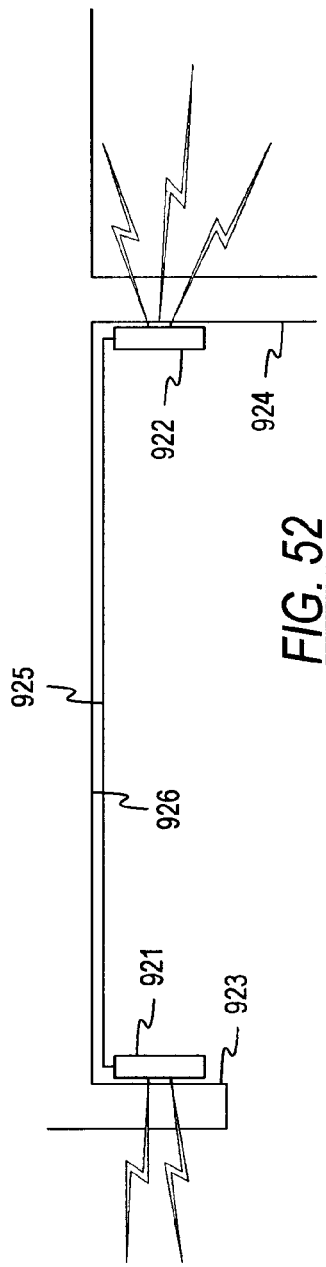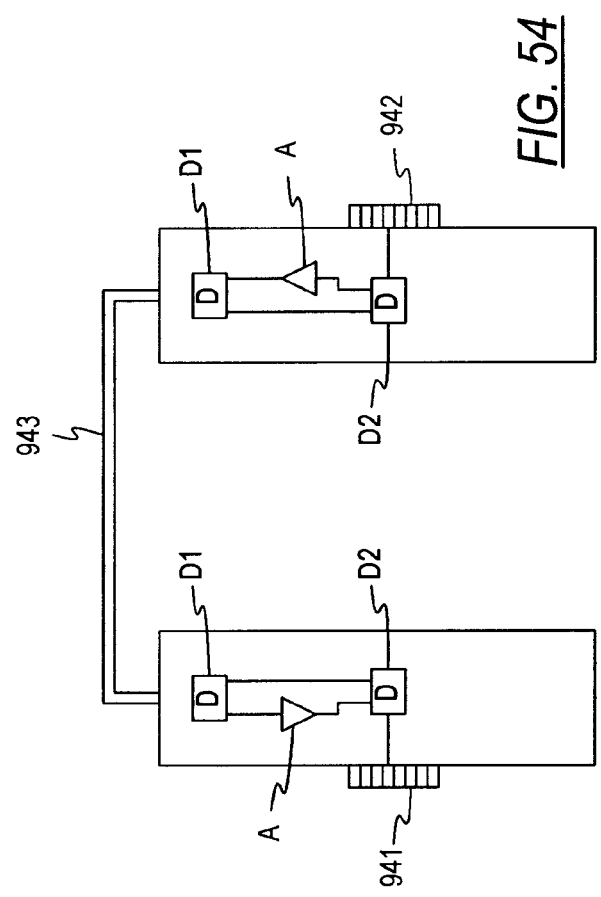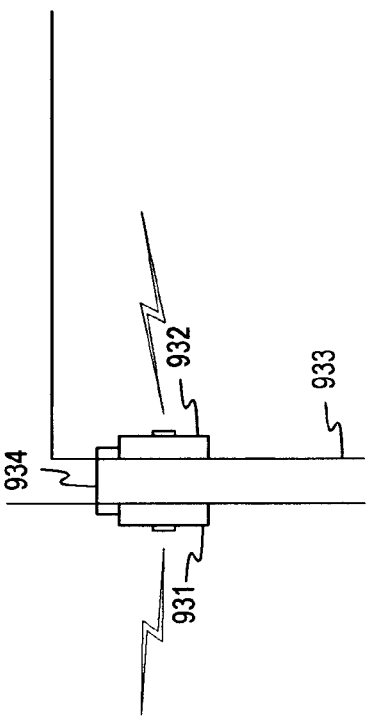

REPEATERS FOR WIRELESS COMMUNICATION SYSTEMS

CROSS-REFERENCE TO RELATED APPLICATIONS

This application is a continuation application of and claims the benefit of U.S. Ser. No. 13/220,541, filed Aug. 29, 2011, entitled "REPEATERS FOR WIRELESS COMMUNICATION SYSTEMS"; which application is a continuation application of and claims the benefit of U.S. Ser. No. 12/538,508, filed Aug. 10, 2009, entitled "REPEATERS FOR WIRELESS COMMUNICATION SYSTEMS", now Issued U.S. Pat. No. 8,010,042, issued Aug. 30, 2011; which patent is a continuation application and claims the benefit of U.S. Ser. No. 10/181,109, filed Sep. 10, 2003, entitled "REPEATERS FOR WIRELESS COMMUNICATION SYSTEMS", now issued U.S. Pat. No. 7,577,398, issued Aug. 18, 2009; which patent is the U.S. National Phase of PCT Application No. PCT/US01/01446, filed Jan. 16, 2001, entitled "REPEATERS FOR WIRELESS COMMUNICATION SYSTEMS"; which application is a PCT Application which claims the benefit of the following applications:

U.S. Provisional Ser. No. 60/245,010 filed Nov. 1, 2000,

U.S. Ser. No. 09/694,225 filed Oct. 23, 2000, now issued U.S. Pat. No. 6,934,511, issued Aug. 23, 2005, which patent is a continuation-in-part and claims the benefit of the following applications: U.S. Ser. No. 09/483,234 filed Jan. 14, 2000, now issued U.S. Pat. No. 6,745,003, issued Jun. 1, 2004; U.S. Ser. No. 09/357,032 filed Jul. 20, 1999, now issued U.S. Pat. No. 6,731,904, issued May 4, 2004; U.S. Ser. No. 09/483,649, filed Jan. 14, 2000, now abandoned.

U.S. Ser. No. 09/687,862 filed Oct. 13, 2000, now abandoned, which application is a continuation-in-part and claims the benefit of U.S. Ser. No. 09/483,649, filed Jan. 14, 2000, now abandoned;

U.S. Ser. No. 09/513,543 filed Feb. 25, 2000, now issued U.S. Pat. No. 7,068,973, issued Jun. 27, 2006;

U.S. Ser. No. 09/506,245 filed Feb. 17, 2000, now issued U.S. Pat. No. 6,445,904, issued Sep. 3, 2002;

U.S. Ser. No. 09/483,649 filed Jan. 14, 2000, now abandoned;

U.S. Ser. No. 09/483,234 filed Jan. 14, 2000, now issued U.S. Pat. No. 6,745,003, issued Jun. 1, 2004, which patent is a continuation-in-part and claims the benefit of U.S. Ser. No. 09/357,032 filed Jul. 20, 1999, now issued U.S. Pat. No. 6,731,904, issued May 4, 2004;

the applications and patents being incorporated by reference herein in their entireties.

FIELD OF THE INVENTION

The invention relates generally to repeaters for use in wireless communication systems.

SUMMARY OF THE INVENTION

The present invention provides a flat-panel repeater system having a housing having a pair of oppositely facing surfaces, at least one antenna element mounted to each of the surfaces for radiating energy in a direction opposite to that of an antenna element mounted to the other of the surfaces, and an electronic circuit mounted within the housing and operatively coupling signals between at least one antenna element on each of the oppositely facing surfaces of the module.

One preferred embodiment of the invention improves isolation between the antennas on opposite sides of the flat-panel repeater by use of adaptive cancellation which removes a significant portion (between 10 dB and 40 dB) of the feedback signal power, therefore increasing the total system isolation by the same amount (10 to 40 dB). This additional isolation can be used to achieve greater system gain, and therefore significantly extend the range of the system. The cancellation scheme uses digitally processed information to generate a signal, which, when added to the original input signal, cancels the feedback signal. This is especially useful in a side-side repeater.

In one particular embodiment of the invention having a base-station-facing antenna mounted on one of the opposing sides of the housing and a mobile-facing antenna mounted on the other of the opposing sides of the housing, the two antennas each comprise an array of antenna elements, and a beam-forming arrangement creates a desired antenna pattern of the base-station-facing antenna relative to a base station and a desired antenna pattern of the mobile-facing antenna relative to subscriber equipment.

In a further aspect of the invention, the problem of equal gain combining with a mobile signal source is overcome by the use of polarization diversity in a repeater. The vertical and horizontal field components in a communications link are highly uncorrelated, and thus by using receive antennas that have the same phase center and orthogonal polarizations, the problem of location-induced phase variation is eliminated. Therefore, an equal gain combiner can be utilized that has a fixed phase adjustment dependent only on the fixed phase differences of the repeater equipment, and not upon the changing location of the mobile signal source.

The invention provides a repeater diversity system comprising a main null antenna having a given phase center and polarization for receiving a communications signal from a remote signal source, a donor antenna for transmitting a signal to a base station, a diversity null antenna having the same phase center as the main null antenna and a polarization orthogonal to the polarization of the main null antenna, a combining network coupled to the main null antenna and the diversity null antenna for combining the signals therefrom, and an uplink channel module coupled with the combining network for delivering diversity combined receive signals to the donor antenna.

Another aspect of the invention uses simple RF electronics, and Butler matrix technology, to provide a mechanism to electronically steer an antenna beam toward the direction of the base station. A planar antenna, which may have a multiplicity of antenna elements, is used to generate a plurality of RF beams, via the RF Butler matrix. Each beam is presented to an RF switch. The controlled switch toggles each beam, and the best beam is selected for RF input/output port(s). Additionally, the use of this antenna results in a narrow beam that reduces view to interfering signals and therefore increases the carrier-to-interference (C/I) ratio of the system.

The invention provides a radio frequency switched beam planar antenna system comprising a support structure, a plurality of antenna elements mounted to the support structure, a Butler matrix mounted to the support member, the Butler matrix having a plurality of inputs coupled respectively with the antenna elements and a plurality of outputs, and a radio frequency switching circuit mounted to the support structure and operatively coupled with the outputs of the Butler matrix and having a control port responsive to a control signal for causing the switching circuit to select one of the outputs of the Butler matrix at a time.

The present invention also provides a system for re-transmitting a GPS signal or other received satellite signals inside a structure. The system receives the satellite signal, amplifies the received signal to produce a second satellite signal, and re-transmits the second signal inside the structure.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 23b is a diagrammatic illustration of a PCS converter used in the system of FIG. 23a;

FIGS. 31 and 33 show two examples of side-to-side repeaters;

FIGS. 32 and 34 show block diagrams of the side-to-side repeater systems of FIGS. 31 and 33, respectively, with the addition of adaptive cancellation;

FIG. 52 is a diagrammatic illustration of a modified in-building repeater system using physically separated antennas;

FIG. 54 is a diagrammatic illustration of another modified repeater using physically separated antennas;

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
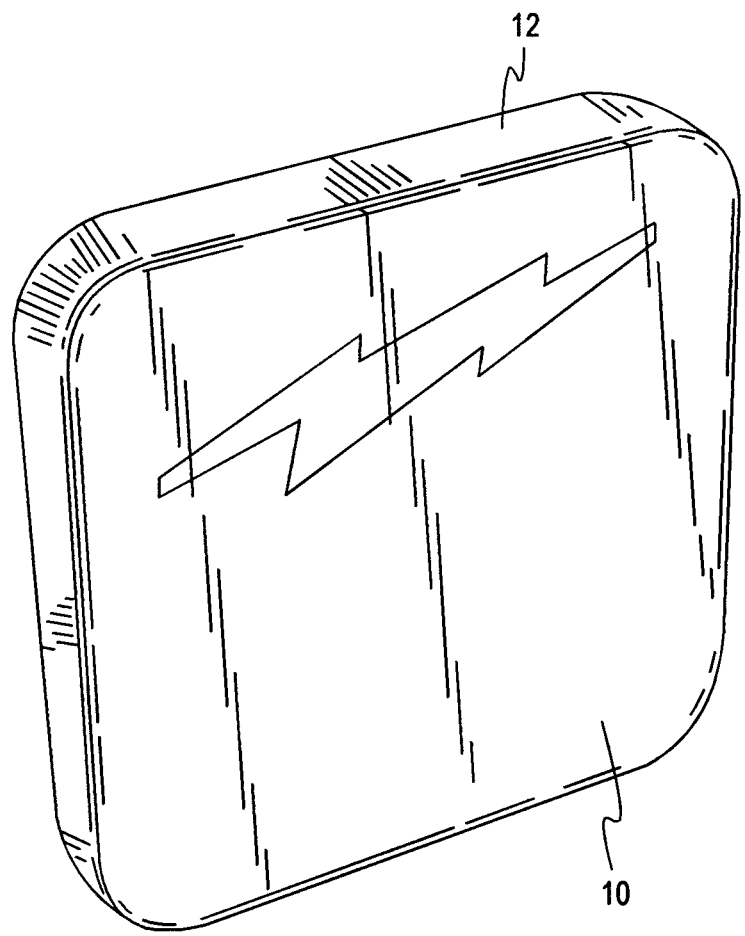
FIG. 1 is a perspective view of a flat-panel repeater embodying the invention.
Figure 2:
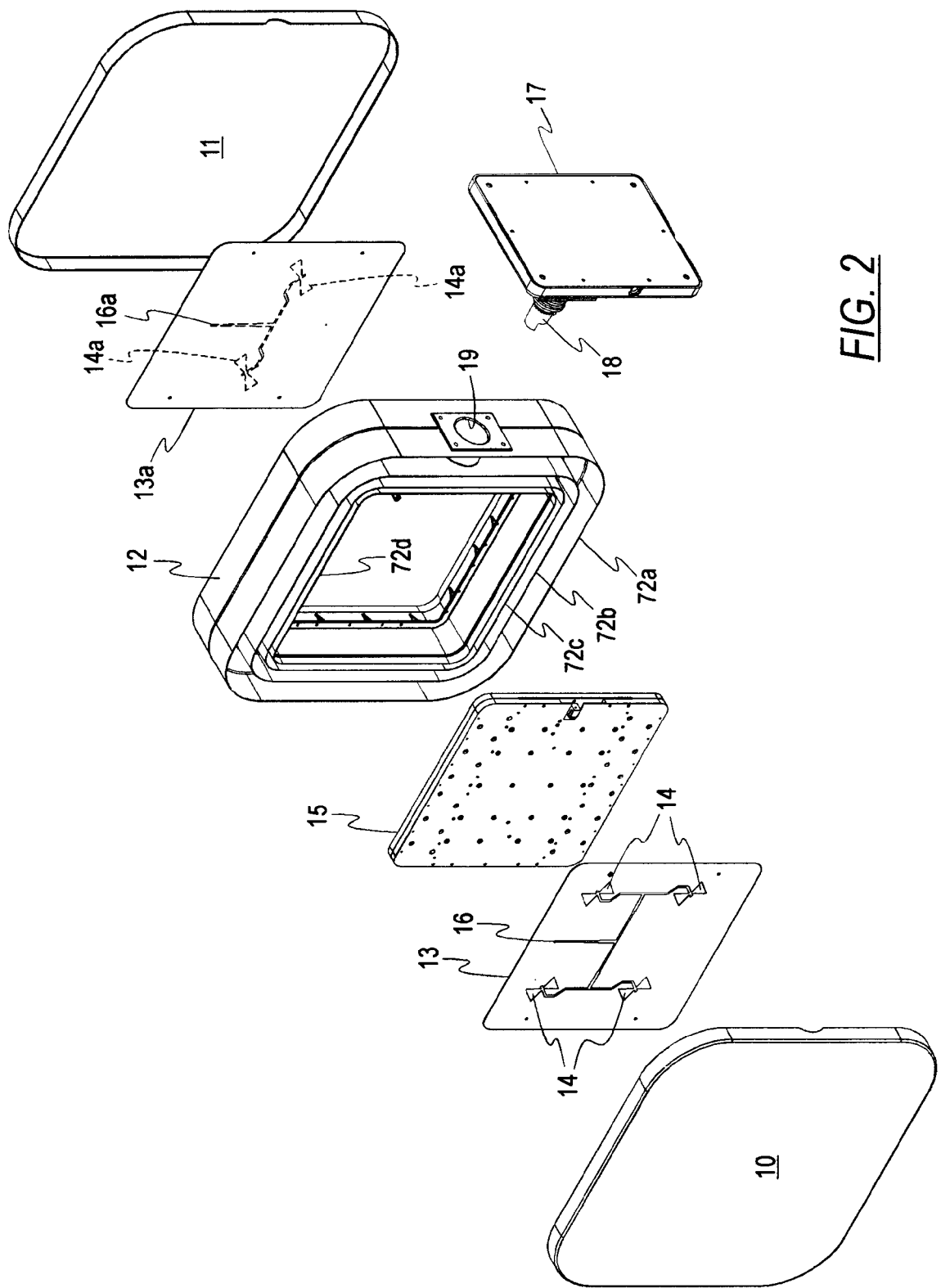
FIG. 2 is an exploded perspective view of the repeater of FIG. 1.

FIGS. 1 and 2 illustrate a preferred embodiment of a flat-panel repeater, having a pair of flanged radomes 10 and 11 on opposite sides of a choke frame 12. Adjacent the inside surface of the radome 10 is a dielectric sheet 13 carrying four printed dipoles 14 that form the mobile-facing antenna for the mobile side of the repeater. The electronics for connecting the antenna to the necessary diplexers, filters, and power amplifiers are contained within a metal housing 15, and the antenna sheet 13 is fastened to one side of the housing 15. The antenna feed 16 is connected directly to one of the diplexers in the electronic circuitry, which will be described in more detail below. The housing 15 is captured within the choke frame 12, which forms multiple, spaced, concentric fins 72a-72d for improving the side-to-side (antenna-to-antenna) isolation of the flat-panel repeater, thereby improving the gain performance or stability margin (the difference or safety margin between isolation and gain). The structure of the fins 72a-d will also be described in more detail below.

The antenna elements on the opposite side of the repeater are mounted adjacent the inside surface of the radome 11. Thus, a pair of dipoles 14a are printed on a dielectric sheet 13a to form the base-station-facing antenna for the base-station side of the repeater. The antenna feed 16a is connected directly to one of the diplexers in the electronic circuitry, as described in more detail below. The dielectric sheet 13a is fastened to the opposite side of the metal housing 15 from the sheet 13. As can be seen in FIG. 2, the dipoles 14 are orthogonal to the dipoles 14a to improve isolation between the two antennas.

To facilitate mounting of the repeater on a flat surface, a mounting bracket 17 has a stem 18 that fits into a socket 19 in the frame 12. The bracket 17 has several holes through it to receive screws for attaching the bracket 17 to the desired surface. Electrical power can also be supplied to the repeater through power supply lines (not shown) passing through the mounting bracket 17 and its stem 18 into the frame 12. The interface between the frame 12 and the bracket stem preferably allows rotation between the frame 12 and the mounting bracket 17 in successive angular increments, such as 5' increments, to facilitate precise positioning of the repeater. For example, the repeater might be rotated through successive increments while monitoring the strength of the received and/or transmitted signals, to determine the optimum orientation of the repeater, e.g., in alignment with a broadcast antenna whose signals are to be amplified and re-broadcast. Conventional detents can be used to indicate the successive increments, and to hold the repeater at each incremental position until it is advanced to the next position.

As can be seen in FIG. 1, the flat-panel repeater comprises a closely spaced stacked array of planar components that form a compact unit that can be easily mounted with the antennas already aligned relative to each other. The height and width of the unit are a multiple of the thickness dimension, e.g., 7 to 8 times the thickness. The thickness dimension is preferably no greater than about six inches, and the greater of said height and width dimensions is preferably no greater than about two feet. It is particularly preferred that the thickness dimension be no greater than about three inches, and the greater of said height and width dimensions no greater than about 1.5 feet. Most preferably, the thickness dimension is no greater than about two inches, and the greater of the height and width dimensions is no greater than about one foot.

Figure 3:
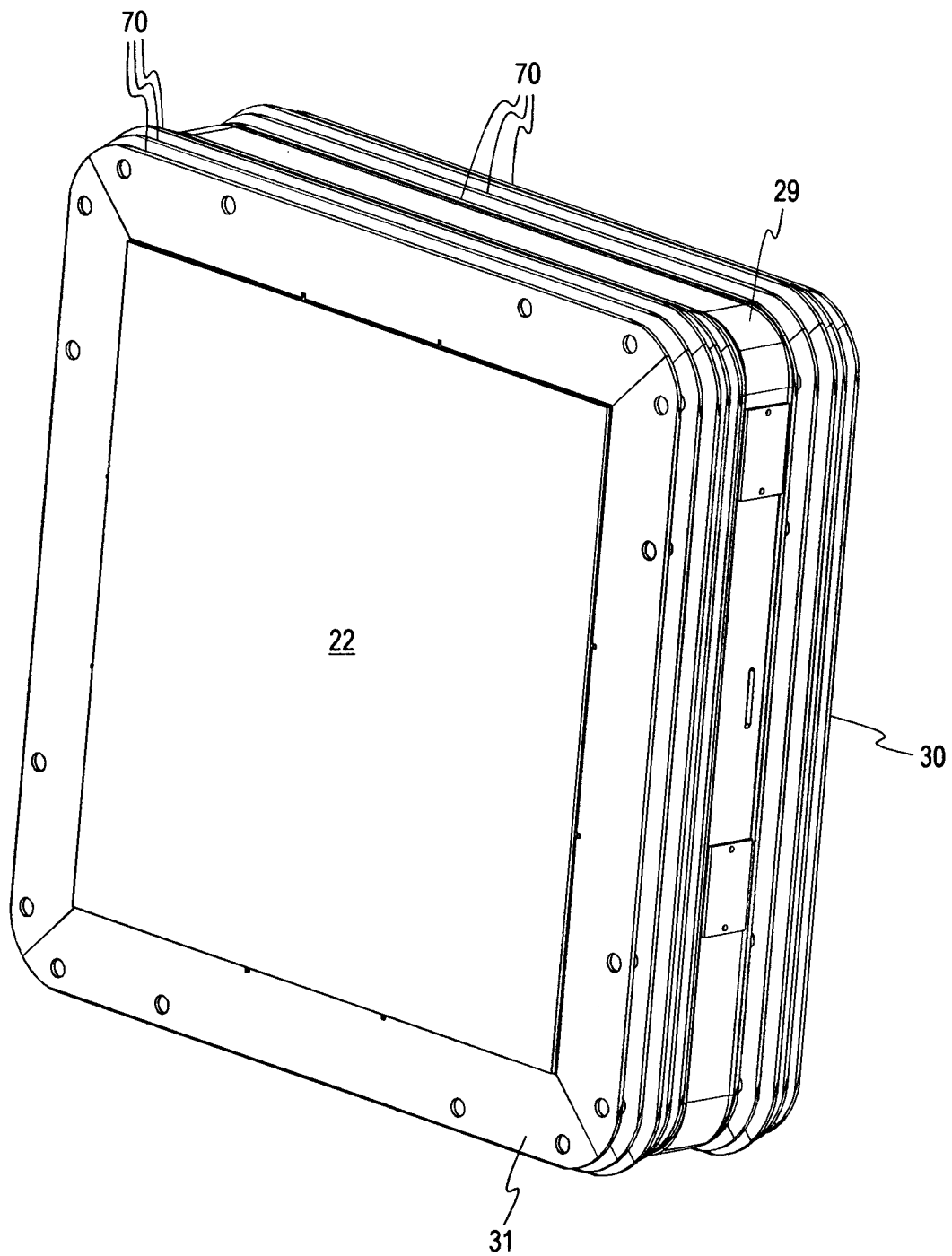
FIG. 3 is a perspective view of another flat-panel repeater embodying the invention.
Figure 4:
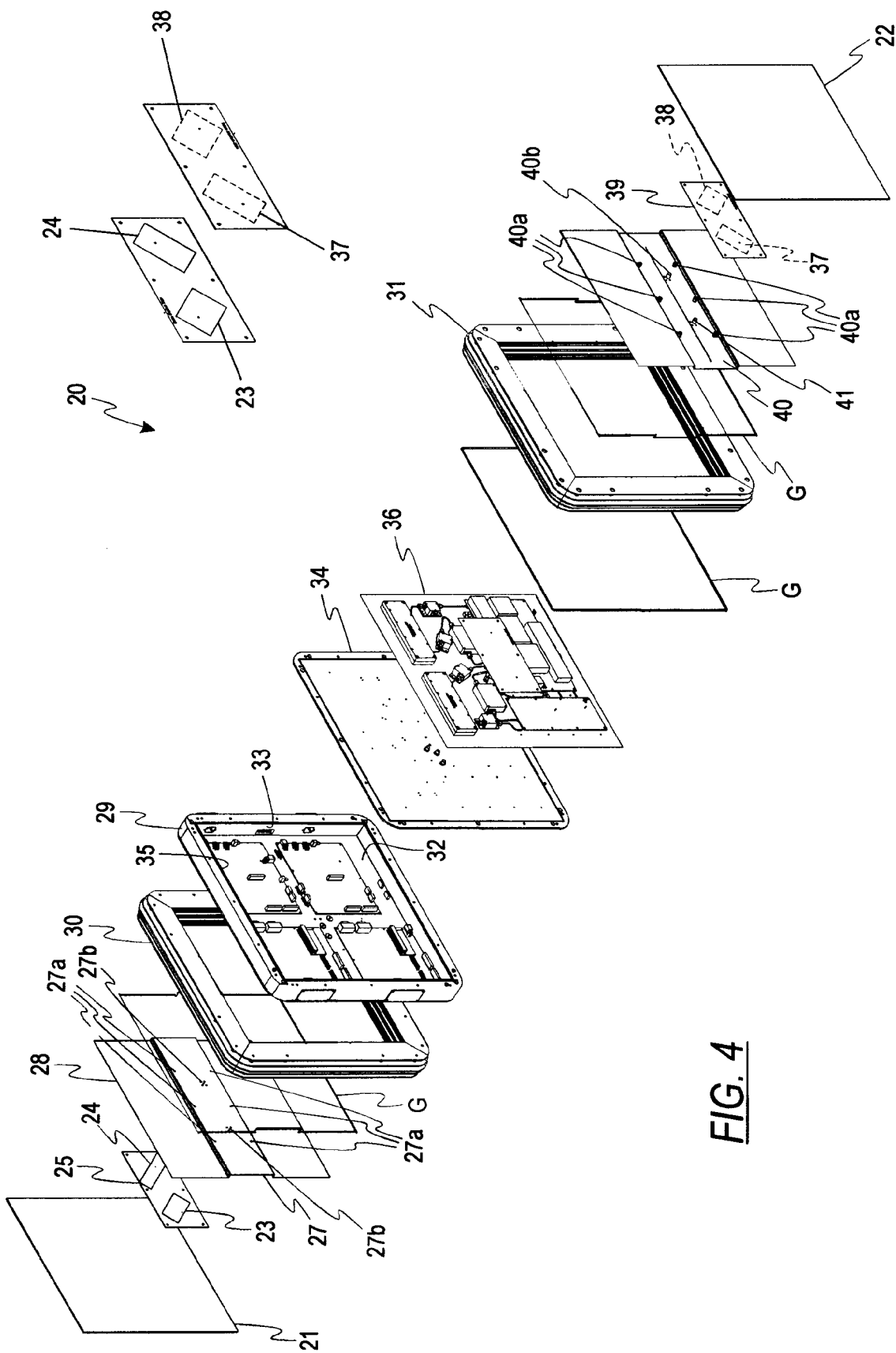
FIG. 4 is an exploded view of the repeater of FIG. 3.

FIGS. 3 and 4 illustrate a flat-panel repeater 20 having a pair of flat radomes 21 and 22 on opposite sides thereof. Each radome 21 and 22 covers one or more antenna elements for receiving and transmitting signals on opposite sides of the repeater. In the illustrative embodiment, the antenna elements are the patches of patch-type antennas, but it will be understood that alternative antenna elements such as dipoles or monopoles may be used. As can be seen in FIG. 4, a pair of patches 23 and 24 are printed on a dielectric plate 25 mounted adjacent the inside surface of the radome 21. The dielectric plate 25 seats in a recess 27 formed by a metal plate 28 that also forms a ground plane for the patches 23 and 24. The plate 25 seats on multiple plastic standoffs 27*a* connected to the plate 28 within the recess 27, and a pair of coaxial connectors 27*b* extend through he plate 28 for connection to the patches 23 and 24. The inner conductors of the connectors 27*b* are connected to the patches 23 and 24, while the outer conductors are connected to the ground plane 28. The opposite ends of the connectors 27*b* are connected to the RF circuitry on the board 36. Because the dielectric plate 25 is recessed within the ground plane, the patches 23 and 24 are substantially flush with the surface of the ground plane.

It can be seen that the ground plane formed by the metal plate 25 is considerably larger than the antenna patches 23 and 24, and the patches are positioned in the central region of the ground plane. These features offer significant advantages in improving the isolation between the two antennas, which in turn improves the gain performance or stability margin of the repeater, as will be discussed in more detail below. In general, the ratio of the total ground-plane area to the central area occupied by the antenna elements is in the range of about 2 to 5, and is preferably about 5, to achieve the desired isolation.

The repeater 20 includes a three-part frame, consisting of a central frame member 29 and a pair of RF-choke frames 30 and 31 attached to opposite sides of the central member 29. The periphery of the ground-plane plate 27 is captured within a slot in the inner periphery of the choke frame 30. The central frame member 29 is essentially closed on one side by an integral wall 32 that forms a bottom ground plane, and the interior of the member contains several electronic units (e.g., printed circuit boards) and a power connector 33. A top ground-plane plate 34 closes the open side of the frame member 29, and is attached to a peripheral flange 35 on the frame member 29. A second group of electronic units are mounted on a board 36 attached to the outside of the ground-plane plate 34.

The antenna elements on the opposite side of the repeater are mounted adjacent the inside surface of the radome 22. Thus, a pair of patches 37 and 38 are printed on a dielectric plate 39 seated in a recess 40 formed by a metal plate 41 that also forms a ground plane for the patches 37 and 38. As can be seen in FIG. 4, the patches 23, 24 are orthogonal to the patches 37, 38 to improve isolation between the antennas on opposite sides of the repeater. The periphery of the ground-plane plate 41 is captured within a slot in the inner periphery of the second choke frame 31. The patch plate 39 seats on multiple plastic standoffs 40*a* connected to the plate 41 within the recess 40, and a pair of coaxial connectors 40*b* extend through the plate 41 for connection to the patches 37 and 38. The inner conductors of the connectors 40*b* are connected to the patches 37 and 38, while the outer conductors are connected to the ground plane 41. The opposite ends of the connectors 40*b* are connected to the RF circuitry on the board 36. Multiple gaskets G are provided for sealing purposes.

An antenna is (simplifying somewhat) a path by which electrons get accelerated back and forth (i.e. a "race-track"). For example, in a dipole antenna, electrons accelerate from one end, towards the center (where they have the greatest velocity), then de-accelerate towards the other end (where the velocity is the slowest). They then turn around and accelerate back the other way. They do this at the rate of the resonant frequency of the antenna. The feed point of the antenna (for a dipole, at the center) is the position in which the electrons are moving the fastest. Thus, voltage (potential) of the antenna is tapped from this position. Electromagnetic energy therefore radiates from the ends of an antenna element (dipole or patch) in the direction of the accelerating electrons. This direction is called the antenna polarization (direction). Displacement currents (virtual electrons) therefore go from one end of the dipole, curve out in space, and terminate at the other end of the dipole. For two adjacent antennas, oriented in the same direction, where one is transmitting (active) and the other is receiving (passive), the active antenna pushes virtual electrons into space which terminate on the passive antenna. These virtual electrons then force the actual electrons on the surface of the passive antenna to accelerate, and induce a potential at its feed point. However, if the two antennas are not oriented in the same direction (being orthogonal . . . or perpendicular; for instance) then the active antenna cannot accelerate electrons on the other (passive) antenna. The "race-track" on the passive antenna is extremely short. These antennas are considered orthogonal, and therefore do not couple. Orthogonal antennas, on opposite sides of the repeater, do not couple and therefore appear isolated from each other. Thus, the system gain is increased without inducing ringing.

Figure 5:
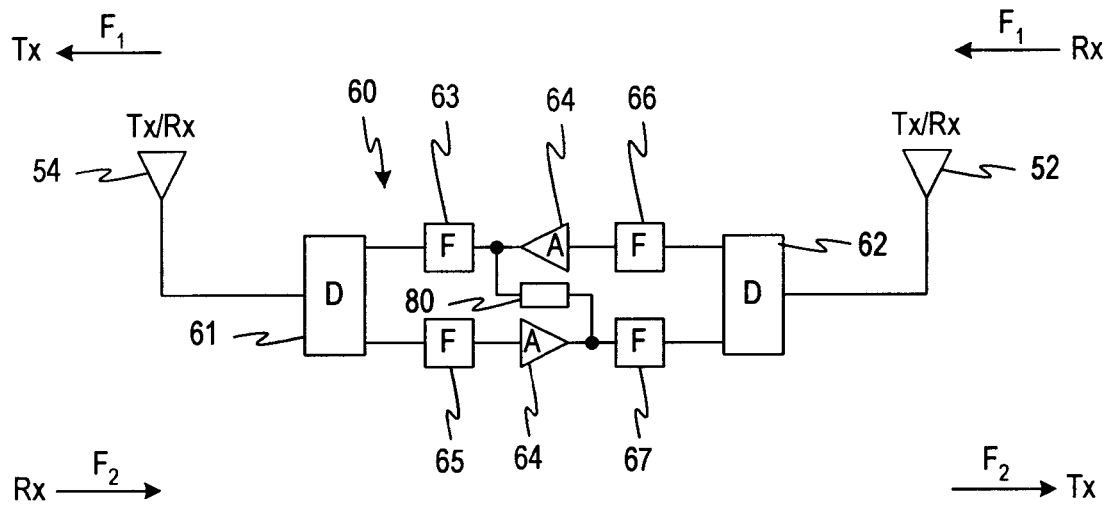
FIG. 5 is a schematic representation of a repeater module in accordance with one embodiment of the invention.
Figure 6:
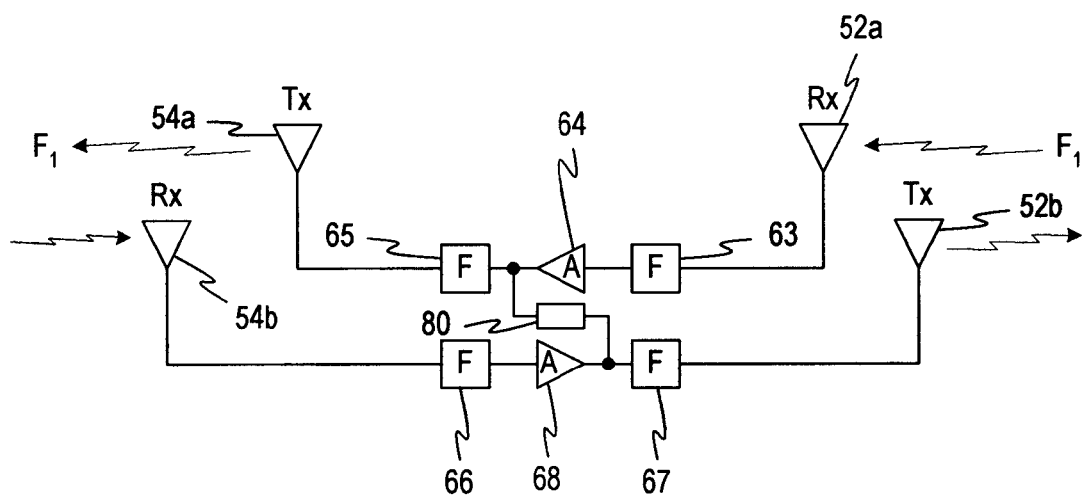
FIG. 6 is a schematic representation of another form of repeater module in accordance with another embodiment of the invention.

The RF electronic circuitry and antennas for the repeaters of FIGS. 1-4 is illustrated in more detail in FIGS. 5-8. Two different system architectures are shown in FIGS. 5 and 6. FIG. 5 shows an architecture for a two-antenna system, in which each of two antennas 52 and 54 operates in both the transmit and receive modes. For example, the first antenna 52 might be used to receive incoming RF signals from, and transmit signals to, a transmitter or another repeater, that is, in the link mode. The other antenna 54 would then be utilized in the broadcast/repeat mode to transmit signals to, and receive signals from, the user equipment, such as a remote handset or terminal, or to transmit a signal to a further repeater in a system using multiple repeaters to broadcast or distribute signals.

An electronics module 60 connected to both antennas 52 and 54 includes a pair of frequency diplexers (D) 61, 62 to effectively connect received signals from either antenna to only the receive circuitry for that antenna and not to the transmit circuitry for that same antenna, and to effectively connect transmit signals from the transmit circuitry to only the antenna and not to the receive circuitry for that same antenna. For example, RF signals received by the antenna 52 are routed through the diplexer 61 to a receive path that includes a filter 63 to attenuate the reverse link band, an amplifier 64 to amplify the RF, and then another filter 65 to protect the amplifier 64 from signal power on the other path. The second diplexer 62 then delivers the signal to the antenna 54 which re-transmits the amplified signal. In the reverse direction, the antenna 54 receives signals that are fed through the diplexer 62 to a second path including similar filters 66, 67 and a similar amplifier 68 which operate in the same manner as the first circuit to feed signals through the diplexer 61 to be transmitted at the antenna 52.

FIG. 6 shows a four-antenna architecture that includes two pairs of antennas 52a, 54a and 52b, 54b on opposite sides of the repeater. The antennas 52a, 52b on one side may be used for the link mode, as described above, one as the downlink antenna and one as an uplink antenna. Similarly, the two antennas 52b, 54b on the other side may be used in the broadcast/repeat mode, as described above, one as an uplink antenna and one as a downlink antenna. Similar electronic circuits or paths including filters and amplifiers are interposed between the respective pairs of antennas 52a, 54a and 52b, 54b. However, because separate pairs of antennas are provided, no frequency diplexers are required in this case.

The filters 63, 65, 66, and 67 are band pass filters selected to reduce the out-of-band signals. For a PCS-based system, the typical band pass bandwidth is approximately 15 MHz, commensurate with the bandwidth of PCS bands C, D, E, F, etc. Cut off and roll-off are performance and specification oriented, and depend on the circuit design.

In one embodiment, the amplifiers 64, 68 comprise relatively low power, linear integrated circuit chip components, such as monolithic microwave integrated circuit (MMIC) chips. These chips may comprise chips made by the gallium arsenide (GaAs) heterojunction transistor manufacturing process. However, silicon process chips or CMOS process chips might also be utilized.

Some examples of MMIC power amplifier chips are as follows:

1. RF Microdevices PCS linear power amplifier RF 2125P, RF 2125, RF 2126 or RF 2146, RF Micro Devices, Inc., 7625 Thorndike Road, Greensboro, N.C. 27409, or 7341-D W. Friendly Ave., Greensboro, N.C. 27410;

2. Pacific Monolithics PM 2112 single supply RF IC power amplifier, Pacific Monolithics, Inc., 1308 Moffett Park Drive, Sunnyvale, Calif.;

3. Siemens CGY191, CGY180 or CGY181, GaAs MMIC dual mode power amplifier, Siemens AG, 1301 Avenue of the Americas, New York, N.Y.;

4. Stanford Microdevices SMM-208, SMM-210 or SXT-124, Stanford Microdevices, 522 Almanor Avenue, Sunnyvale, Calif.;

5. Motorola MRFIC1817 or MRFIC1818, Motorola Inc., 505 Barton Springs Road, Austin, Tex.;

6. Hewlett Packard HPMX-3003, Hewlett Packard Inc., 933 East Campbell Road, Richardson, Tex.;

7. Anadigics AWT1922, Anadigics, 35 Technology Drive, Warren, N.J. 07059;

8. SEI Ltd. P0501913H, 1, Taya-cho, Sakae-ku, Yokohama, Japan; and

9. Celeritek CFK2062-P3, CCS1930 or CFK2162-P3, Celeritek, 3236 Scott Blvd., Santa Clara, Calif. 95054.

Figure 7:
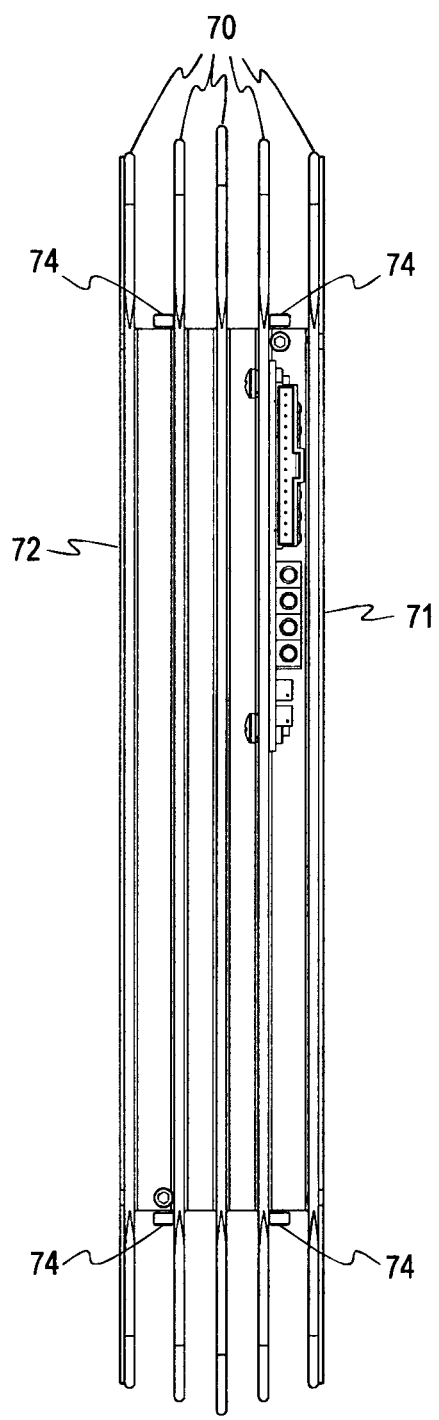
FIG. 7 is an enlarged end elevation of one of the RF choke frames in the repeater of FIGS. 3 and 4.
Figure 8:
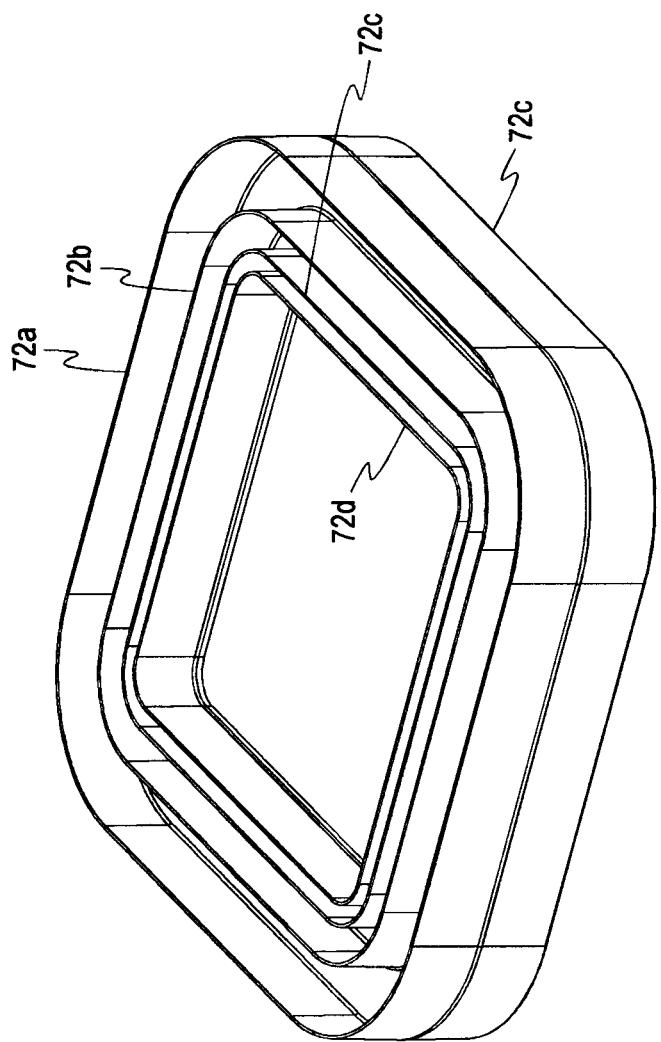

FIGS. 7 and 8 show the choke frame of FIGS. 1 and 2 in more detail. This frame is generally rectangular in configuration and includes multiple fins 70 extending orthogonally outwardly from opposite sides of central flat support members 71 and 72. As can be seen most clearly in the sectional view in FIG. 8, the fins 70 become progressively shorter in the axial direction, and the space between adjacent fins becomes progressively smaller, proceeding from the radially outermost fins 70a to the innermost fins 70d. The fins preferably have height and spacing dimensions related to one-fourth wavelength at the center frequency of the frequency band being amplified and re-transmitted by the repeater, e.g., the height or projection of the fins relative to the sides of the housing may be on the order of a quarter wavelength. In addition, strips of radio frequency absorber material 74 may be located intermediate some or all of the fins 70 about the peripheral surfaces of the main body of the choke frame. Absorber material is typically a low density dielectric loaded with conductive particles or fibers of carbon or metal, and can even be "tuned" to absorb certain frequencies more than others.

Figure 9:
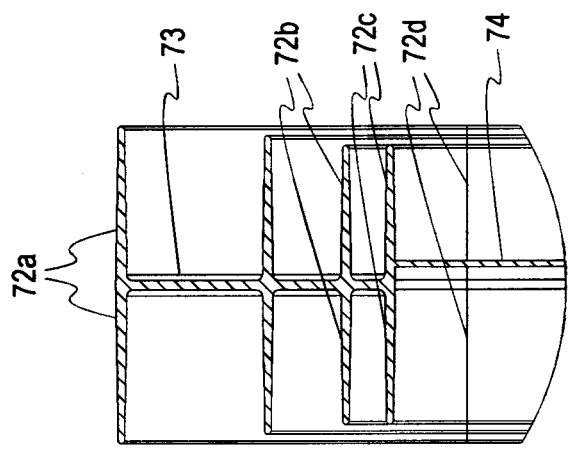
FIG. 8 and FIG. 9 are a perspective view and a partial side sectional view of another embodiment of an RF choke structure for a flat-panel repeater.

FIG. 9 illustrates in more detail the peripherally extending fins 73 that form the RF choke between the antennas on opposite sides of the flat-panel repeater of FIGS. 3 and 4. These fins 73 comprise relatively thin strips of conductive material located around the periphery of the RF choke frame. FIGS. 10-13 illustrate alternate embodiments of RF chokes of various forms.

Figure 11:
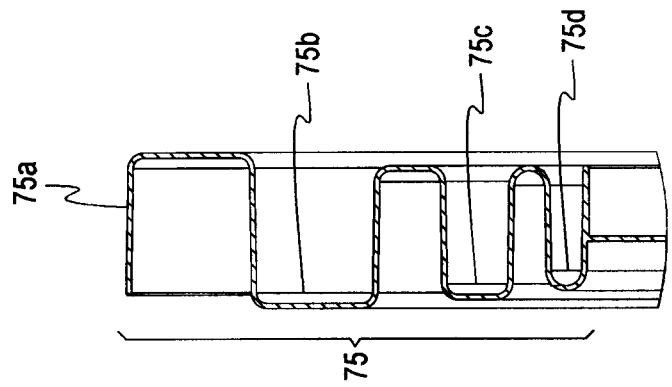
FIG. 10 and FIG. 11 are a perspective view and a partial side sectional view of another embodiment of an RF choke structure for a flat-panel repeater.
Figure 10:
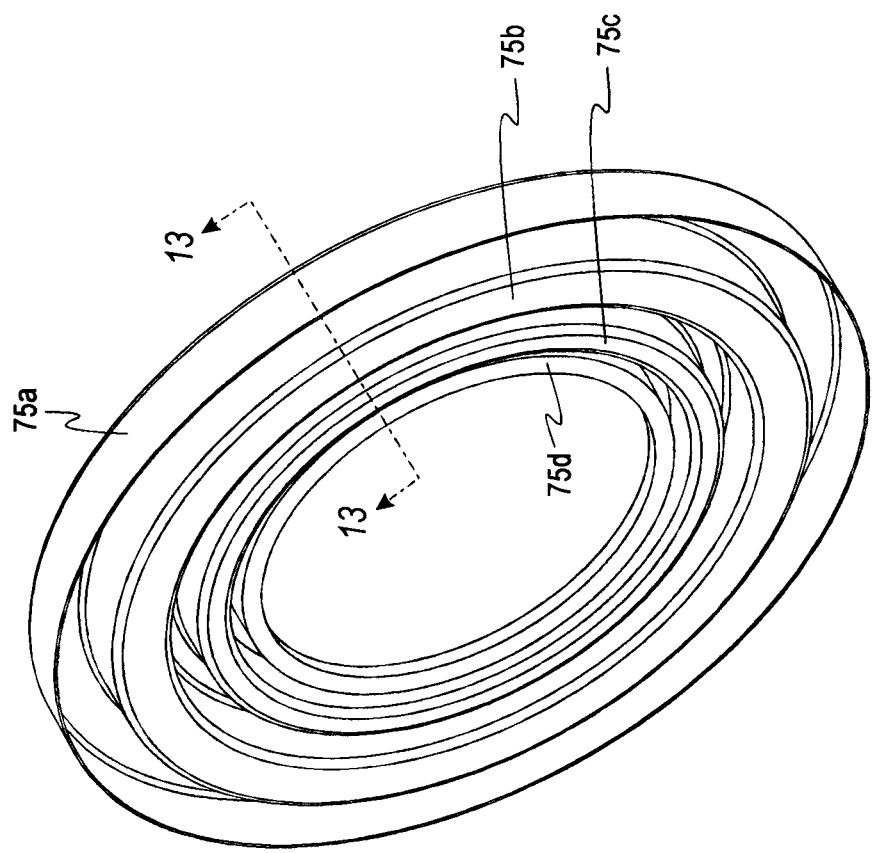

In FIGS. 10 and 11, the RF choke is formed by a series of concentric annular rings 75 which extend generally orthogonally relative to the plane of the antenna and around the periphery of the antenna, in contrast to the radially extending fins described above. As can be seen mostly clearly in the sectional view of FIG. 11, the choke rings 75 are formed by a corrugated metal annulus in which the outer wall 75a is slightly shorter than the first full corrugation crest 75b in the axial direction, and then the successive corrugation crests 75c and 75d become progressively shorter in both the axial and radial directions.

The circular choke configuration of FIGS. 10 and 11 has the advantage of providing feedback paths of equal length between all points on the peripheries of the antennas on opposite sides of the repeater. Unwanted feedback occurs via surface currents on the outside surfaces of the panel, and path lengths that are odd multiples of one-half wavelength produce cancellation of the unwanted surface currents. The circular configuration facilitates a choice of dimensions that achieve the desired cancellation of feedback currents because of the uniformity of the lengths of the feedback paths between the two antennas with such a configuration. In general, the repeater is sized and configured for a selected frequency band having a predetermined center frequency and wavelength "X"; the height, width and thickness dimensions of the repeater are selected so that feedback energy at the wavelength "X" travels a feedback path of predetermined length around the repeater to improve the side-to-side isolation.

Figure 12:
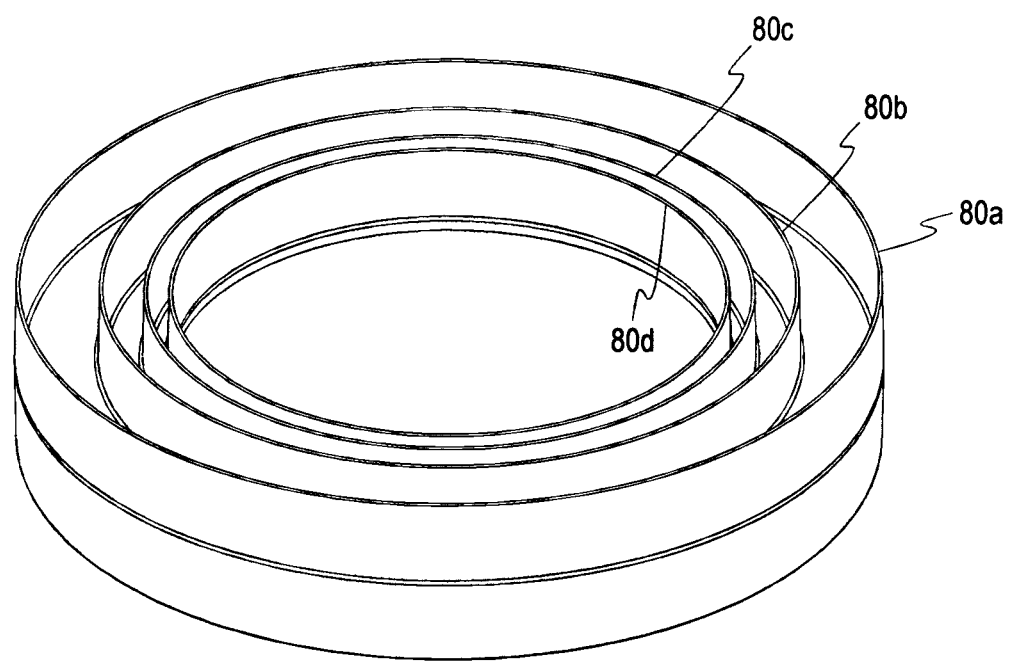
FIG. 12 and FIG. 13 are a perspective view and a partial side sectional view of another embodiment of an RF choke structure for a flat-panel repeater.
Figure 13:
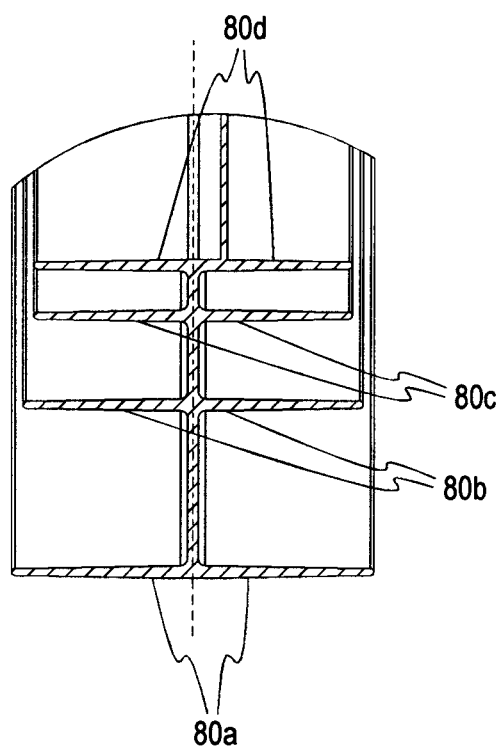

FIGS. 12 and 13 illustrate a circular configuration for a choke structure similar to that shown in FIGS. 8 and 9. Multiple fins 80 extend orthogonally outwardly in the axial direction from opposite sides of central flat support members 81 and 82. As can be seen most clearly in the sectional view in FIG. 13, the fins 80 become progressively shorter in the axial direction, and the space between adjacent fins becomes progressively smaller, proceeding from the radially outermost fins 80a to the innermost fins 80d.

Figure 14:
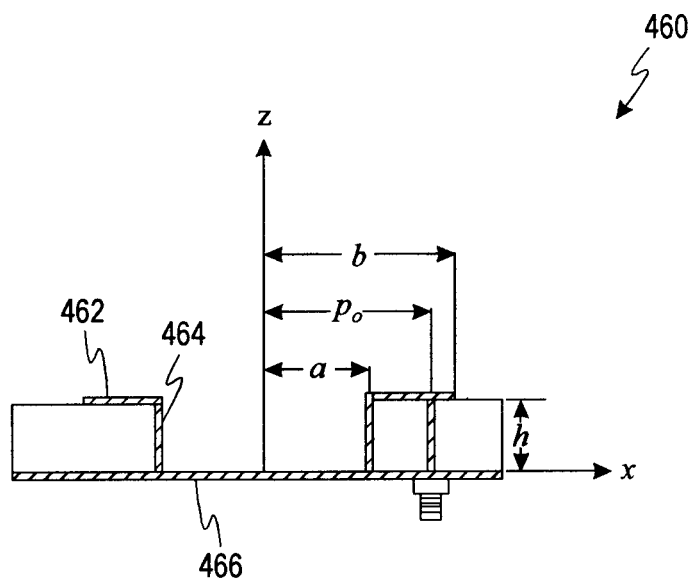
FIG. 14 and FIG. 15 are side sectional and top views, respectively, of a reduced surface wave (RSW) patch antenna.
Figure 15:
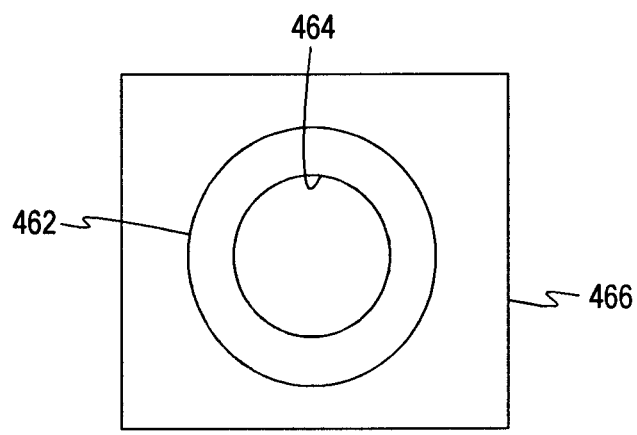

In an alternative embodiment, a reduced surface wave (RSW) type of antenna structure might be utilized in place of the patch antennas shown in the prior figures. FIGS. 14 and 15 are a side sectional view and a top plan view of one example of a probe-fed, shorted annular ring, reduced surface wave patch antenna 460. An RSW patch antenna element, is simply a patch that focuses more energy in the directed area, and not to the sides near the ground plane. There are many types of RSW patches, but the most common is a recessed patch inside a partial cavity. The cavity walls act as a field suppressor, and "catch" field lines that are directed to the sides of the patch, rather than in a direction perpendicular to the patch and ground plane. If both patches (on opposite sides of the repeater) are RSW patches, then they have reduced coupling (i.e. greater isolation), which allows the system active gain to be increased.

RSW microstrip antennas produce only a small amount of surface-wave radiation. In addition, if printed on electrically thin substrates, these antennas only weakly excite lateral waves (space waves that propagate horizontally along the substrate interface). As a result, these antennas do not suffer from the deleterious effects of surface and lateral wave scattering. These characteristics make the RSW antenna ideal for applications where the supporting substrate or ground plane of the antenna is small, in which case diffraction of the surface and lateral waves from the edges of the structure may be quite significant for conventional microstrip patch antennas. RSW antennas may also be useful for array applications, where the presence of surface and lateral waves for conventional patch radiators produce significant mutual coupling and may lead to scan blindness.

For a given size antenna element (patch, dipole, etc.), increasing the size of the ground plane behind the element reduces the Front to Back (F/B) ratio of the antenna. More specifically, the larger the ground plane, the less energy radiated to the back side. Thus, increasing the size of the faces of the side-to-side repeater reduces the amount of energy that each face radiates to the backward face. Another way of explaining this is that by increasing the size of the repeater, the lower the coupling between the antennas on opposite sides of the repeater (i.e. patches). This therefore increases the isolation between the antennas, and allows the active gain for the system to be increased. However, where the size of the ground plane is limited by other considerations, the RSW patch technology may be employed.

A preferred RSW design is the Shorted-Annular-Ring Reduced-Surface-Wave (SAR-RSW) antenna. One example of this type of antenna, shown in FIGS. 14 and 15, is a conventional annular ring microstrip antenna 462 with an inner boundary 464 short-circuited to a conducting ground plane 466. The outer radius dimension is chosen to eliminate surface-wave excitation from the equivalent ring of magnetic current at the outer edge of the antenna that corresponds to the TM.sub.011 cavity patch mode. (The modes are denoted using the notation TM.sub..phi..rho..) The inner radius is chosen to make the patch resonant at the design frequency.

Figure 16:
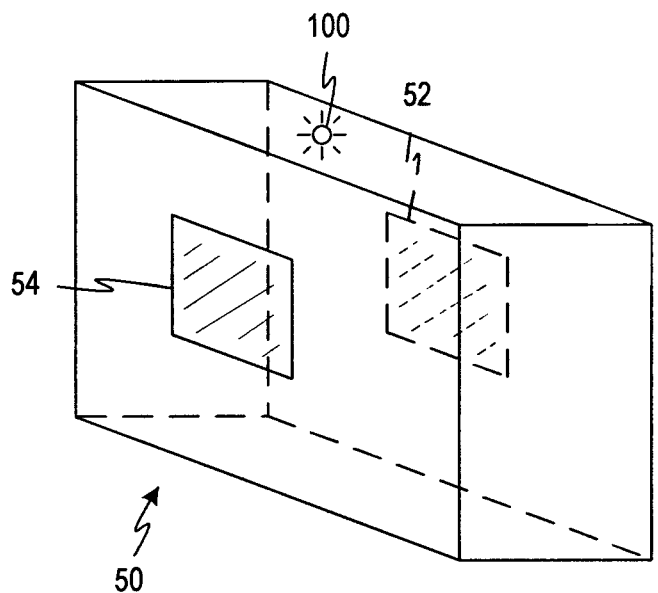
FIG. 16 is a simplified perspective illustration of one form of flat-panel repeater in accordance with one form of the invention.
Figure 17:
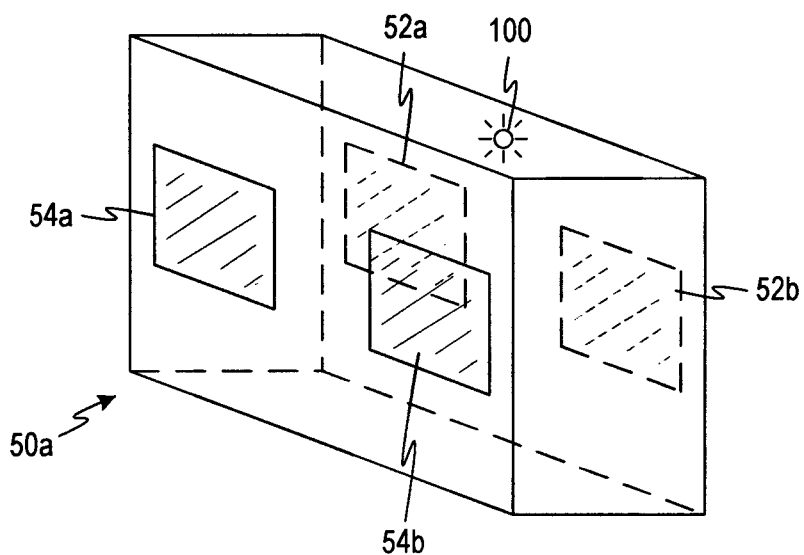
FIG. 17 is a simplified illustration of a second form of flat-panel repeater in accordance with the invention.

FIGS. 16 and 17 diagrammatically illustrate repeater modules 50 and 50a with patch antennas that correspond respectively to the systems described above. In these examples, microstrip patches are used for the antenna elements 52, 54 (FIG. 16) and 52a, 52b, 54a, 54b (FIG. 17). The module/box or housing 50, 50a may contain a DC power supply or DC power converter, amplifiers, filters and diplexers (if required), as described above. The electronics may be discrete parts, connected together via SMA connectors. For lower power systems, the electronics can be surface mount PCB. A small lamp, LED, or other display element 100 can be used with appropriate RF power sensing electronics 80 (see FIGS. 5 and 6) to aid the provider/user/customer in orienting the unit or module 50 or 50a with a link antenna directed/pointed towards a base station, such that sufficient signal power is being received, i.e., at or above some predetermined threshold.

Figure 18:
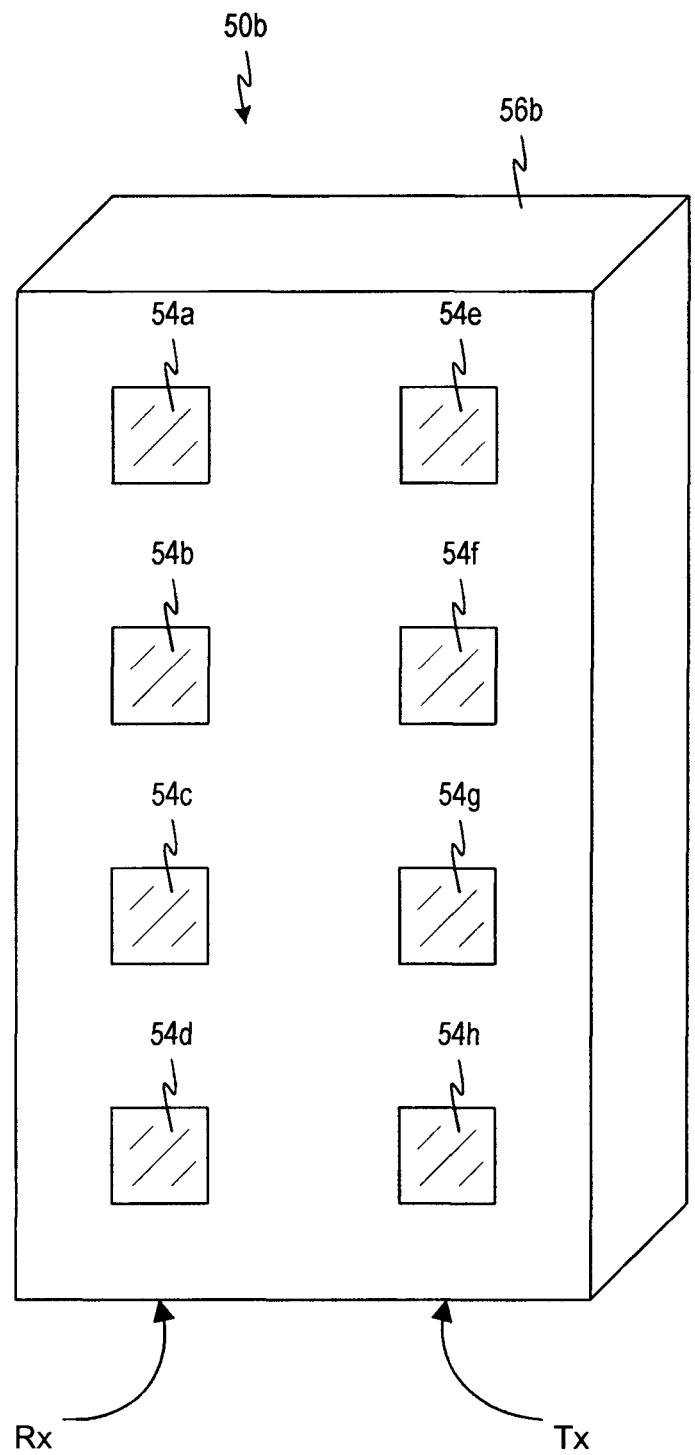
FIG. 18 is a simplified perspective illustration showing another embodiment of a flat-panel repeater.

FIG. 18 illustrates an approach which uses an array of antenna elements in order to increase the passive gain. The example shown in FIG. 18 uses two columns of patch array antenna elements on one face of the module, designated by reference numerals 54a through 54h. The antenna patches 54a through 54d are designated as receive (Rx) elements in the embodiment shown in FIG. 18, while the antenna elements 54e through 54h are designated as transmit (Tx) elements in this embodiment. It will be appreciated that a similar array of antenna elements, corresponding to the antenna elements 52 of the prior embodiments, are mounted to the opposite face (not shown) of the module 50b of FIG. 18. Moreover, fewer or more array elements might be utilized in other patterns than that shown on FIG. 18, without departing from the invention.

In the embodiment shown on FIG. 18, the use of four elements, which are summed together in an array, achieves approximately four times (6 dB) the gain of a single receive or transmit element. Thus, with four elements also on the opposite face (not shown), this adds a total of 12 dBi of additional passive gain to the system, which can be used to reduce the required active gain by as much as 12 dB and also to reduce the required isolation by as much as 12 dB. While the near-field wave mechanics might not permit a full 12 dB to be achieved, nonetheless, some considerable improvement can be expected from this approach. The vertical beam width of the system will be reduced somewhat by this approach.

The antennas on opposite sides of the repeaters described above are "fixed" in position and orientation to assure maximum isolation between the antennas and to receive and transmit a given signal, and therefore maximize system gain. This isolation between antennas is controlled/maximized (and mutual coupling minimized) in the following ways:

a) The two antennas (or sets of antennas) are positioned such that for each, the F/B ratios sum to a maximum. For example, for a perfectly rectilinear module, the two antennas (or sets of antennas) each face oppositely by 180 degrees, or within an acceptable tolerance.

b) The two antennas of each path, are polarized in mutually orthogonal (perpendicular) directions, which further reduces the mutual coupling (increases the isolation) by roughly 20 to 30 dB.

c) Electromagnetic choke or shunt elements are provided on the edges or borders of the module or housing structure to absorb (shunt) power to ground. Alternatively, the four sides of the housing (i.e., excluding the two sides on which the antennas are mounted) may be composed of metallic material and grounded so as to shunt stray electromagnetic energy to ground.

Design of the antennas, beams, and (control of) F/B ratios assures adequate isolation between the two opposing antennas (or antenna sets). The antennas' F/B ratios or isolation is the largest limiter for the total system gain. If desired, the isolation can be further improved by having the wireless connection to the base station on a different frequency band from the remote connection.

The above described repeater modules can be used in a number of applications, a few examples of which are as follows.

Figure 19:
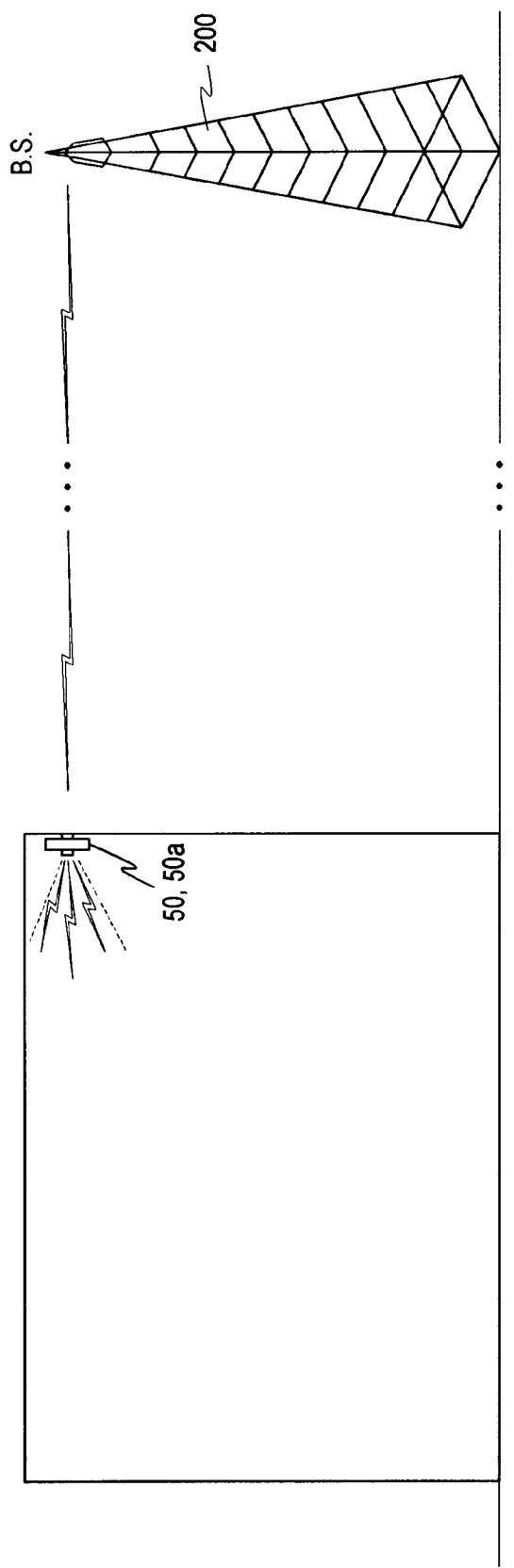
FIG. 19 is a diagrammatic representation of an in-building repeater system in accordance with the invention.

1) Indoor Repeater (see FIG. 19)

Figure 20:
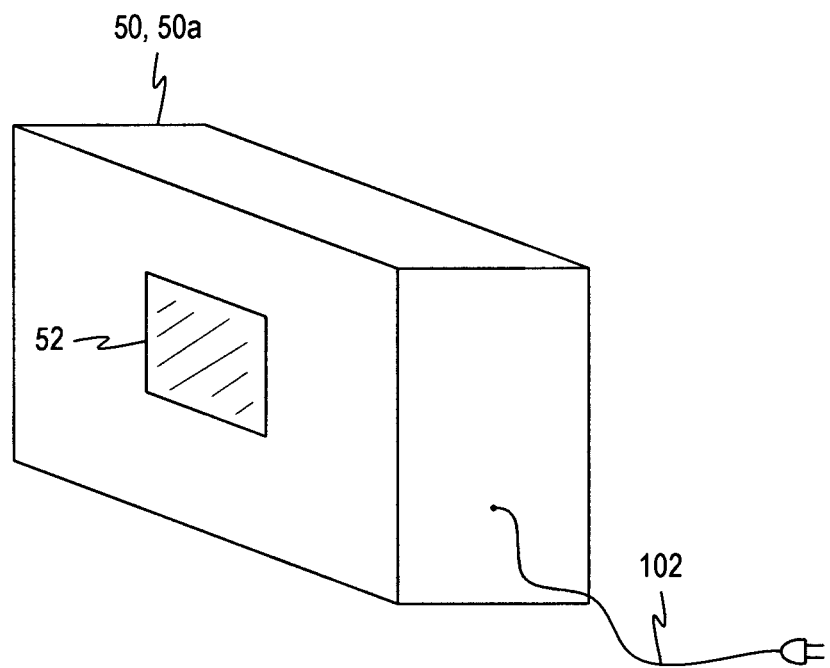
FIGS. 20 and 21 are simplified illustrations of repeater modules in accordance with other forms of the invention.
Figure 21:
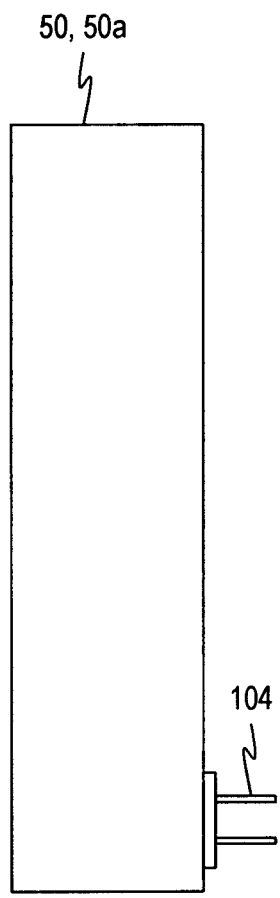

The flat-panel repeater can be mounted on a wall or window, at or near a location where the RF signal power from a nearby base station is at its maximum power level (within the building). Power for each repeater can be supplied via either a 120-volt cord and plug 102, or with a 120-volt plug connection 104, built directly into the repeater (see FIGS. 20 and 21). Both allow very simple installation, by the customer. Generally, the RF signal is received, at a power level above the noise floor, from a nearby base station (with the module placed in a location facing the base station), and the repeater re-radiates the (amplified) RF signal into the building. Additionally, signals from remote units (handsets/cellphones) within the building are received by the repeater, amplified, and re-radiated back to the base station 200.

Figure 22:
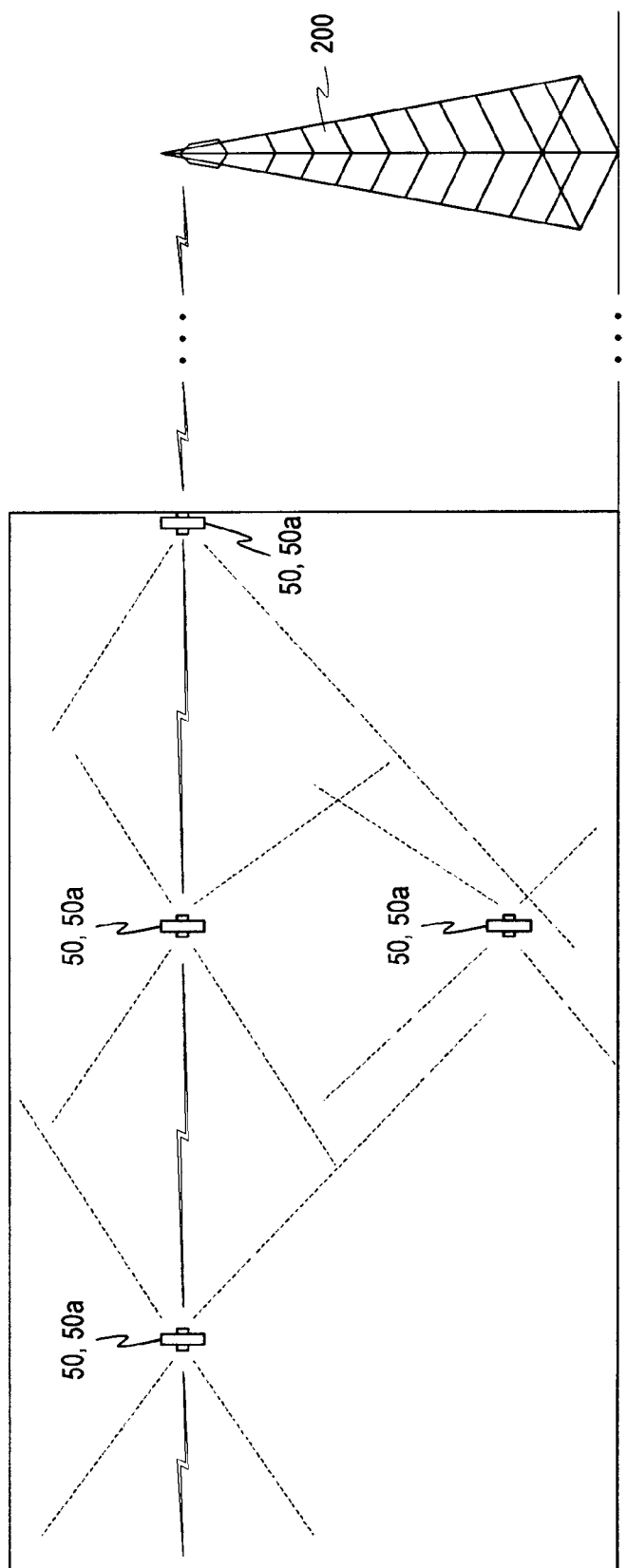
FIG. 22 is a diagrammatic representation of another form of in-building repeater system in accordance with the invention.

2) Daisy-Chained Indoor Repeater (see FIG. 22)

FIG. 22 shows a plurality of flat-panel repeaters 50 or 50a placed at various locations within a building, "daisy chained" together, to provide greater coverage within the building. This aids in providing coverage to the side of the building opposite to the base station, or any other RF null or "blank" areas within the building. In this way, the provider or customer can cheaply and easily install two or more repeaters, to provide coverage to various areas of the building, such as the side opposite the side nearest the base station, where the RF signal level (from the base station) has low Signal to Noise (ratio), or where there is no signal at all.

Figure 23A:
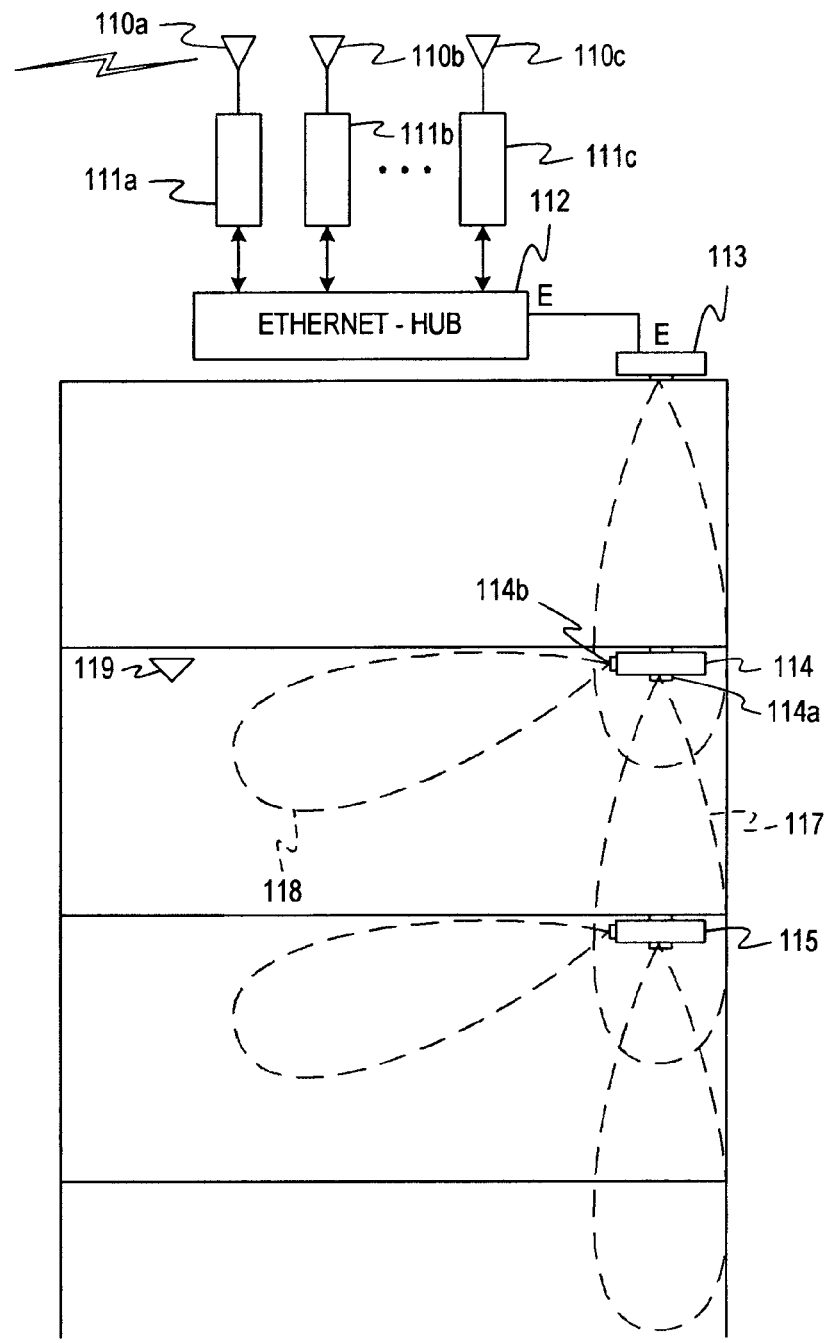
FIG. 23a is a diagrammatic illustration of a system for distributing signals from multiple wireless services throughout a building.
Figure 23B:
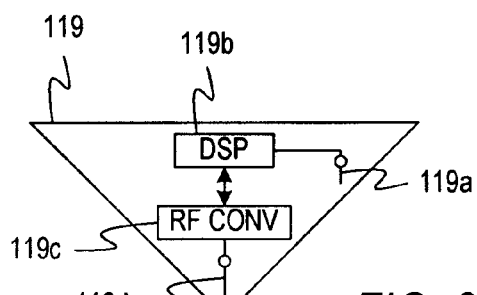

If it is desired to distribute multiple wireless services within a building, such as PCS, MMMDS, LMDS, wireless LAN, cellular telephone, etc., all such signals may be supplied from their receiving antenna(s) to an Ethernet hub before entering the daisy-chained indoor repeaters, as illustrated in FIGS. 23a and 23b. A separate antenna 110 and electronic circuits 111 are provided for each wireless service, and all the circuits 111 are connected to an Ethernet hub 112. Each of the circuits 111 includes a frequency converter for converting signals from the frequency used by the wireless service to an Ethernet frequency. The Ethernet hub 112 controls the forwarding of the signals from the multiple wireless links to the single wired connection from the Ethernet hub 112 to an indoor flat-panel repeater 113, which then relays those signals on to other repeaters such as repeaters 114 and 115 located throughout the interior of the building.

Each of the repeaters 114 and 115 has two antennas on the downlink side. Specifically, a first antenna 114a on the repeater 114 is designed to produce a beam 117 aligned with the next repeater 115, while a second antenna 114b produces a beam 118 that extends laterally through the adjacent portion of the interior of the building to reach all the users in that portion of the building. For user devices that are not part of an Ethernet, such as PCS subscriber units, the signals from the second antenna 114b are received by an Ethernet-to-PCS conversion unit 119 shown in more detail in FIG. 23b. This conversion unit includes an antenna 119a that complies with the IEEE 802.11 standard, a DSP 119b, an RF conversion circuit 119c for converting the frequency of received signals to the PCS frequency, and a PCS antenna 119d for transmitting the converted signals to PCS users in the building. Of course, the conversion unit 119 also works in the reverse direction, receiving PCS signals from subscriber units at the antenna 119d, converting them to the Ethernet frequency in circuit 119c, and transmitting them from antenna 119a to the repeater 114 for re-transmission back to the repeater 113 and the Ethernet hub 112 which selects the appropriate circuit 11 and antenna 110.

3) Outdoor Null Fill Repeater

A single flat-panel repeater can be installed on a tower, instead of a more conventional repeater installation requiring discrete antennas. This provides a smaller, more economical package, and less labor (time) and effort in orienting the antennas to assure adequate isolation between the antennas.

4) Outdoor Repeater to Building

A single flat-panel repeater can be installed on a tower, in the same fashion as above, realizing the same benefits.

The applications mentioned above in 1)-4) are independent of frequency band. That is, any of these applications might be used in any frequency band, including, but not limited to, the following:

a) Cellular (800 MHz band)

b) PCS (1800 and 1900 MHz bands)—(Personal Communications Service)

c) GSM (900 and 1800 MHz bands)—(Global System for Mobile communications)

d) MMDS (2500 MHz band)—(Multi-channel Multipoint Distribution Service)

e) LMDS (26 GHz band)—(Local Multipoint Distribution Service)

f) Bluetooth Applications (2400 MHz band)—(Bluetooth is the name of a wireless protocol standard, created by Ericsson)

g) Indoor Wireless LANs (2400 MHz band)—(Local Area Network)

h) 3G (3rd Generation PCS systems) at 1900 MHz (U.S.) and 1800-2200 MHz (Europe)

If it is desired to increase the wide-angle coverage of the signals re-transmitted by the repeater, one side of the repeater may be provided with multiple antennas oriented in different directions.

Figure 24:
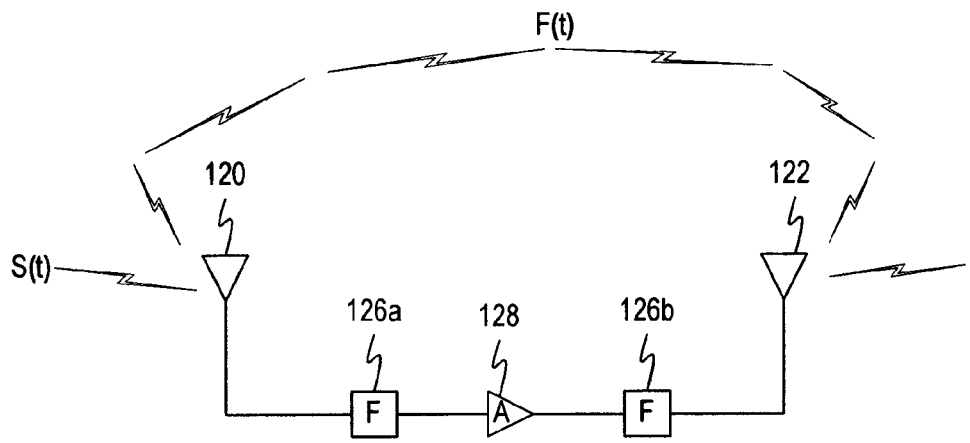
FIG. 24 is a block diagram of one signal path through a repeater system.

FIG. 24 shows a block diagram of one path through a repeater system. The input signal, S(t), either from the base station (for the downlink path), or from the mobile user (for the uplink path), is received via an antenna 120, bandpass filtered at 126a, amplified at 128 (with active gain=G), filtered again at 126b, and finally transmitted by an antenna 122. Some of the transmitted signal energy couples back (through space, or through the electronics) into the receive antenna. This is denoted in FIG. 24 as the feedback signal, f(t), which is simply a delayed version (attenuated) of the original signal, S(t). Therefore, the composite signal, S(t)+f(t), is fed into the amplifier, with output G(S(t)+f(t)). Assume, for example, that the antennas have 0 dBi gain, then the new feedback signal is G f(t). The propagation of this signal, back to the input antenna, will incur attenuation, H. Therefore, the amplified, attenuated signal at the input antenna will be H G f(t). If this signal is comparable in power to the original signal S(t), then the amplifier 128 will go unstable, and oscillate (ring). This oscillation will cause severe distortion in the desired signal.

Figure 25:
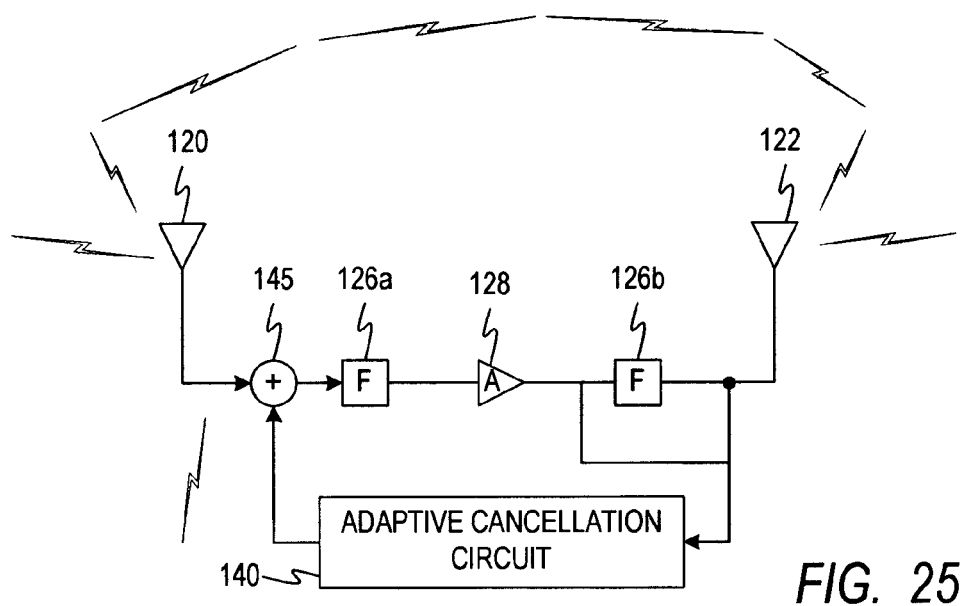
FIG. 25 is a block diagram of one signal path through a repeater system, as in FIG. 24, adding an adaptive cancellation circuit.

FIG. 25 shows the same circuit as FIG. 24; however, adding an adaptive cancellation circuit 140. The goal of this circuit 140 is to create a inverse f(t) signal-f(t) (a 180 degree shifted f(t) signal), and sum it with the input signal, including the feedback signal, f(t), at a summing junction 145, and thereby remove the feedback signal f(t).

Figure 26:
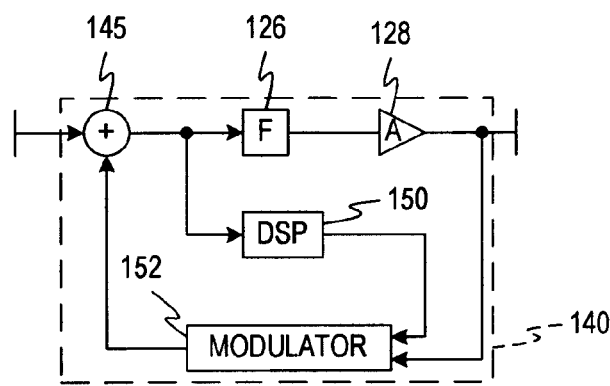
FIG. 26 is a block diagram (high level) of a (digitally) adaptive cancellation circuit in accordance with one embodiment of the invention.

FIG. 26 shows a general block diagram (high level) of one form of the adaptive cancellation circuit 140. In this approach, the input (RF) signal is summed at the junction 145 with a modulated signal constructed via a digitally adaptive process, to destructively interfere with the feedback signal embedded in the input composite signal. After the summation, the composite signal, S(t)+f(t), is digitally sampled and digitally processed via a digital signal processor (DSP) 150, which computes an intermediate signal for a modulator 152. The modulator 152 takes the intermediate signal, and a sample of the amplified (output) signal, and creates a near copy of the correct inverted f(t) signal-f(t). This process will work with many, if not most, of the digitally adaptive algorithms for feedback control. Additionally, this methodology does not require an injected signal (training or pilot tone, or wideband noise), for the adaptive process.

Figure 27:
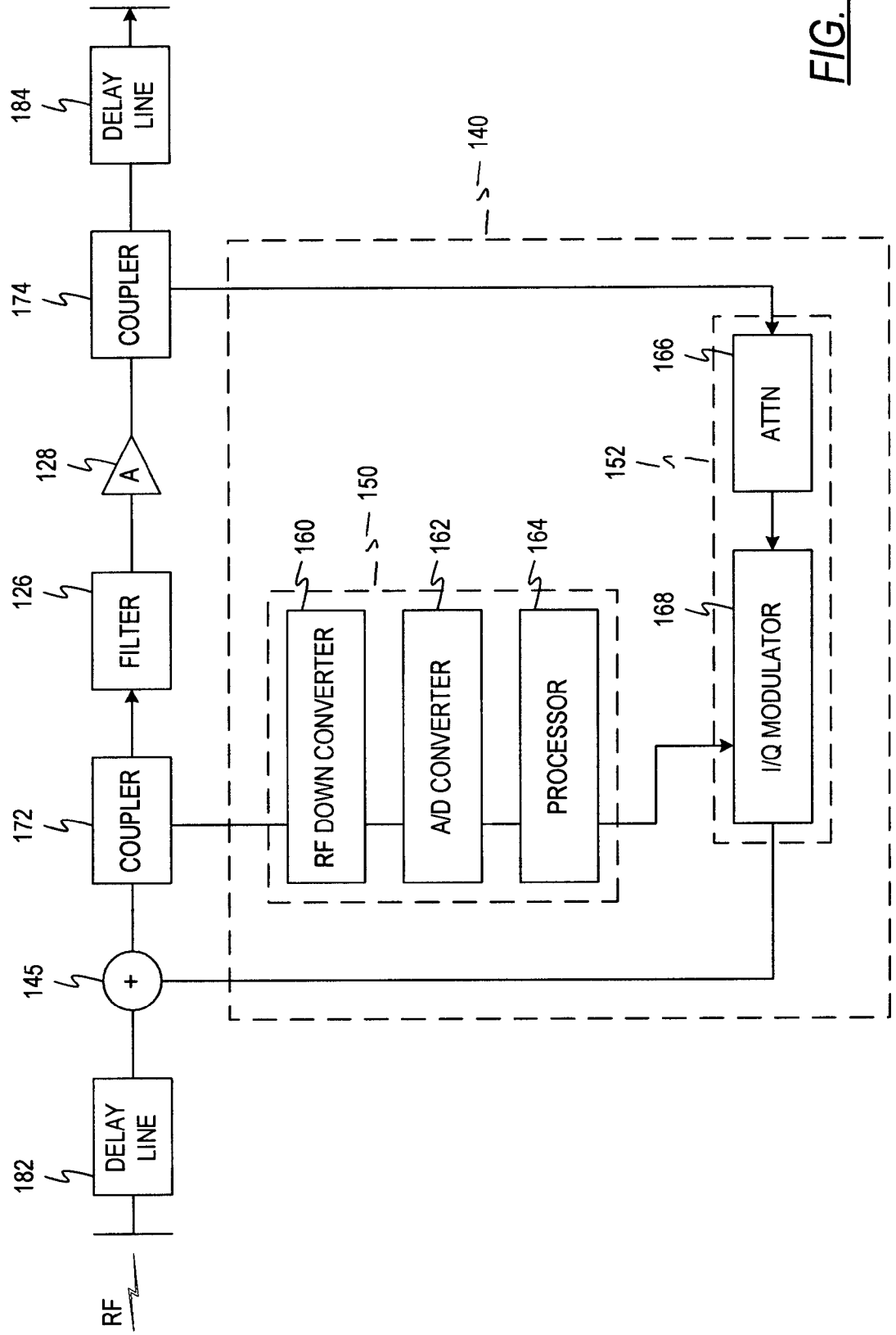
FIG. 27 is a block diagram (high level) of the (digitally) adaptive cancellation circuit of FIG. 26 which shows the technique in further detail.

FIG. 27 shows the circuit 140 in further detail. The DSP 150 is a combination of an RF downconverter 160 to shift the signal to an intermediate frequency that allows digital sampling, an analog-to-digital (A/D) converter 162 which digitizes the analog signal, and a processor 164 which performs the required operations to compute the intermediate signal. The modulator 152 is a combination of a controllable attenuator 166, and an I/Q modulator 168. Additional details shown in FIG. 27 include respective couplers 172 and 174 which couple the signals from the signal paths to and from the adaptive cancellation circuit 140, a first coupler 172 being interposed between the summation junction 145 and the filter 126 and the second coupler 174 being at the output of the power amplifier 128. In addition to the couplers 172 and 174, respective delay lines 182 and 184 may be employed at either end of the RF path, one just prior to the summing junction 145 and one subsequent to the coupler 174.

Figure 28:
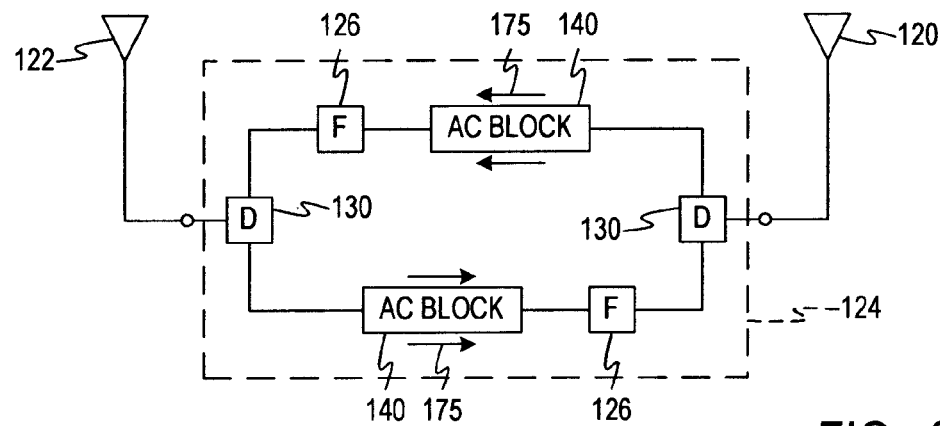
FIG. 28 is a block diagram of a repeater system, similar to that of FIG. 17, using the adaptive cancellation (AC) circuit of FIGS. 26 and 27.

FIG. 28 shows a block diagram of a repeater system using adaptive cancellation (AC) circuit 140, details of which are shown in FIGS. 26 and 27. The "direction" of the circuit 140 in each RF path has been taken into account. In this system, each (uplink, downlink) path has a separate AC circuit block 140, and the system uses diplexers 130 because it has only one antenna on each side of the repeater.

Figure 29:
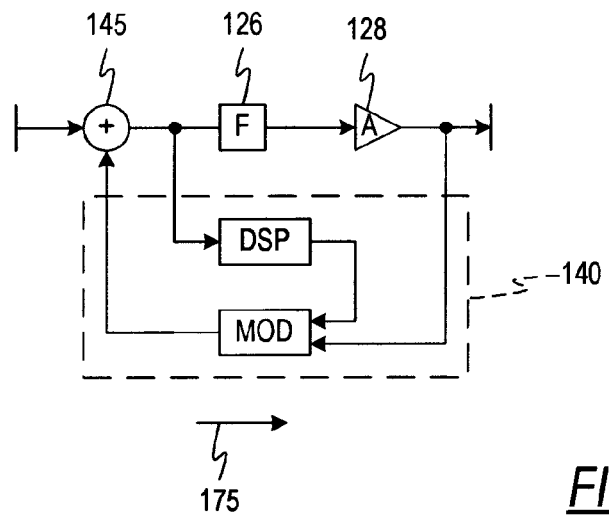
FIGS. 29 and 30 show the directional characteristics of the AC blocks, for the downlink path (FIG. 29) and the uplink path (FIG. 30)
Figure 30:
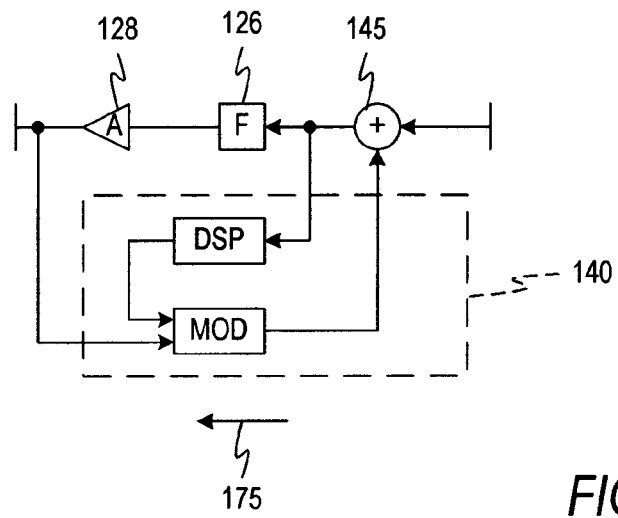

FIGS. 29 and 30 show the directional characteristics of the AC circuit blocks 140, whether for the downlink or uplink path. The blocks are "mirror images" of one another, differing by the direction of the desired signal, with the arrows 175 denoting the directionality of each circuit 140.

FIG. 31 shows a side-to-side repeater 190 having a body or housing 192 having opposed flat surfaces. To each of these opposed flat surfaces, there is mounted a single patch antenna element 194, 196, respectively comprising the antennas on the mobile-facing side and the base-station-facing side. An equivalent circuit diagram is shown in FIG. 32. It will be understood that the circuit components of FIG. 32, including the adaptive cancellation (AC) circuits, may be carried in the body or housing 192.

Similarly, FIG. 33 shows a side-to-side repeater 190a having a similar body or housing 192a which mounts separate uplink and downlink transmit (Tx) and receive (Rx) patch antenna elements for each of the two antennas. The respective Tx and Rx antennas on one side of the repeater are designated by reference numerals 194a and 194b, while the respective Tx and Rx antenna elements on the other side are designated by reference numerals 196a and 196b. The circuits shown in FIG. 34 may be mounted to (in) the body (housing) 192a.

As indicated above, the electronics, including the adaptive cancellation circuits, may be carried on/in the body/housing 192, 192a of the antenna element in the side-to-side repeater structures of FIGS. 31 and 33, permitting a tower-top modular repeater installation, in addition to the other advantages As indicated above, FIGS. 31 and 32 show the case for a single antenna (element) on each side, including frequency diplexers to separate each path (or frequency band). FIGS. 33 and 34 show the approach when using separate Tx and Rx antennas, and therefore separate circuits, for each (uplink, downlink) path.

The above-described approach may be used in a number of applications, including: Cellular Coverage (null fill, in-building systems), PCS, MMDS, WLL and LMDS.

Figure 35:
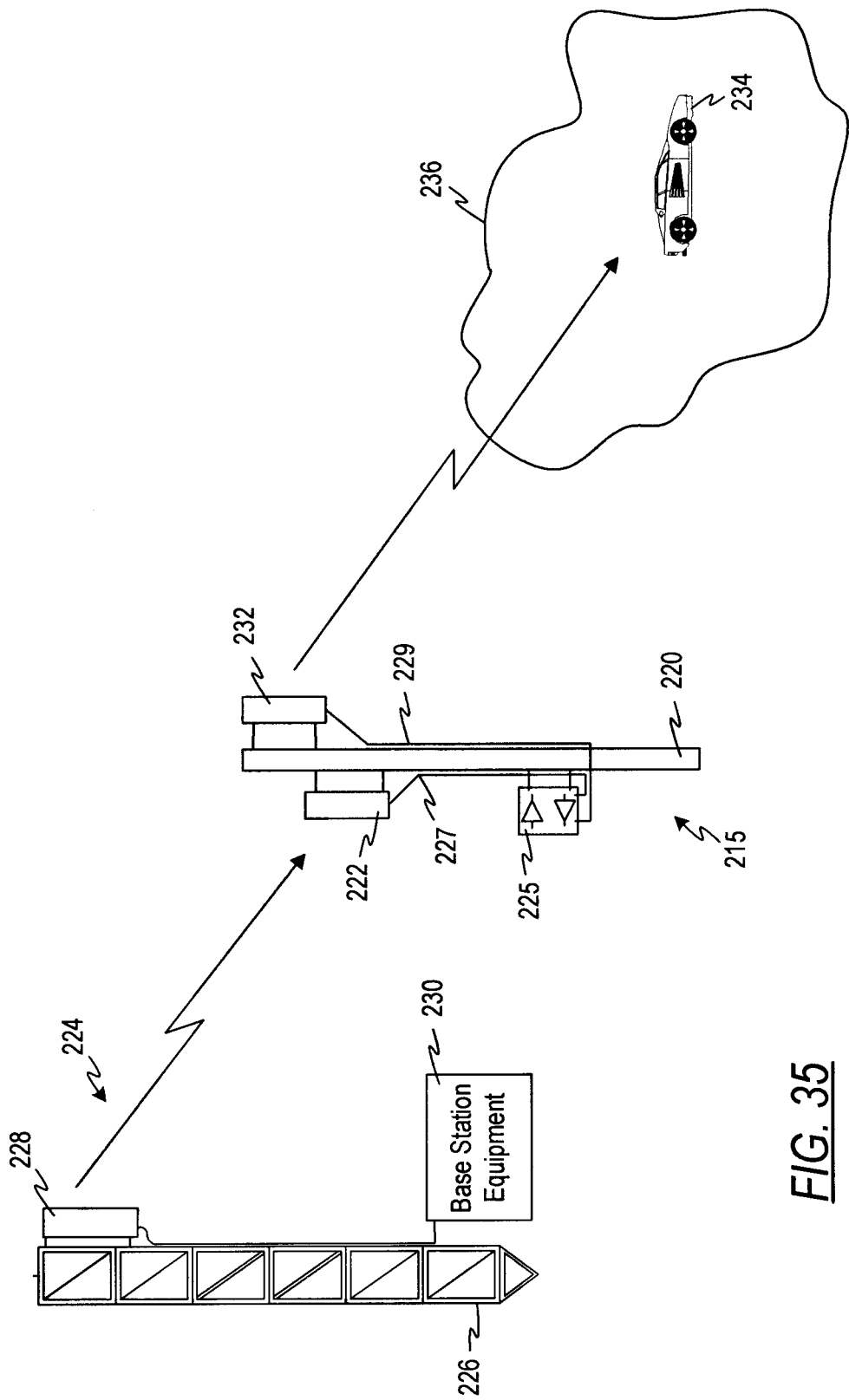
FIG. 35 is a simplified view of a repeater system of the prior art.

FIG. 35 illustrates a typical prior-art repeater implementation 215 residing on a mast or tower 220 and including a base-station-facing antenna 222 for exchanging signals with a base station 224 at a remote location. The base station 224 may include a tower 226, transmit and receive antennas 228 and base station equipment 230. A mobile-facing antenna 232 exchanges signals with the subscriber which may be a mobile subscriber as illustrated by an automobile at reference numeral 234. The antenna 232 may be designed, located and installed so as to provide coverage over a null fill area 236, as will be described below. The antennas 222, 232 are coupled with the repeater electronics 225 which is mounted elsewhere on the mast or tower 220 by runs of coaxial cable 227, 229.

Figure 36:
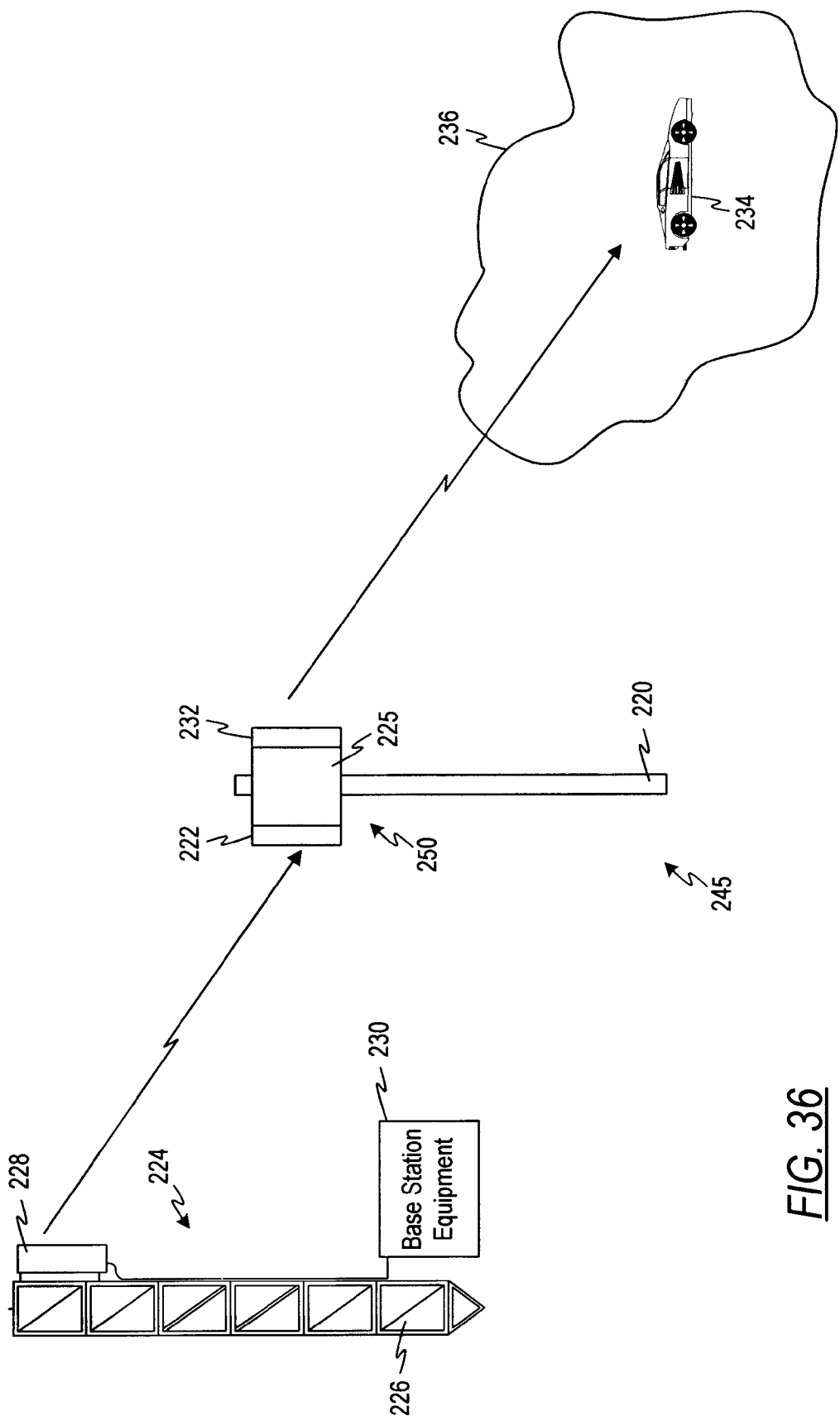
FIG. 36 is a simplified view, in a form similar to FIG. 35, showing a repeater in accordance with one embodiment of the invention.

Referring now to FIG. 36, a repeater implementation in accordance with one embodiment of the invention is designated generally by the reference numeral 245. Similar to the arrangement in FIG. 35, the repeater equipment is mounted to a mast or tower 220 and has a base-station-facing antenna 222 and a mobile-facing antenna 232. Similar to the arrangement in FIG. 35, the antenna 222 communicates with antennas 228 at the base station 224, and the antenna 232 communicates with user equipment which may be a mobile unit 234 with coverage being provided in a null fill area 236. Departing from the prior art, the repeater of the invention comprises an integrated repeater system in which the repeater electronics 225 are incorporated into a single unit or module 250 along with the two antennas.

Figure 37:
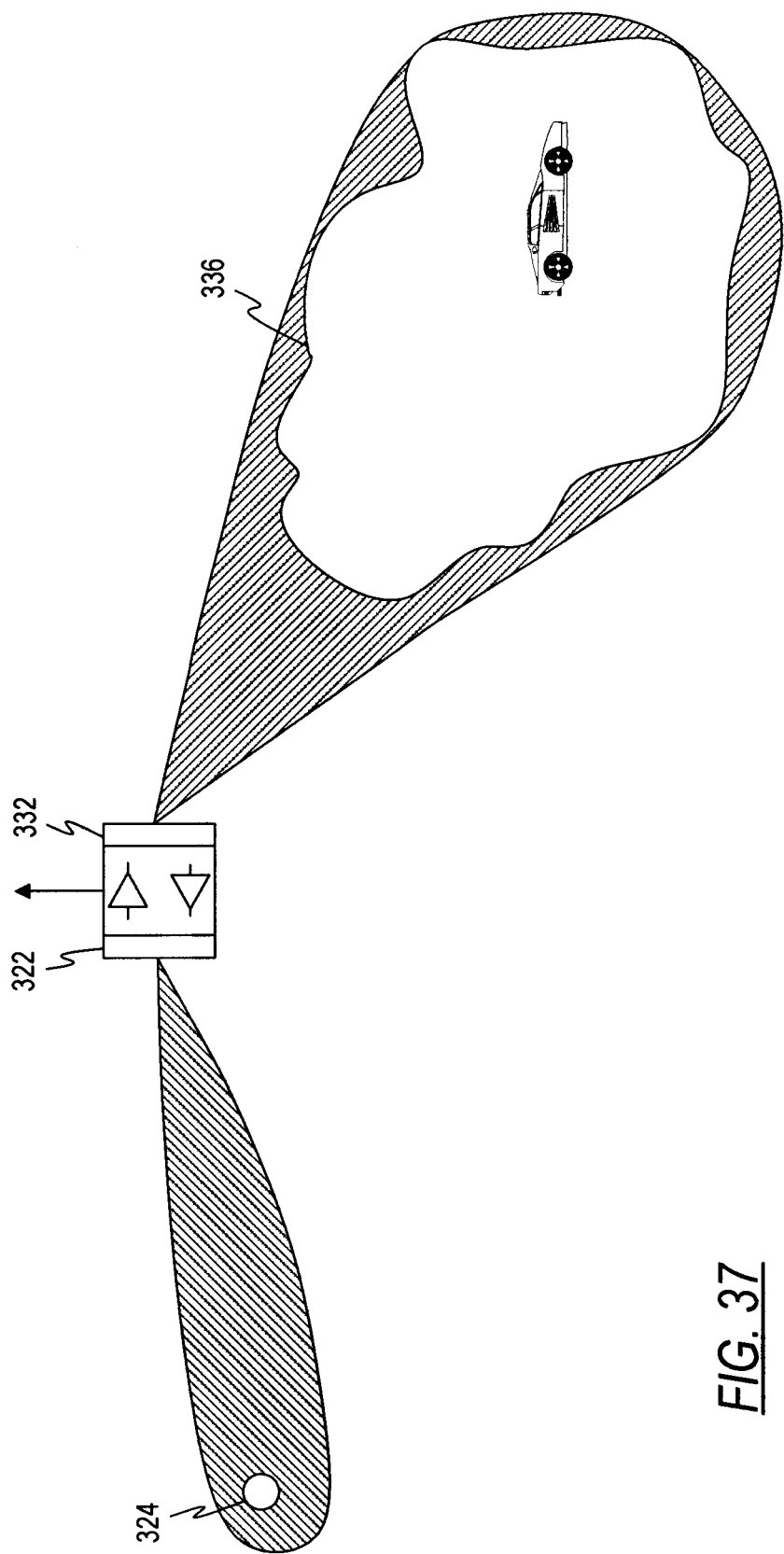
FIG. 37 is a diagrammatic illustration of beam steering in an integrated repeater system of the invention.

Often a major challenge for wireless service providers is getting access to an equipment site situated in an optimum location. As shown in FIG. 37, the direction from the base-station-facing antenna 322 of the repeater to the base station 324, and/or the direction of the mobile-facing antenna 332 to the null site 336 (i.e., the null fill area) is rarely at a right angle to the face of the donor or null antenna. In fact, this angle will vary significantly from site to site. To address this problem, one embodiment of the invention uses an antenna array with a beamformer network that can be programmed, e.g., from a look-up table. This allows the two antennas to be beam-steered toward the location of the base station and null sites.

Figure 38:
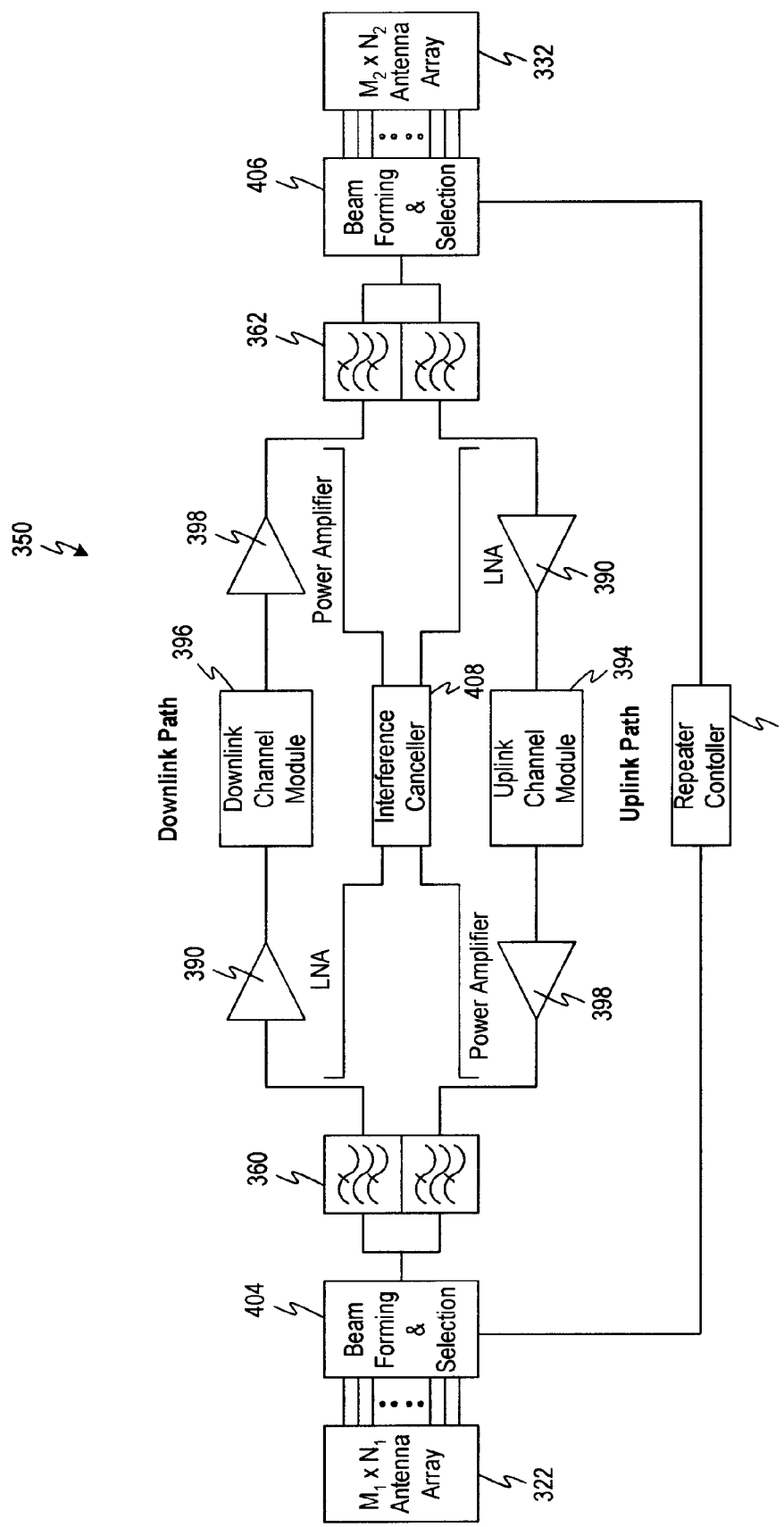
FIG. 38 is a block schematic diagram of one form of a repeater in accordance with the invention, utilizing a duplexed antenna.
Figure 39:
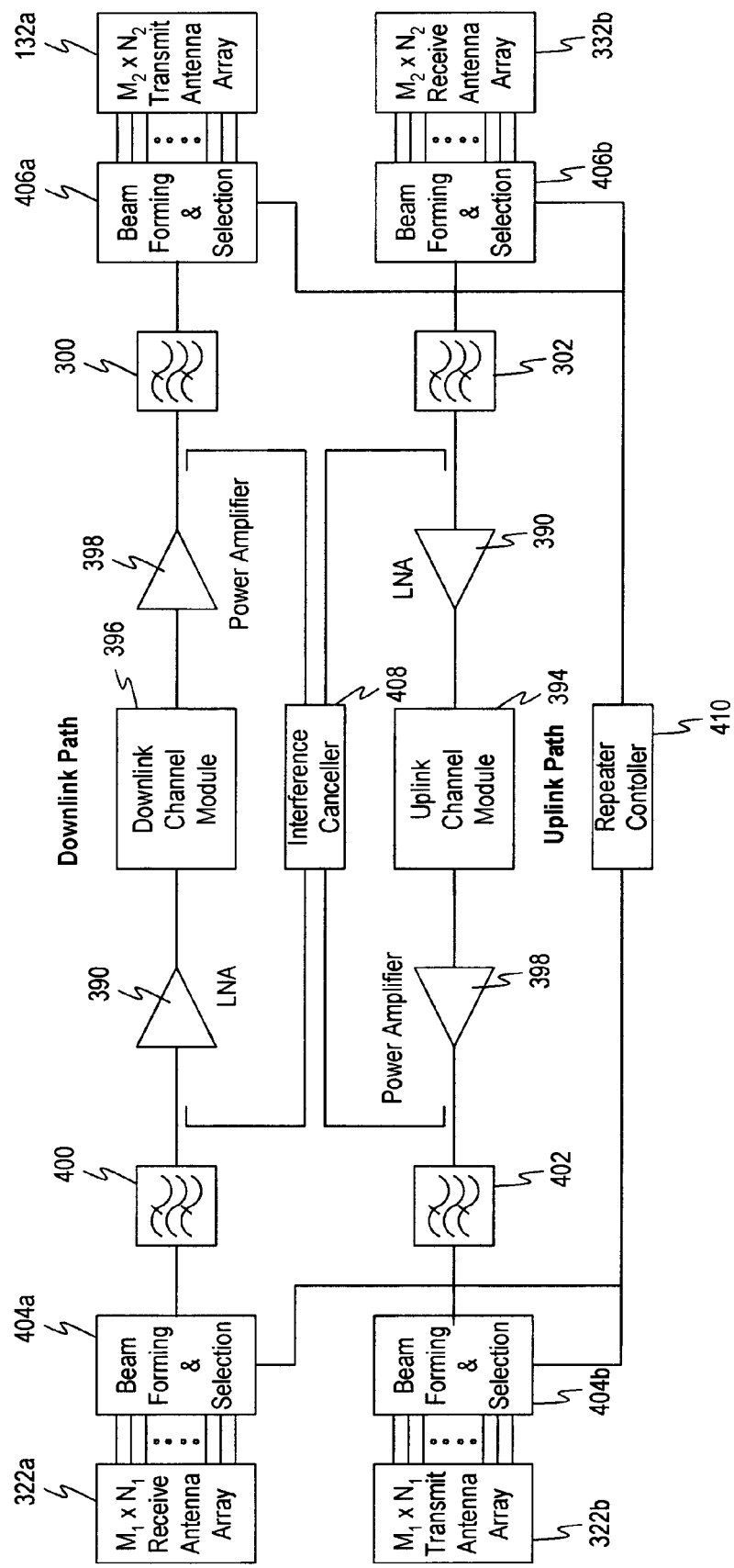
FIG. 39 is a block schematic similar to FIG. 38 but illustrating implementation with separate transmit and receive antennas.

The antennas and beamformer can be implemented in several ways. The block diagrams in FIGS. 38 and 39 show two possible implementations. FIG. 38 is an implementation that uses a common antenna for transmit and receive on each side of the repeater. FIG. 39 shows separate transmit and receive antennas 322a, 322b and 332a, 332b on each side of the repeater. The implementation of FIG. 38 uses duplex filters or diplexers 360, 362 to separate the downlink path and uplink path signals for processing by the repeater. This approach has the advantage that the total area on the side of the integrated repeater 350 can be utilized to accommodate a larger antenna array. However, this approach requires that the filters 360, 362, provide all of the isolation between the downlink path and uplink path of the repeater. FIG. 39 is an implementation that uses separate transmit (332a, 332b) and receive (322a, 322b) antennas and filters 400, 402, 406a and 406b. This approach also has the advantage of using the isolation of the two antennas to reduce the filtering requirements in the repeater. However, this approach may increase the area required for the antennas on the sides of the repeater.

The remaining repeater circuits may be implemented in a number of ways. The embodiments shown in FIGS. 38 and 39 use a channel-selective approach. In this approach, a Low Noise Amplifier (LNA) 390 amplifies the low-level signal from each of the antennas, and is a very quiet amplifier to ensure that a good signal-to-noise ratio is maintained in the repeater. After the LNA 390, the desired signal moves to a channel module, comprising an uplink channel module 394 in the uplink path and a downlink channel module 396 in the downlink path. In the channel module, the desired signal is downconverted to a lower intermediate frequency and filtered to limit the spectrum amplified by the repeater to a single channel or set of channels. The intermediate frequency is then upconverted back to the original frequency of the desired signal. The output signal of the channel module is then routed to a power amplifier 398 in each path to create a high level transmit signal. In FIG. 39, respective filters 400, 402 are provided between the LNA's and Power Amplifiers and associated beamforming and selection circuits 404, 406 (to be described below) for the donor and null antennas. Interference cancellers 408 are connected between the outputs of the power amplifiers and the inputs of the LNA's.

The invention may use a direct RF, offset RF, DSP, or GPS based repeater instead of the above-described channel-selective approach. Examples of DSP and GPS repeaters are shown respectively in copending U.S. patent application Ser. No. 09/460,023, filed Dec. 13, 1999 and Ser. No. 09/513,543, filed Feb. 25, 2000, which are incorporated herein by reference. A direct RF repeater performs all gain and filtering functions at the high frequency of the desired signal. An offset RF or frequency translating repeater is similar to a channel-selective repeater except that the upconversion of the intermediate frequency moves the signal to a new high frequency signal instead of the original frequency of the desired signal. This approach will minimize or eliminate the need for an interference canceller. A DSP repeater will still utilize an LNA and power amplifier, but the processing functions in the channel module are handled by digitizing the desired signal, performing the function digitally and then converting the digital signal back to an analog signal.

Figure 40:
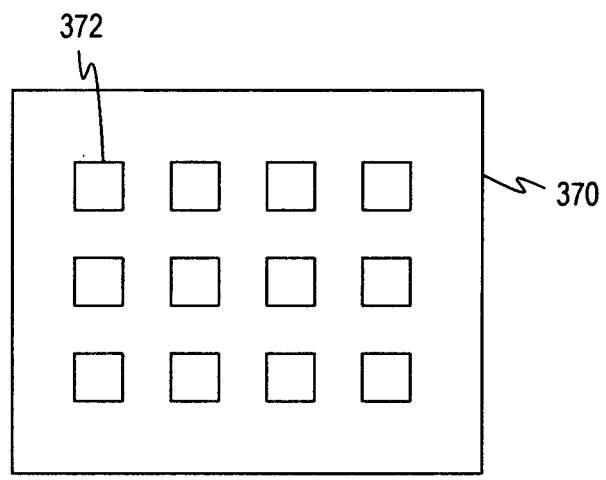
FIG. 40 is a simplified illustration of a patch antenna array.
Figure 41:
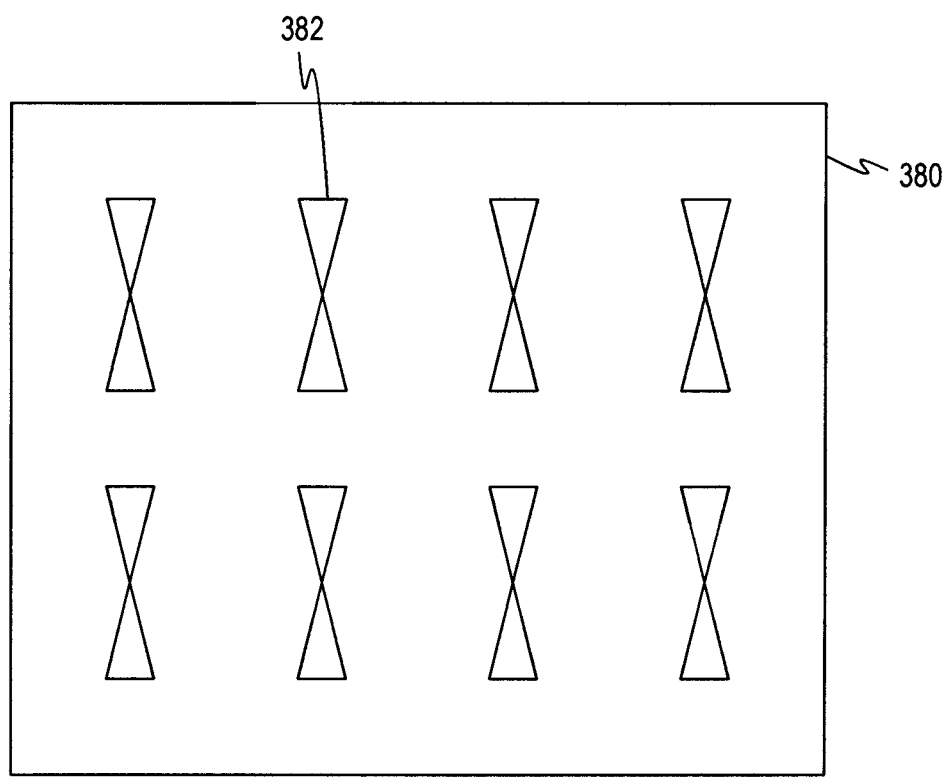
FIG. 41 is a simplified representation, in a form similar to FIG. 40, of a dipole antenna array.

As shown in FIGS. 40 and 41, the antennas 322 and 332 can be implemented using antenna arrays 370, 380. Each antenna array uses a row of M horizontally spaced elements to achieve the desired azimuth beamwidth and N vertically spaced rows of elements to achieve the desired elevation beamwidth. This invention may use many different types of antenna elements in the antenna array. Some examples include patch antennas 372 (FIG. 40) and bow-tie dipoles 382 (FIG. 41). FIG. 40 is an example of a patch antenna array 370 with M=4 and N=3. FIG. 41 is an example of a bow-tie dipole array 380 with M=4 and N=2.

The beamforming and selection networks 404, 406 and 404a, 404b, 406a, 406b in FIGS. 38 and 39, combine the antenna elements 372 or 382 in the antenna array 370 or 380 with appropriate phase and amplitude to create the desired antenna pattern. Several methods can be used to implement the beamforming and selection networks. One method of implementing this is to use an M×N Butler matrix to perform the phasing and combining functions. The angle and elevation of each beam is stored in a look-up table that the repeater uses to drive a diode or relay switch matrix to select the desired beam. This look-up table is stored in a memory of the repeater controller 410 in order to map the desired azimuth and program other parameters and matrix settings for use by the Butler matrix.

Figure 45:
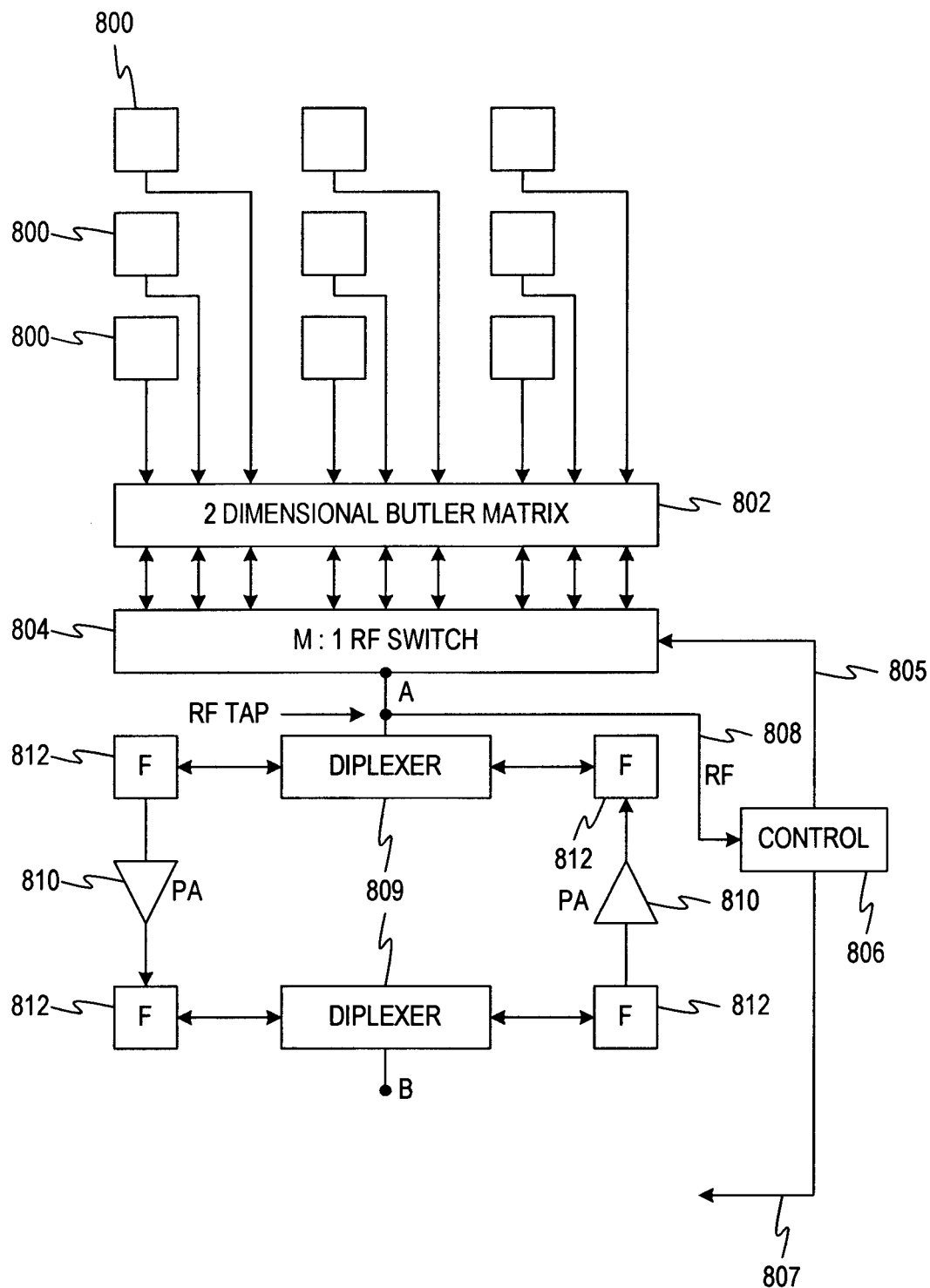
FIG. 45 is a functional diagram showing beamsteering via a Butler matrix.

One example of a Butler matrix for beamsteering is shown in FIG. 45. Here a plurality of antenna elements 800 are arranged in a 3 by 3 array. The antenna elements 800 may be patches such as 372 in FIG. 40, dipoles such as the dipoles 382 shown in FIG. 41 or another form of antenna elements. All the antenna elements 800 in the array are coupled with a two-dimensional Butler matrix 802. The two-dimensional Butler matrix 802 is in turn coupled with an M:1 radio frequency (RF) switch 804. In the illustrated embodiment, M=9, the total number of antennas 800 in the array coupled with the Butler matrix 802. The RF switch 804 is controlled by a controller or control circuit module 806 via a control output 805 which may also control other similar RF switches for the other repeater antenna array via an additional control output 807 as shown in FIG. 45. The controller 806 may be a part of the controller 410 of FIG. 38 or 39.

The controller 806 may be set to sequentially switch to the beams provided by the antenna 800 via the Butler matrix 802 and RF switch 804 to search for an optimal signal, such as the highest net power output. This is indicated in FIG. 45 by an RF connection 808 from the output of the switch 804 to an input of the control circuit 806 for monitoring the RF output. Other parameters might be used to control switching such as the lowest noise or some other measure of signal quality. Thus, in operation, the control circuit 806 switches antenna elements until an "optimum" signal output is located and then remains connected to the antenna element at which the optimal signal is received. RF circuits similar to that shown in FIG. 25 are located between the switch 804 and a similar switch (not shown) which is coupled in the same fashion indicated to a similar Butler matrix to select a beam from a similar antenna array (not shown) at the opposite side of the repeater. The control module 806 similarly controls this second RF switch coupled with an antenna array at the other side of the repeater via a control line 807. The second RF switch may be controlled by the control circuit 806 on the same basis, for example, on the basis of signal strength or some other measure of signal quality. The RF circuit includes respective diplexers 809 (where the respective antenna elements 800 perform both transmit and receive functions), power amplifiers 810 and filters 812.

A system of beamforming or beam selection other than a Butler matrix may also be utilized without departing from the invention. For example, the signal processor or controller 410 (e.g., in FIG. 38 or 39), in addition to its other functions, can be programmed and adapted to perform a continuous variable, essentially linear beamforming function by continuous adjustment of the N beams coming in with a variable phase and amplitude weighting being applied, to develop a single beam direction to correspond to the desired beam direction of either of the antennas for communicating with a base station or subscriber equipment. Various phase and amplitude settings can be prestored for a number of beams, for example N beams, each with a given directional characteristic or setting, from which the processor chooses the best match for a given situation.

Figure 46:
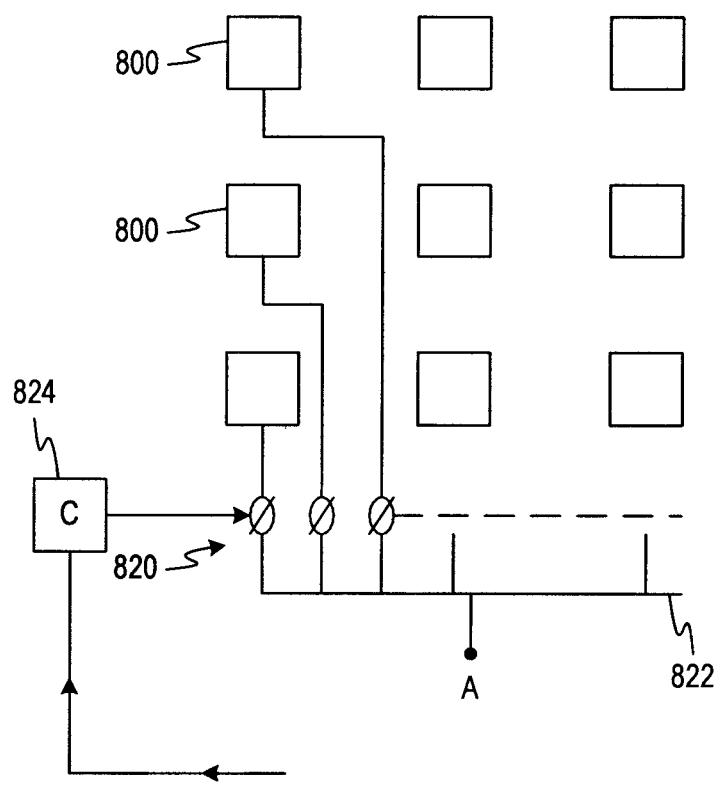
FIG. 46 is a simplified schematic diagram showing beamsteering using phase shifters.

Another method is to build the phasing and combining networks with variable phase devices in series with each antenna element. A look-up table of phase values for discrete angles and elevations is then used to create the desired beam. In FIG. 46, the antenna elements 800 in an N by N (e.g., 3 by 3) array are each coupled with a respective one of a plurality of phase shifters 820. The phase shifters are in turn coupled via a corporate feed 822 to an RF output A which may couple with the RF circuits as shown in FIG. 45. A controller 824 is provided to control all the phase shifters 820. The same arrangement is utilized for the antenna on the opposite face of the repeater.

The latter arrangements differ from the Butler matrix in that only one beam or directional output is developed or generated for a given requirement or situation or relative location. In contrast, in the Butler matrix, a total of N beams are available at all times with a switching network being utilized to select the one of these N beams best suited for a given situation or placement of the repeater tower relative to the base station and null fill area, respectively.

Figure 47:
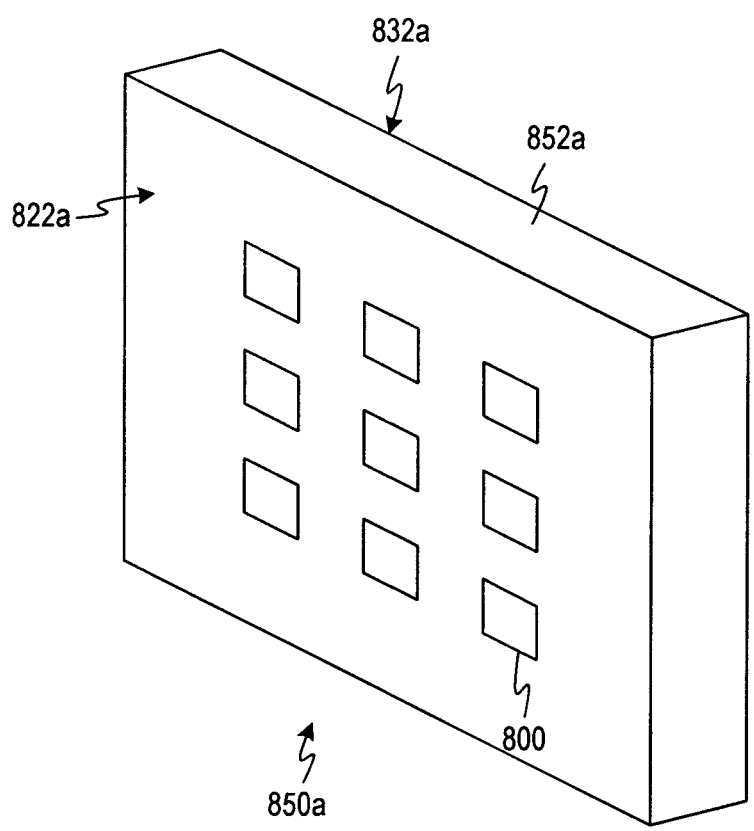
FIG. 47 is a perspective view of a flat-panel repeater design.

FIG. 47 illustrates the flat-panel approach to repeater construction using arrays of antenna elements. For relatively low power applications, a first face 822a may mount a plurality antenna elements 800 which may be patches, dipoles or other antenna elements. Similar antenna elements may be mounted in an array on the opposite face 832a. The relatively thin housing 852a between the two faces or surfaces 822a and 832a may house the electronics.

Figure 48:
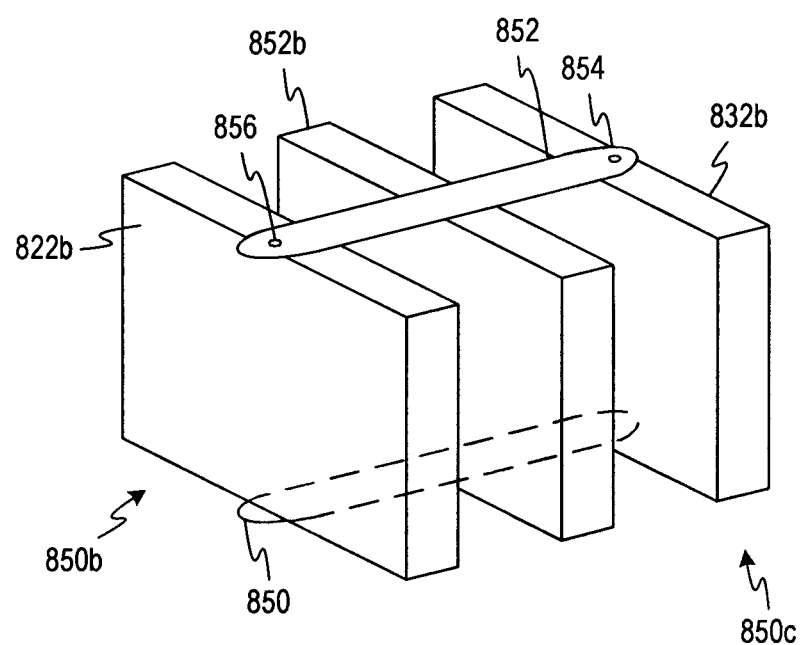
FIG. 48 is a perspective view illustrating a beamsteering scheme via tilting of flat panel arrays similar to the flat panel array of FIG. 47.

Referring to FIG. 48 in an alternate design, each of a pair of flat panels 850b and 850c mount antenna elements (not shown) only on their outwardly facing surfaces 822b and 832b. The two panels 850b and 850c are pivotally mounted to a pair of brackets 850, 852 or other support structure at pivot points 854 and 856 and aligned pivot points (not shown) at the bottom edges of the respective panels 850b and 850c. A separate electronics housing or enclosure 852b may be coupled with the brackets or other support structure 850 and 852 intermediate the two flat panels 850b and 850c. The beamsteering may be accomplished by tilting (or rotating) the respective panels until the maximum signal strength, or some other measure of signal quality is achieved.

Figure 49:
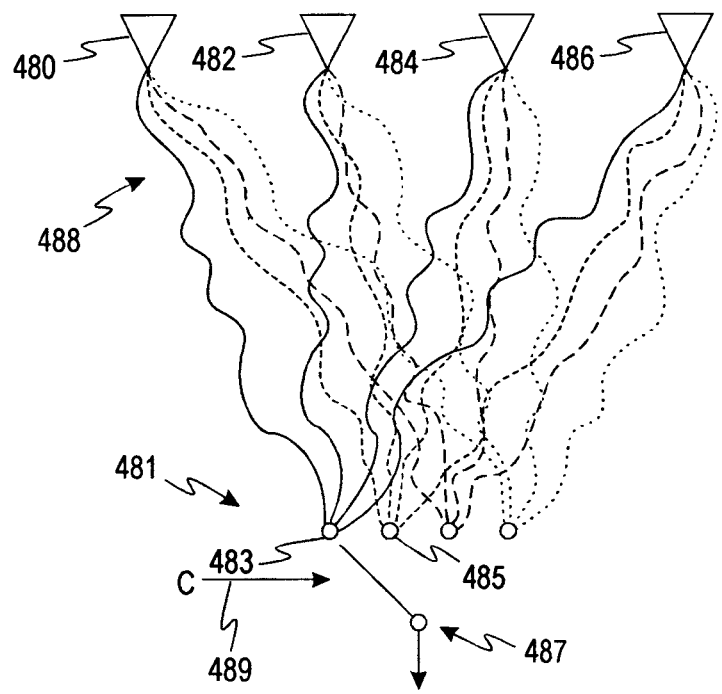
FIG. 49 and FIG. 50 are two diagrammatic representations of beamsteering using striplines of different lengths.
Figure 50:
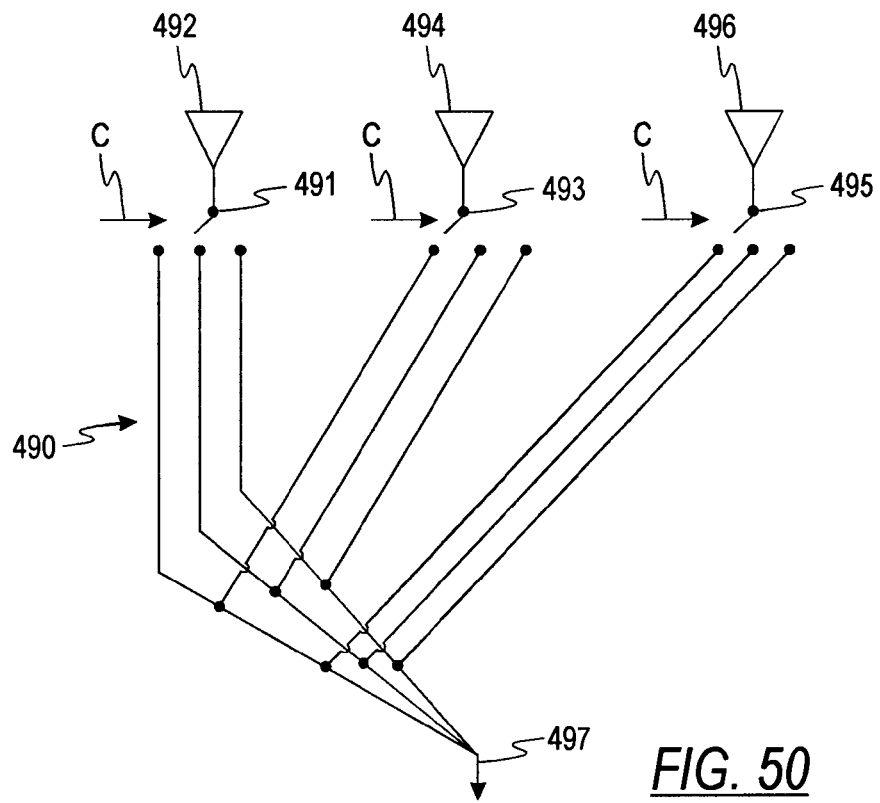

FIGS. 49 and 50 are simplified diagrams illustrating beamsteering via the use of various delay lengths by using striplines of different lengths on different layers of a multi-layer printed circuit board selectable by an RF switch (FIG. 49) or striplines of different lengths printed on the same circuit board and selectable via RF switches (FIG. 50). Thus, in FIG. 49, antenna elements 480, 482 and 484, 486 are each coupled to multiple striplines of different lengths, represented by various solid and broken lines designated generally by the reference numeral 488. All these lines 488 of various lengths are coupled together at radio frequency (RF) summers 481. That is, all of the lines 488 of a first length are coupled to one summer 483, all of the lines 488 of a second length are coupled to a summer 485, and so forth. A radio frequency (RF) switch 487 operated in response to a control signal on a control line 489 selects from among the lines of different lengths connecting the various antenna elements 480 to the summers 483, 485, etc. The control signal may be produced automatically in response to a measurement of signal strength or some other optimal signal quality, in order to accomplish beamsteering via the selection or adjustment of stripline length.

In the approach shown in FIG. 50, the selection of striplines 490 of varying length is accomplished at the antenna elements 492, 494, 496, etc. by respective radio frequency switches 491, 493 and 495. All these delay lines of varying length feed a common RF output 497. The delay line length for each antenna may be selected either independently or in unison with the selection of delay lines for other antennas, in response to suitable control signals (C) in much the same fashion as in FIG. 49, and/or, as described above, in response to detection of an optimal signal level or some other optimal signal quality measurement.

Typically, a repeater site uses the physical separation of the antennas to achieve enough isolation to allow the repeater to operate with gains of 60 to 95 dB. Because the antennas are located relatively close together in the flat-panel repeater, another approach is needed to achieve isolation. As described above, such an approach can include the use of radio frequency chokes in the enclosure between the antennas to reduce the coupling between the antennas, or the use of an adaptive interference canceller to provide additional gain and phase margin, as described above.

A limiting characteristic for repeaters is that of the feedback loop, or conversely, the isolation between the two opposing antennas (or sensors). That is, the total front to back (F/B) ratio for the system, or isolation, must be higher than the desired gain. Generally speaking, the isolation between donor and null antennas is equal to the total repeater gain plus some margin, typically around 10 to 15 dB. Therefore, the repeater gain will in general be less than the isolation minus the margin. For example, if the isolation between antennas is around 60 dB, then the maximum repeater gain allowed will be about 45 dB. For PCS frequencies, these figures may result in a repeater range of less than 100 feet.

In a scattering environment, which is common in PCS, every 6 dB of additional system gain will double the coverage distance. Thus, obtaining an additional 24 dB of isolation between the two antennas, will allow the range to double 4 times, to 1600 feet. For conventional repeater systems as in FIG. 35, where the two antennas and repeater electronics are in three separate enclosures, and locations, the donor antenna (to the base station) and null antenna (to the desired coverage area), are separated in space by (usually) more than 10 feet. This distance adds over 50 dB to the isolation between antennas, generating a total isolation value of well over 100 dB. Therefore, with a 15 dB margin, this type of system can utilize a total gain of up to 85 dB or more, which results in fairly large range and coverage.

For the integrated repeater of this invention, where the opposing antennas are in or on the same housing or enclosure, and separated in space by as little as a few inches, isolation is typically limited to a value below 80 dB or so. This therefore allows a total repeater gain of no more than 65 dB, which may limit the system range to a few hundred feet or less.

The adaptive cancellation approach removes a significant portion (between 10 dB and 40 dB) of the feedback signal power, therefore increasing the total system isolation by the same amount (10 to 40 dB). This additional isolation can be used to achieve greater repeater gain, and therefore significantly extend the range of the system. This is especially useful in the integrated repeater.

Isolation between the two sides of the repeater can also be improved by the use of different sized arrays of antenna elements on the mobile and base station sides to reduce the effect of multipath interference and decrease direct coupling between the two antennas. Thus, an N.times.M array of dipoles on the base station side of the repeater may be sized to provide high gain and a directive beam to limit reflections from nearby objects such as walls and ceilings. For example, a 2.times.2 array might be used. The array spacing may be chosen as a half wavelength at the center frequency of the frequency band being amplified and re-transmitted by the repeater, to produce a null in the array factor on the horizons, thus reducing the direct coupling between the antennas on opposite sides of the repeater. For the broader beamwidth desired on the other side of the repeater, to provide a large coverage area, a linear array of N dipoles may be used. This linear array produces a fan beam with increased directivity in the elevation plane, which acts to reduce the multipath interference due to reflections from nearby objects such as walls or ceilings. The dipole arrays are preferably implemented as twin-line-fed dipoles with tuning stubs for impedance matching. A coax-to-twin-line balun may be implemented with a smooth transition from a microstrip line to a twin line on the same substrate as the antenna and corporate feed, resulting in a compact, low-cost antenna. The dipoles are preferably polarized at a 45.degree. slant for optimum reception of signals of unknown polarization, with opposite slants on opposite faces of the repeater for maximum isolation. As an alternative, antenna elements may be provided on opposite sides of the repeater to produce circularly polarized radiation patterns, preferably of opposed polarities.

The microprocessor or controller (repeater controller) 410 provides the repeater control functions. This controller provides all setup, communications, and monitoring functions for the repeater. These functions include those related to setting the beamforming and selection functions to the desired beam, as mentioned above, and setting the amplifier gain and frequency of operation to the maximum usable gain for stability and the power rating of the repeater.

The controller's functions may also include monitoring of power levels at various points in the system, monitoring of the status of the devices in the system, for example for over-power, under-power, oscillation, etc. The controller may also include communication ports for communication with outside devices. For example, a local connection, such as an RS-232 port may be provided to communicate with a laptop computer which may be used in the field to exchange data with the controller, update data or program routines, or the like. A remote communication port or protocol may also be employed to enable communications with a network management system, through a local telephone company or wireless serial communication port, such as a data modem or TCP/IP (Transmission Control Protocol/Internet Protocol) or SNMP (Simple Network Management Protocol). In this regard the controller 410 may comprise a microprocessor with a UART (Universal Asynchronous Receive Transmit) to enable the desired communications and command structures and protocols.

Figure 42:
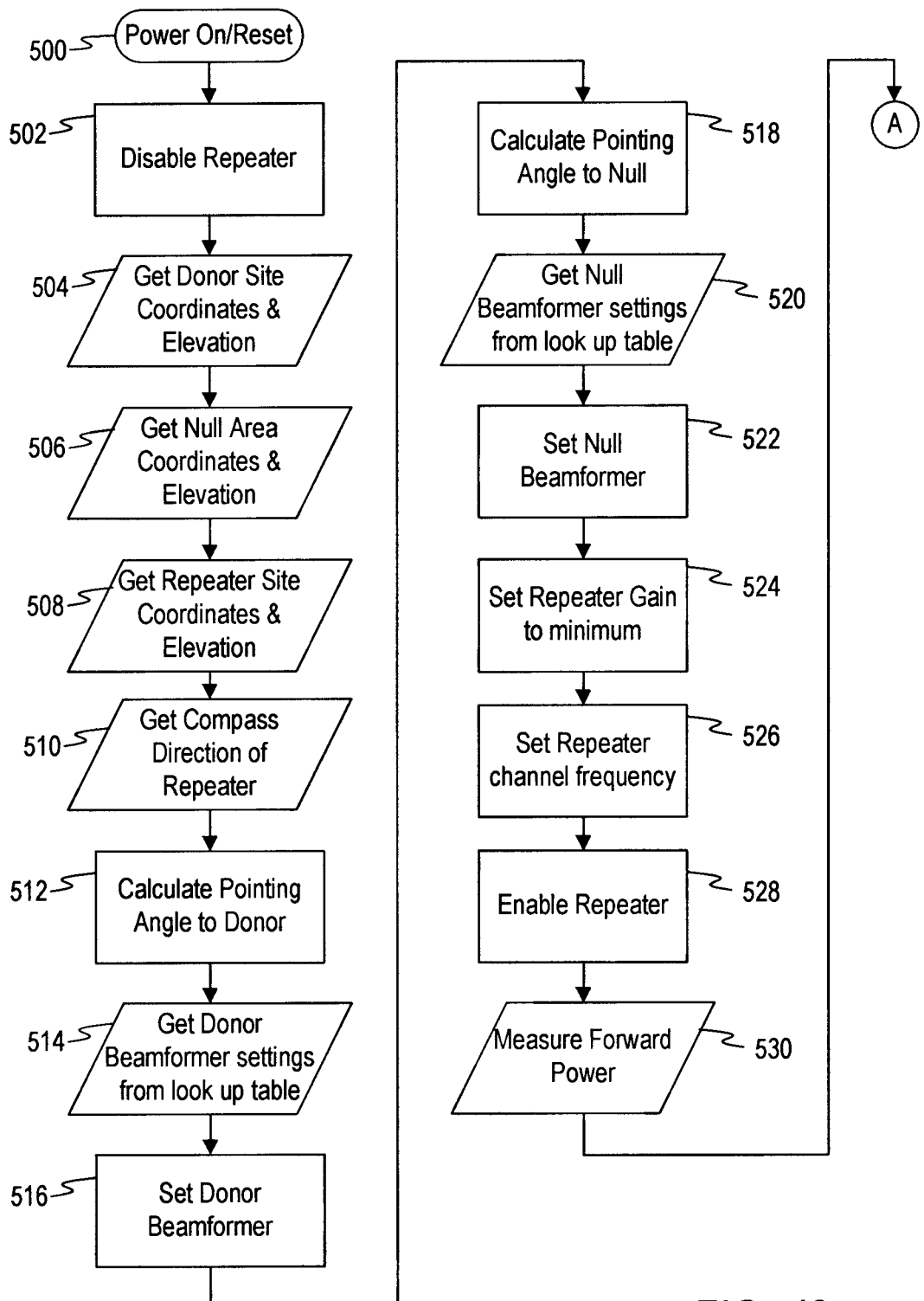
FIGS. 42 and 43 are flowcharts or flow diagrams of a repeater setup program in accordance with one embodiment of the invention.
Figure 43:
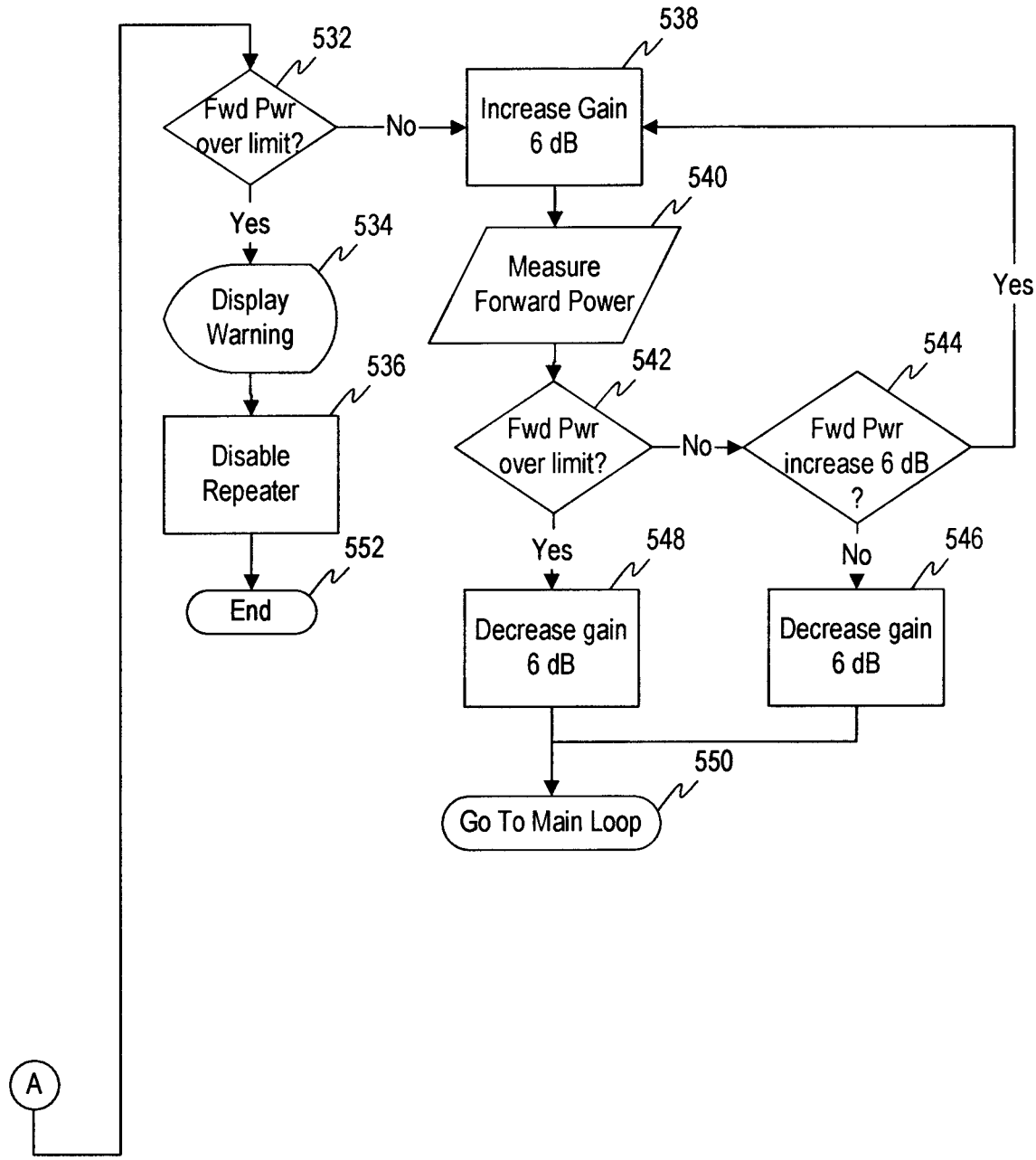

FIGS. 42 and 43 are software flow charts for the initialization of the repeater, which includes beam selection on the base-station-facing antenna and the mobile-facing antenna and the initial gain settings. The blocks in the flowcharts of FIG. 42 and FIG. 43 are as follows:

| Reference No. | Function |
| --- | --- |
| 500 | Power On/Reset |
| 502 | Disable Repeater |
| 504 | Get Donor Site Coordinates & Elevation |
| 506 | Get Null Area Coordinates & Elevation |
| 508 | Get Repeater Site Coordinates & Elevation |
| 510 | Get Compass Direction of Repeater |
| 512 | Calculate Pointing Angle to Donor |
| 514 | Get Donor Beamformer Settings From Look-Up Table |
| 516 | Set Donor Beamformer |
| 518 | Calculate Pointing Angle to Null |
| 520 | Get Null Beamformer Settings from Look-Up Table |
| 522 | Set Null Beamformer |
| 524 | Set Repeater Gain to Minimum |
| 526 | Set Repeater Channel Frequency |
| 528 | Enable Repeater 530 Measure Forward Power |
| 532 | Forward Power Over Limit? |
| 534 | Display Warning |
| 536 | Disable Repeater |
| 538 | Increase Gain 6 dB |
| 540 | Measure Forward Power |
| 542 | Forward Power Over Limit? |
| 544 | Forward Power Increase 6 dB? |
| 546 | Decrease Gain 6 dB |
| 548 | Decrease Gain 6 dB |
| 550 | Go to Main Loop |
| 552 | End |

Figure 44:
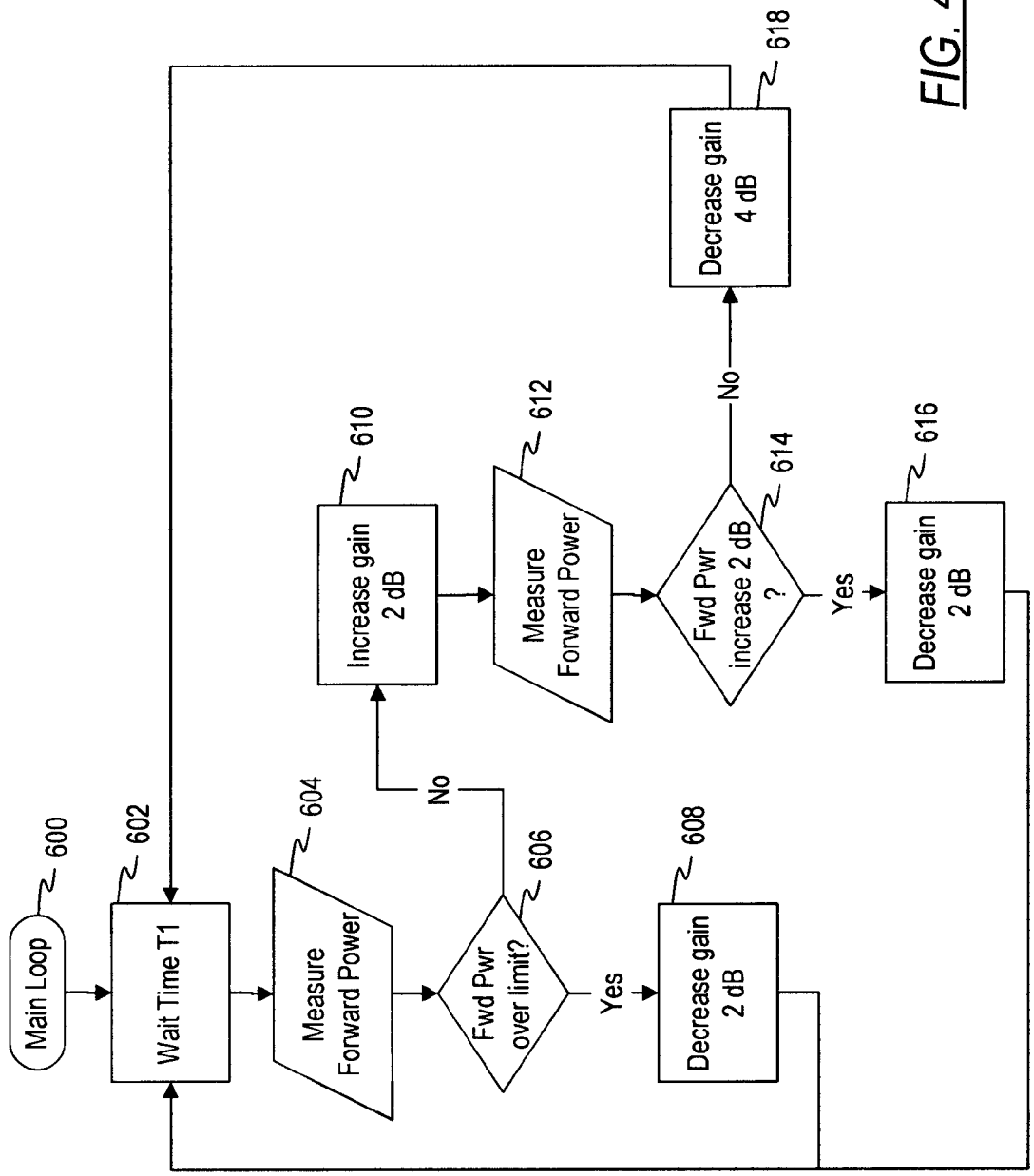
FIG. 44 is a flowchart or flow diagram of one embodiment of a repeater main operation loop.

FIG. 44 is a software flow chart for a main operational loop of the repeater control program, and includes only the functions related to auto gain control of the repeater. The blocks in the flow chart of FIG. 44 are as follows:

| Reference No. | Function |
| --- | --- |
| 600 | Main Loop |
| 602 | Wait Time T1 |
| 604 | Measure Forward Power |
| 606 | Forward Power Over Limit? |
| 608 | Decrease Gain 2 dB |
| 610 | Increase Gain 2 dB |
| 612 | Measure Forward Power |
| 614 | Forward Power Increase 2 dB |
| 616 | Decrease Gain 2 dB |
| 618 | Decrease Gain 4 dB |

The automatic gain control feature may also be used to monitor undesired feedback and adjust the gain of the appropriate signal amplifier(s) to prevent oscillation. An oscillation detector may also be included to monitor the current flow through the amplifier and produce a signal that can be used to shut down the repeater, or the appropriate circuits in the repeater, in the event that oscillation actually occurs.

Figure 51:
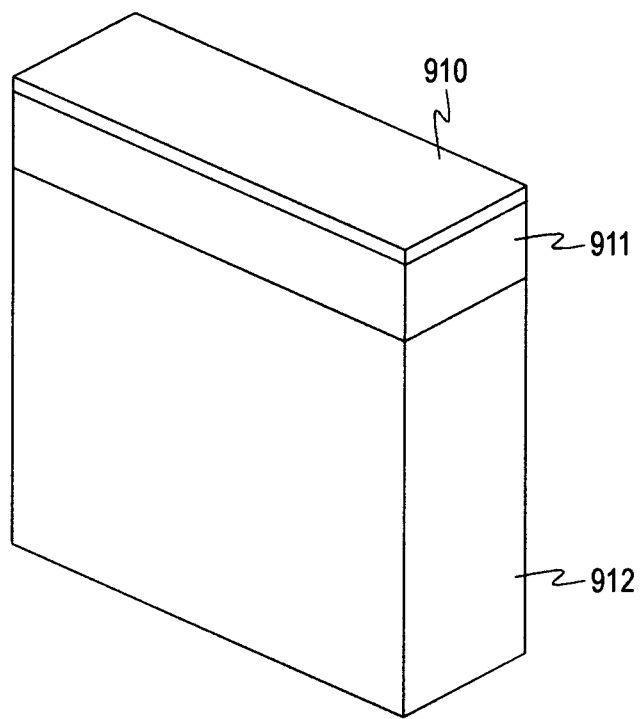
FIG. 51 is a perspective view of a solar-powered battery for a repeater.
Figure 53A:
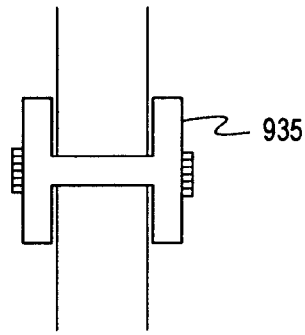
FIGS. 53-53g are diagrammatic illustrations of modified repeaters using physically separated antennas.
Figure 53E:
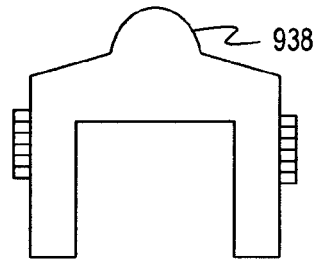
Figure 53B:
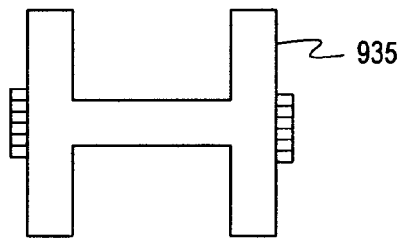
Figure 53F:
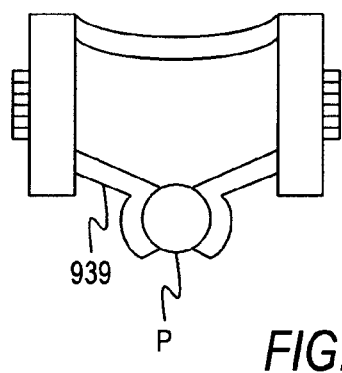
Figure 53C:
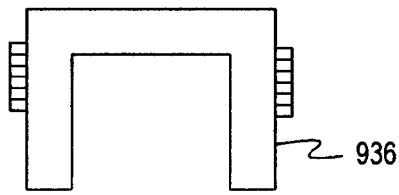
Figure 53D:
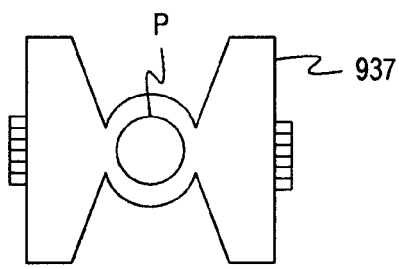
Figure 53G:
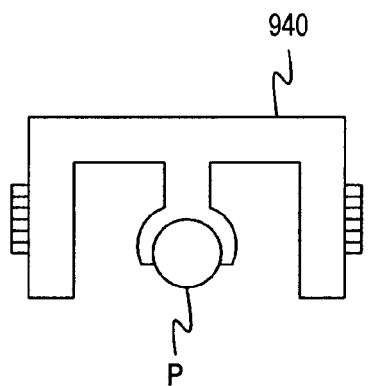

FIG. 51 shows a solar panel 910 with a battery 911 on a relatively thin, flat antenna 912 of the type described above. The addition of a "solar panel with battery" system allows the repeater to be installed in a location with sunlight, and therefore mitigate the requirements for an external (DC) power source. The system actually operates from the battery unit, which is occasionally (when the sun is up) re-charged from the embedded solar panel unit. This is an excellent application for spot coverage requirements for a repeater, where there is currently not a local power source or wiring. Additionally, it aids the installation of the unit indoors (assuming sufficient lighting, to recharge the batteries, where there is no local power plug). Lastly, it is more aesthetic, than requiring wire runs to the unit. Note that the solar panel can be on the top, sides, and/or the front face (with a hole for the patch antennas). The battery system is inside the unit; adjacent to the RF hardware (amplifiers, etc.).

In order to improve the front-to-back isolation between the two antennas of the repeater, the two antennas can also be physically separated from each other by a distance of at least several feet, as illustrated in FIG. 52. For example, separating the antennas by only 10 feet equates to a 40-dB propagation loss in the PCS frequency band. In FIG. 52, two separate antennas 921 and 922 of a repeater are mounted on the walls 923 and 924 at opposite ends of a room or space within a building and are interconnected by a coaxial cable 925 extending along or within the ceiling 926.

In FIG. 53, two separate antennas 931 and 932 are mounted on opposite sides of an exterior wall 933 of a building and are interconnected by a coaxial cable 934 extending through the wall 933. FIG. 53a illustrates an H-shaped repeater housing 935 that eliminates the need for the coaxial cable 934 in FIG. 53, and FIG. 53b illustrates an inverted-U-shaped housing 936 that accomplishes the same result. FIG. 53c illustrates a repeater housing 937 having a central section that not only spaces the two sides of the repeater from each other, but also is shaped to fit over a pole P to facilitate both the mounting of the repeater and the orientation of the antennas on the opposite faces of the repeater. That is, the repeater 937 can be simply rotated around the pole P to the desired angular position. FIG. 53e illustrates another form of inverted-U-shaped repeater housing 938, and FIGS. 53f and 53g illustrate two modified housing structures 939 and 940 adapted to be mounted on a pole P. The housing 939 comprises two sections joined by a coaxial cable 939a.

FIG. 54 illustrates an embodiment in which a pair of diplexers D1 and D2 and an amplifier A are integrated with each of the two antennas 941 and 942 for simultaneous transmission of bidirectional signals between each antenna and a common interconnecting coaxial cable 943. Alternatively, all the electronics can be integrated with just one of the antennas to further simplify the hardware and reduce the number of diplexers required.

Instead of connecting the physically separated antennas via coaxial cable, the physically separated antennas can be coupled wirelessly, using either RF or infrared wireless coupling. The signals arriving at the two antennas from outside the repeater are converted to a different frequency for the local transmission between the two antennas within the repeater, to avoid interference with signals within the system band and thereby improve the total system gain.

Figure 55:
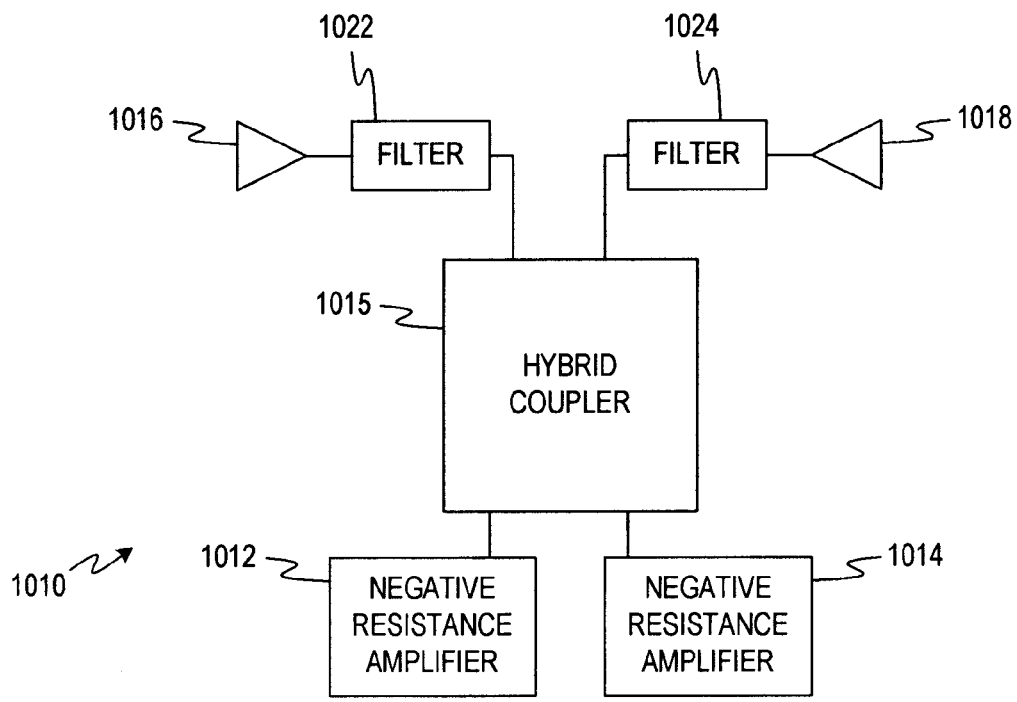
FIG. 55 is a functional block diagram of a single repeater cell of a side-to-side repeater for a TDD communication system in accordance with one form of the invention.
Figure 56:
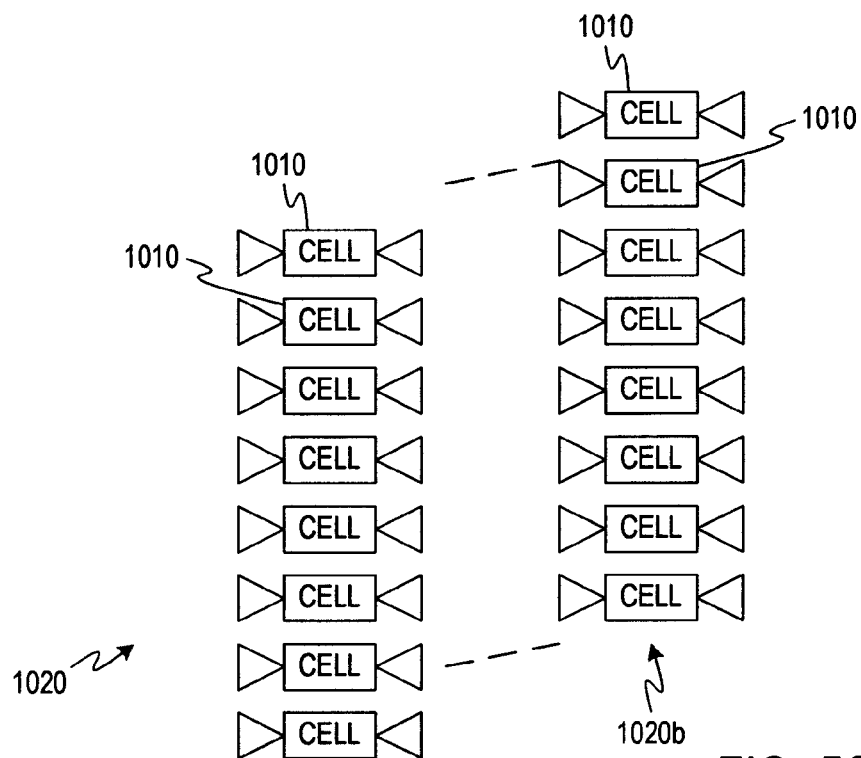
FIG. 56 shows in diagrammatic form multiple cells having the general configuration shown in FIG. 55.

Referring to FIG. 55, within a repeating device 1010, individual low gain amplification devices (e.g., negative resistance amplifiers 1012, 1014) that separate input and output signals by their direction of propagation can be connected in circuit with directional antennas 1016, 1018 to provide low gain, short range repeating devices or "repeating cells" 1010. In FIG. 56, numerous such repeating cells 1010 are arranged in a parallel fashion within a repeater 1020 such that in the direction of propagation, the signals of all the devices add. Thus, the total gain of the repeating device 1020 is the additive gain of all the individual repeating cells 1010. This device includes a pair of repeaters 1020 and 1020b, each constructed of multiple cells 1010 of the type shown in FIG. 55. The two repeaters 1020 and 1020b may be connected in a "daisy chain" configuration, with one repeater 1020 passing a signal to and/or receiving a signal from the other repeater 1020b. In practice, these two repeaters are located considerably farther apart than indicated in the somewhat simplified diagram of FIG. 56.

In each cell 1010, a hybrid coupler 1015 (FIG. 55) functions to separate the incoming signal from the outgoing signal. Filters 1022 and 1024 are also provided between the hybrid coupler 1015 and the antennas 1016 and 1018, respectively. The practical isolation of the hybrid coupler is 15-20 dB, which limits the maximum gain of the negative resistance amplifier to 6-15 dB. Useful repeater range typically requires 50 to 60 dB total gain. The directive antennas 1016, 1018 can provide 19 dB gain each, and thus each cell can have a gain of as much as 53 dB (19+19+15). Accordingly, the construction of a repeating device or repeater using a plurality of such cells in parallel is capable of providing considerable gain.

Figure 57:
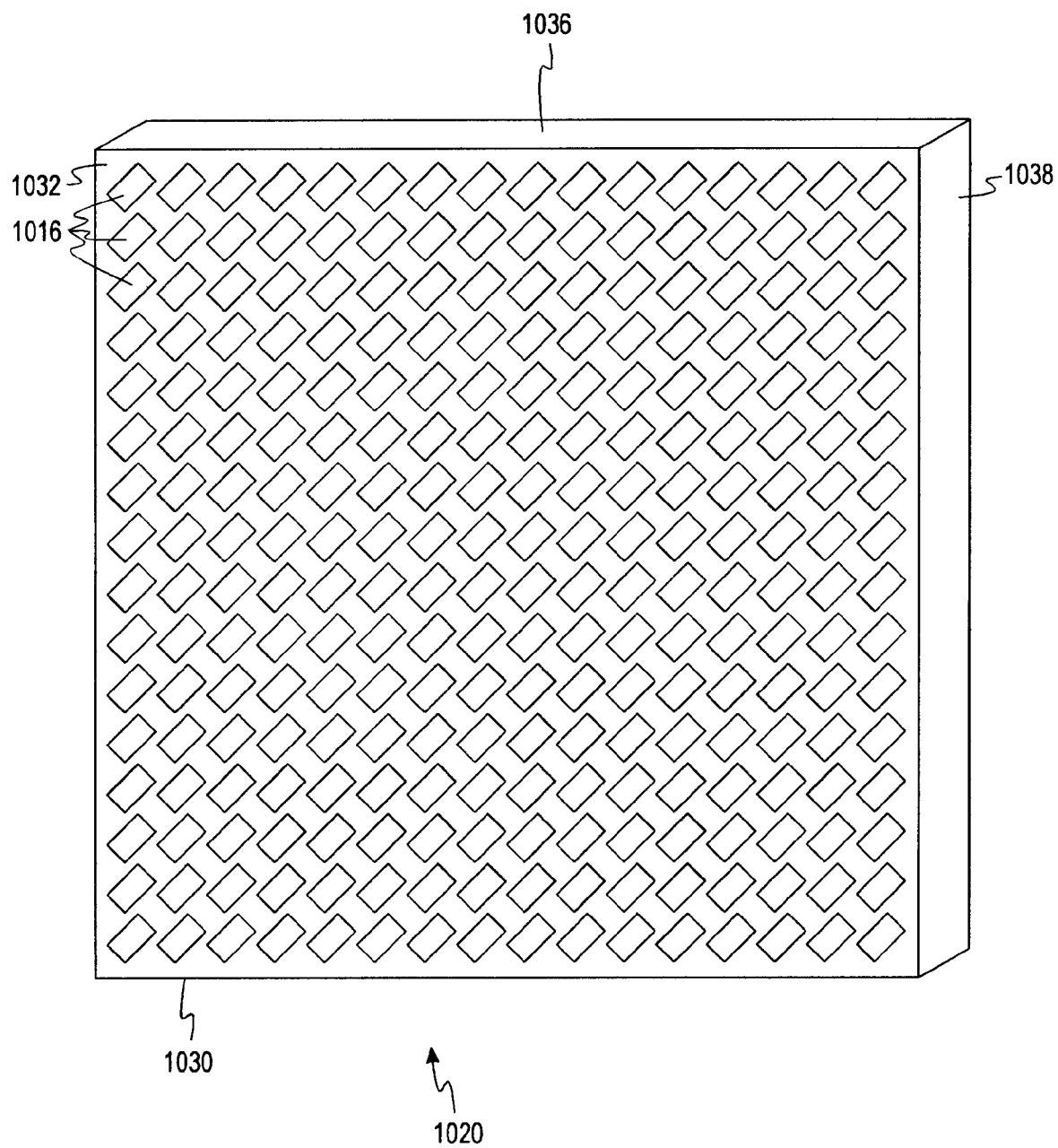
FIG. 57 is a somewhat diagrammatic view showing a repeater in accordance with one form of the invention.

Moreover, it is possible to construct an individual cell of the generalized configuration of FIG. 55 with adequate repeater gain to meet the typical gain requirements of a useful repeater. The antennas 1016, 1018 can each be a 16 element (4.times.4) flat-panel array. Based on this approach, FIG. 57 shows one embodiment of the invention in which the repeater 1020 is configured in the form of a rectilinear box housing 1030, having opposed square (or rectangular) faces 1032 and shorter connecting sidewalls 1036, 1038. Radiating elements, such as a patch element 1016 for each cell 1010, are arrayed on faces 1032. The specific shape of the housing may be different from that shown.

Figure 58:
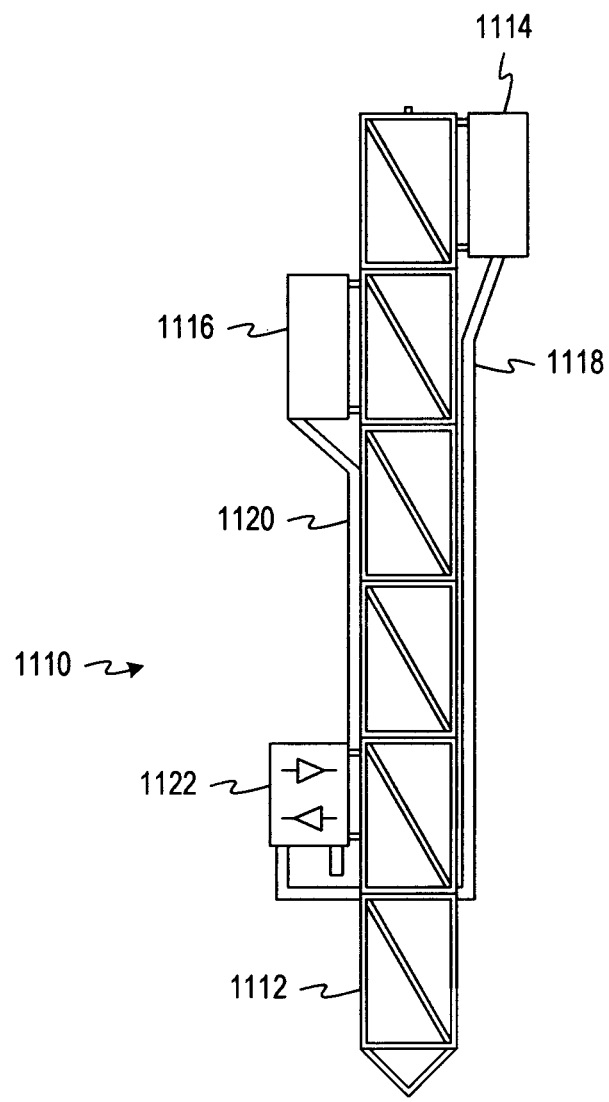
FIG. 58 is a simplified elevation showing a repeater tower structure in accordance with one embodiment of the invention.

Referring now to FIG. 58, a repeater diversity system in accordance with a further aspect of the invention is employed in a repeater system 1110 mounted on a tower 1112. At the top end of the tower 1112, a mobile-facing antenna 1114 and a base-station-facing antenna 1116 are mounted facing in generally opposite directions. Appropriate feeds such as coaxial cables or other suitable feedlines 1118 and 1120 respectively run from the antennas 1114 and 1116 to an electronics enclosure 1122 located at a lower part of the tower 1112, in which the repeater-associated electronic circuitry is located, which circuitry will be further described in connection with FIG. 59. The antenna 1114 generally broadcasts and receives signals relative to a remote user location or subscriber equipment. This subscriber equipment may be mobile equipment such as in a cellular or PCS system, or the like. Thus, the signal source received by the antenna 1114 from the remote equipment may be a mobile signal source. The antenna 1116 transmits and receives signals relative to a base station at some remote location. The repeater electronics 1122 boosts the signals as they are passed between the two antennas, to enhance the communications between the remote source and the base station.

Figure 59:
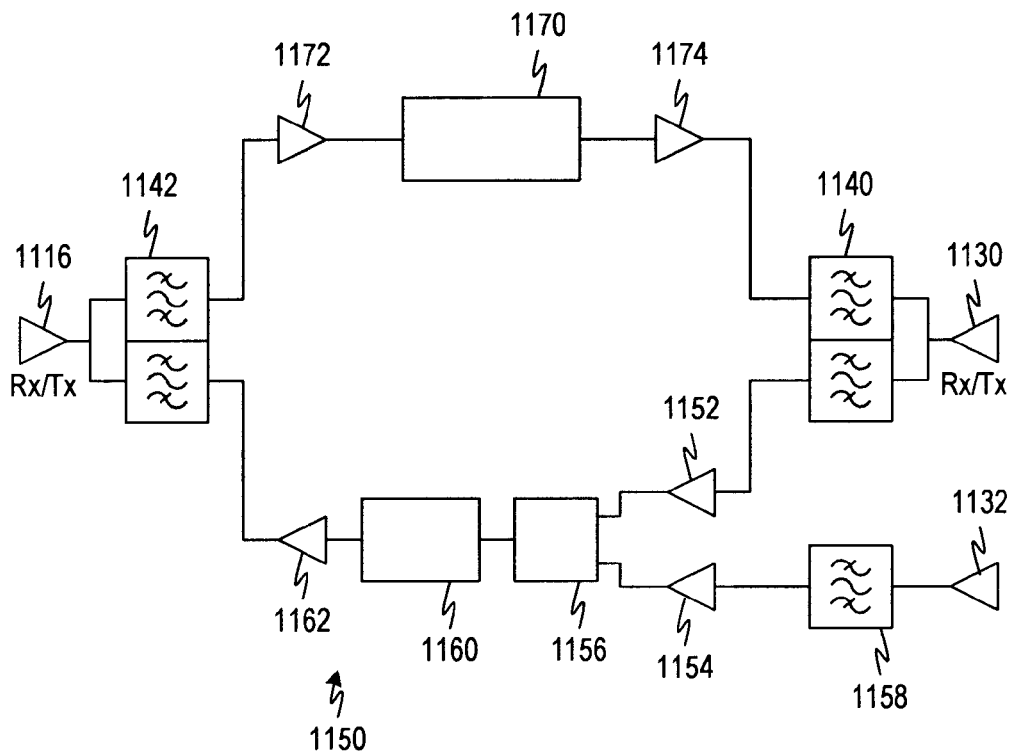
FIG. 59 is a circuit schematic illustrating a diversity repeater system in accordance with one embodiment of the invention.
Figure 61:
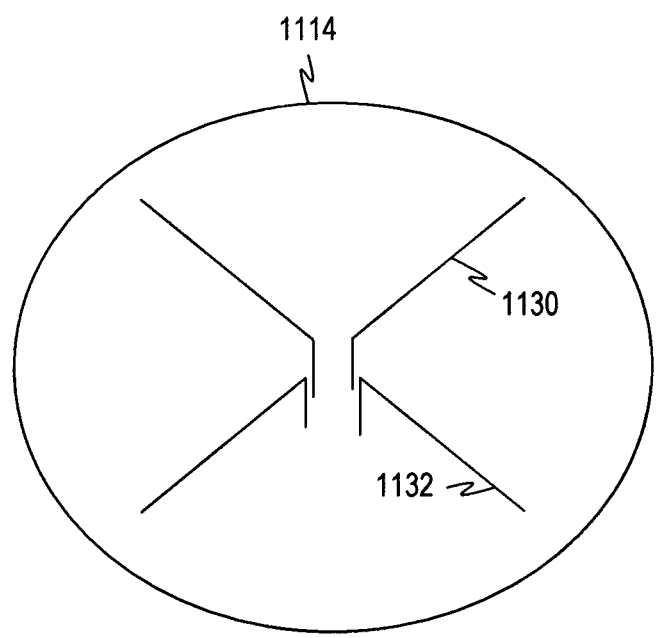
FIG. 61 is a simplified showing of two antennas having the same phase center and mutually orthogonal polarizations.

As shown in FIG. 59, the antenna 1114 includes a main antenna 1130 and a receive (Rx) diversity antenna 1132. In one embodiment, these two antennas 1130 and 1132 are arranged to have the same phase center but mutually orthogonal polarizations (see FIG. 61). By using this arrangement, the problem of location-induced phase variation is substantially eliminated. This fact can be used to overcome the complications in differential phase variation of the main and diversity signals of a mobile signal source, when the signal source is moving over time relative to the repeater location.

In the illustrated embodiment, the main mobile-facing antenna 1130 and the base-station-facing antenna 1116 serve to both transmit and receive signals relative to the remote or subscriber equipment and the base station, respectively. Accordingly, each of these antennas is provided with a frequency diplexer 1140, 1142 to accommodate the use of different frequency bands in the uplink and downlink channels.

Referring first to the uplink channel 1150, it will be seen that the receive signals from the main and Rx diversity antennas 1130, 1132 are fed through respective low noise amplifier (LNA)/attenuator circuits 1152, 1154 and combined at a combining network 1156. In one embodiment the combining network combines these signals with a fixed phase adjustment. The incoming signal from the Rx diversity antenna 1132 is initially processed by a suitable filter 1158. The combined signal from the combining network 1156 is further processed by an uplink channel module 1160, amplified by a power amplifier 1162, and fed to the donor antenna 1116 via its associated diplexer 1142. In accordance with one embodiment of the invention, the signals from the main and Rx diversity antennas 1130, 1132 are combined at the combining network 1156 with equal gain from the low noise amplifiers 1152, 1154. In the illustrated embodiment, the signals from the antennas 1130 and 1132 are aligned in phase by the combining network 1156 and uplink channel module 1160, in addition to being combined with equal gain settings on each path.

Completing the electronics 1122, a downlink channel module 1170 receives signals transmitted from the base station via the antenna 1116 and its associated frequency diplexer 1142, which signals are first amplified by a low noise amplifier (LNA)/attenuator 1172. The output of the down link channel module 1170 is fed through a power amplifier 1174 to the diplexer 1140 for transmission by the main antenna 1130.

Typically, each channel module includes an upconverter, a filter, and a downconverter. Some gain may also be provided. Suitable channel modules are made by Andrew Corporation, the assignee.

In the system of the invention as described above, the two antennas 1130 and 1132 provide two separate versions of the receive signals from the remote or subscriber equipment with statistically independent multipath characteristics, since the vertical and horizontal field components in a communications link are highly uncorrelated. By using receive antennas 1130, 1132 that have the same phase center and mutually orthogonal polarizations, differential phase variations induced by the changing location of a mobile remote source are substantially eliminated. This overcomes the usual challenge of equal gain combining which requires that the two diversity paths be aligned in phase, since phase alignment would normally be made difficult by the changing location of the mobile signal source.

Advantageously, the invention makes possible the implementation of receive diversity in a repeater being used in a wireless communication system. The implementation of receive diversity in a repeater is not limited to a single type of system (e.g., CDMA) but could be implemented for any digital-or analog-based wireless communications system. The invention provides, on average, a 2.5 to 3 dB increase in the average carrier-to-noise ratio of the received signal.

Figure 60:
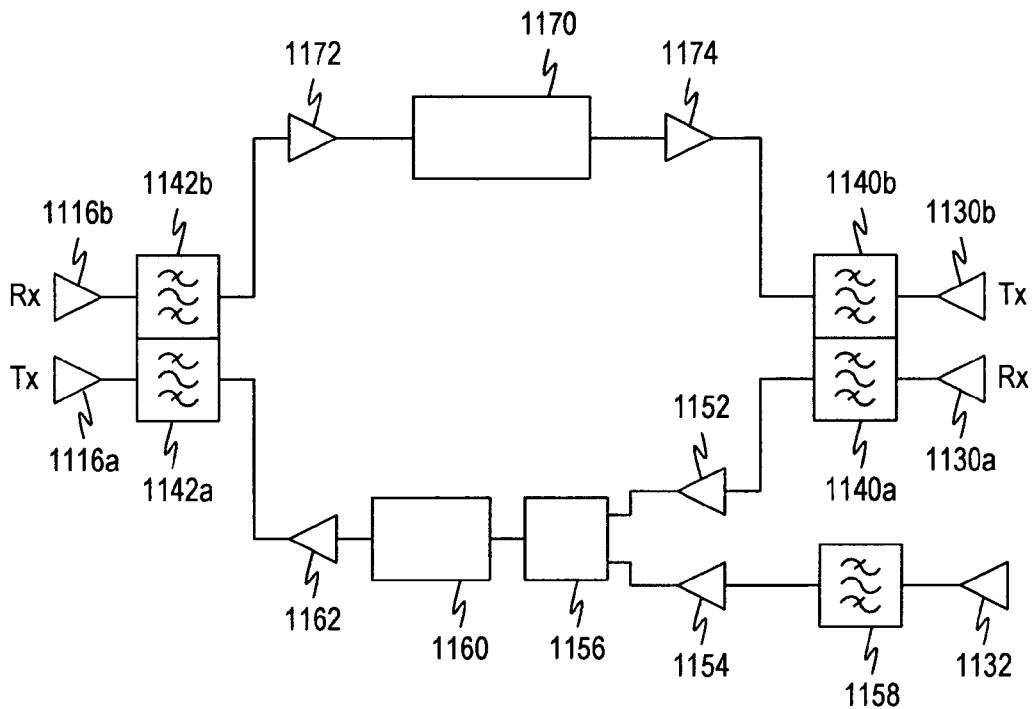
FIG. 60 is a circuit schematic illustrating a diversity repeater system in accordance with a second embodiment of the invention.

Rather than a single main mobile-facing antenna and a signal base-station-facing antenna as described above, with frequency diplexers, the repeater may employ separate transmit and receive antennas on both sides, utilizing separate signal paths in amplification therebetween. Such an arrangement is shown in FIG. 60. In this case, the signal from the main receive antenna 1130*a* combined with the signal from the receive diversity antenna 1132 at the combiner 1156, after bandpass filtering at filters 1140*a*, 1158 and equal gain amplification at LNA's 1152, 1154.

In the case of separate transmit and receive base-station-facing antennas, an LNA 1172 receives signals from the antenna 1116*b* which it transmits through a down link channel module 1170, power amplifier 1174 and bandpass filter 1140*b* to the antenna 1130*b*. Similarly, the main mobile-facing receive antenna 1130*a* delivers received signals to an LNA 1152 (after bandpass filter 1140*a*), which, upon being combined with signals from the Rx diversity antenna 1132 at a combining network 1156 and processed at an uplink module 1160, are delivered via a power amplifier 1162 and transmit bandpass filter 1142*a* to a transmit antenna 1116*a* for transmission to the base station.

In one specific example of a CDMA repeater system, the uplink module 1160 employs a channelizer having a gain of about 24 dB or greater for an uplink path channel in a frequency range from 1850 to 1910 MHz. Similarly, the downlink module 1170 utilizes a channelizer having a gain of at least 24 dB for a downlink path channel in a frequency range of 1930 to 1990 MHz. In this embodiment, the gain of the low noise amplifiers 1152 and 1154 is 33 dB or greater, and the gain of the power amplifiers 1162 and 1174 is 43 dB or greater.

Figure 62:
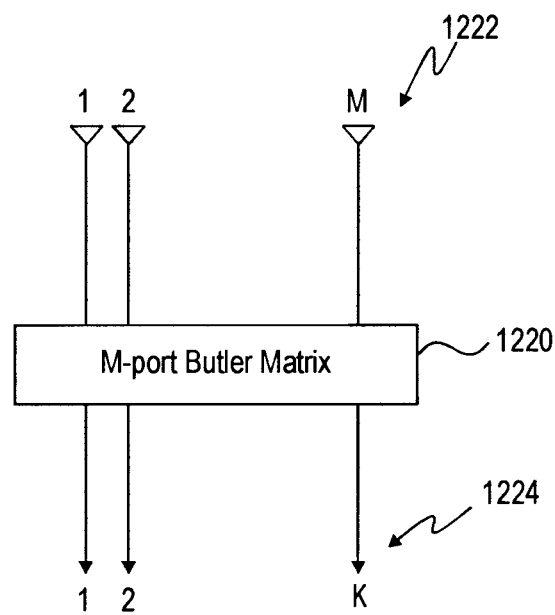
FIG. 62 is a block diagram showing a plurality of antenna elements coupled to an RF Butler matrix.

FIG. 62 is a block diagram showing the use of a typical RF Butler matrix 1220. These devices are used in analog communication to generate multiple antenna beams, from a composite antenna system having a plurality of antenna elements 1222. Butler matrices can be purchased complete, or generated from a composite circuit of 90 degree hybrids and RF summer circuits. In FIG. 62, a total of M antennas, each with similar characteristics, are used as the input to the Butler matrix. The Butler matrix device then generates K unique RF (analog) outputs 1224, each for a respective beam direction.

Equation (1) below is a general empirical equation (model) for an M-point Discrete Fourier Transform (DFT). This type of transform is normally used in digital technologies to derive the frequency response, X(k), for a series of time domain inputs, x[i]. For example, a Fast Fourier Transform (FFT) is simple a radix-2 DFT. Thus, the FFT (or DFT) transforms the time domain response into a frequency domain response.

$$X(k) = \frac{1}{M} x[i] e^{-j(\frac{2\pi}{M})k(i-1)} \quad (1)$$

$$j = \sqrt{-1}$$

Similarly, the Butler matrix acts as a transform from the spatial response, x[i], to the sectored (or beam) space response, X(k).

Figure 63:
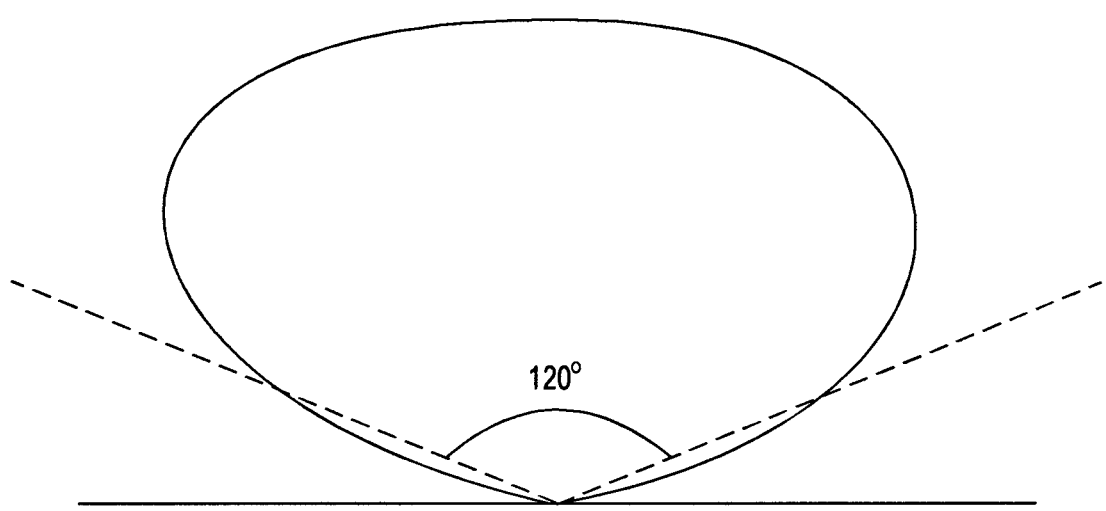
FIG. 63 shows an example of a beam pattern for one of the spatial (antenna) elements of FIG. 62.

FIG. 63 shows an example of a beam pattern for one of the spatial elements (or antennas) 1222 from FIG. 62. Each antenna has a 120 degree sector beamwidth, or Half Power Beam Width (HPBW). The base-station-facing antenna preferably has a narrower half power beamwidth than the mobile-facing antenna. For example, the beamwidth of the base-station-facing antenna is typically about 30 degrees, plus or minus 5 degrees, while the beamwidth of the mobile-facing antenna is about 60 degrees, plus or minus 10 degrees.

Figure 64:
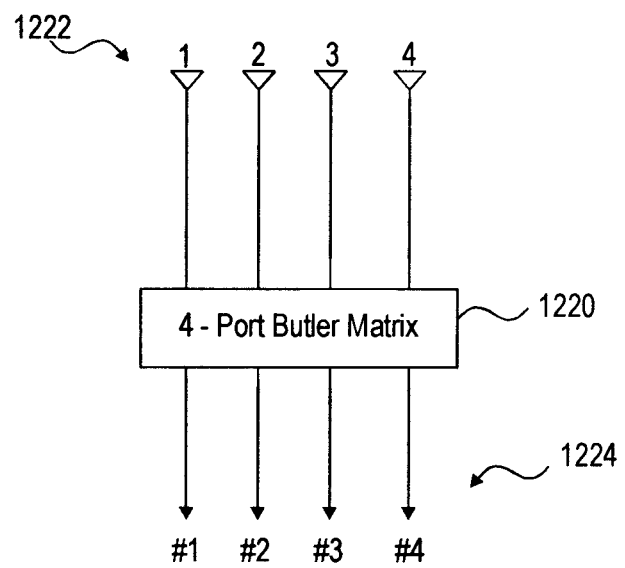
FIG. 64 shows a system, similar to FIG. 62 using four antennas.

FIG. 64 shows four (4) similar antennas 1222 feeding a Butler matrix 1220 in a similar configuration to FIG. 63. Each input antenna has a similar 120 degree HPBW, as shown in FIG. 63. For this case, M=4 in equation (1) above. The Butler matrix is therefore a 4-port device, with 4 input ports and 4 output ports. The output ports 1224 in FIG. 64 are labeled with a numerical designation for the RF output for each beam, corresponding to the numerical designation of the antenna elements 1222 at the input ports.

Figure 65:
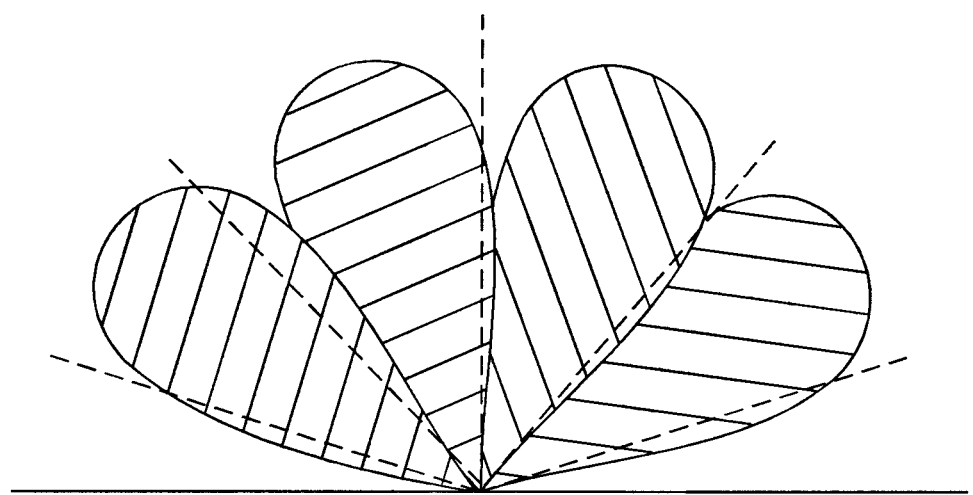
FIG. 65 shows an approximate azimuth beamwidth response for the Butler matrix in FIG. 64.

FIG. 65 shows the azimuth beamwidth response for the Butler matrix in FIG. 64. Each beam has a beamwidth equivalent to roughly 120 degrees divided by four (or M), which is roughly 30 degrees. Additionally, the direction for each of the 4 output beams is uniformly spaced by about 30 degrees. Therefore, the Butler matrix transforms the response of 4 wide angle antennas, all pointing in the same direction (thus all "seeing" exactly the same view), into 4 narrower beams, which collectively give substantially the original view.

The Butler matrix can also operate in "reverse," assuming that the Butler matrix components (and RF switch, discussed below) can handle the RF power. That is, so far, the system has been shown operating in the receive mode, changing spatial responses to beam responses. However, the system also can operate in reverse or transmit mode, changing beam responses to (wider angle) spatial responses. To operate in the transmit mode, the system would need to be capable of handling RF transmit power, and not destroy or "burn up" the RF components.

Figure 66:
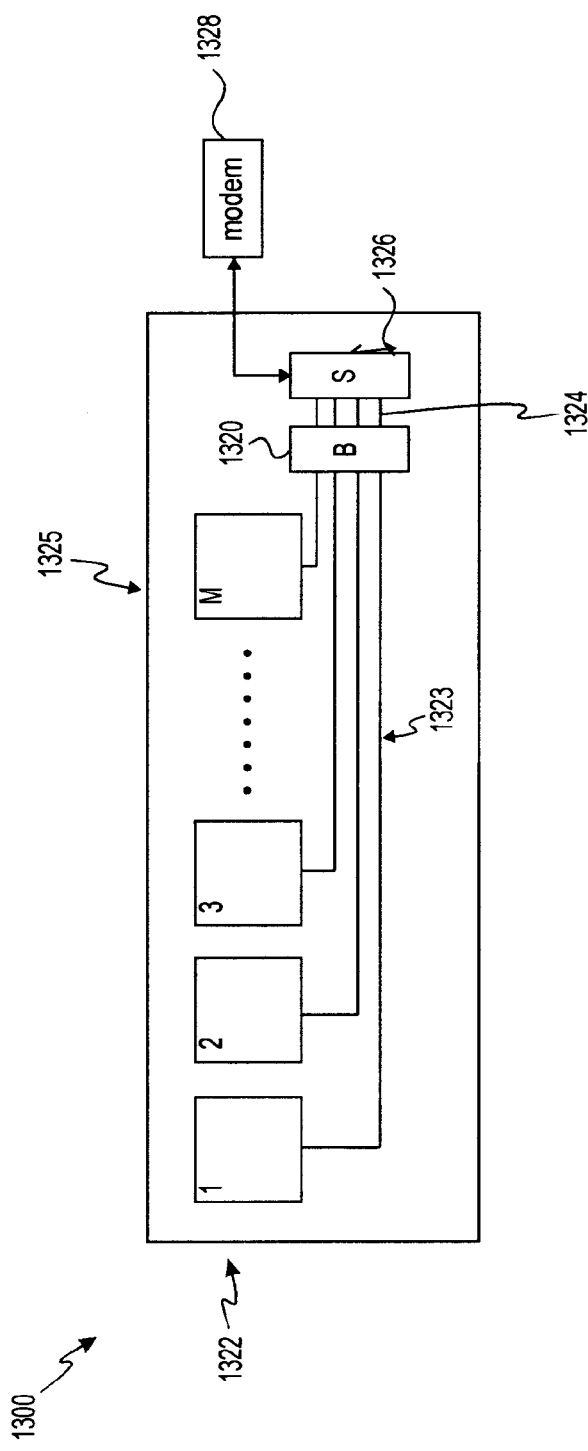
FIG. 66 is a plan view, somewhat diagrammatic in form, of a planar switched beam antenna system.

FIG. 66 shows a simplified view of a PCB (printed circuit board)-mounted system 1300 or "planar switched beam antenna." Here, M antenna elements 1322 (shown here as square patches, or microstrip antennas) mounted on one surface of a PCB 1325 are used for the input response. It is assumed that all M antenna elements 1322 have a similar azimuth response. Each antenna response, tapped via a coaxial probe, aperture coupling, or other antenna feed mechanism 1323, is directed to an M-port Butler matrix 1320, shown as block "B" also mounted on the PCB 1325. The M-RF beam outputs 1324 from the Butler matrix are fed to an M:1 RF switch 1326 (shown as block "S") also mounted on the PCB 1325. The Butler matrix 1320 and RF switch 1326 could be mounted on a separate PCB if desired and in a common housing with the antennas 1322 and PCB 1325. It is assumed that the final output RF signal, from a given antenna element 1322, is the stationary response of the system.

That is, the RF switch 1326 would be externally controlled, and sequentially switch through each of the beams. Some external system would monitor or qualify each output to determine the optimal or desired one, at which point the RF switch would be controlled to select that respective antenna element 1322. An RF transceiver or modem 1328 toggles the RF switch 1326, to each beam, measures the net power output (or other measurement, such as best C/I, or lowest noise, etc.) of each, then selects the beam with the best power (or other measurement, such as best C/I, or lowest noise, etc.).

This system, if used in both the transmit and receive modes, assumes that the patch antenna elements 1322, Butler matrix circuits 1320, and RF switch 1326, all have bandwidth covering the entire transmit and receive signal bandwidths. Thus, the system can operate in both directions; converting wide spatial responses into a single selected beam (for receive), and transmitting a signal back towards the desired direction (transmit mode), assuming sufficient bandwidth and transmit power handling capacity, as noted above.

The array of antennas 1322 could be formed in the vertical plane, to generate elevation beams, as an alternative to the horizontal array of FIG. 66, as discussed below with reference to FIG. 77.

Figure 67:
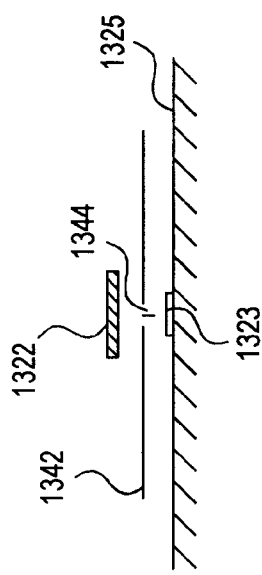
FIG. 67 is a simplified top view of one of the patch antenna elements of the system of FIG. 66.

FIG. 67 shows a simplified top view of the layered structure of one of the patch elements of FIG. 66, showing the patch structure 1322, a ground plane 1342 (above the surface of the PCB 1325) with an aperture coupled iris 1344, and a microstrip transmission line 1323 on the PCB 1325, carrying the signal.

Figure 68:
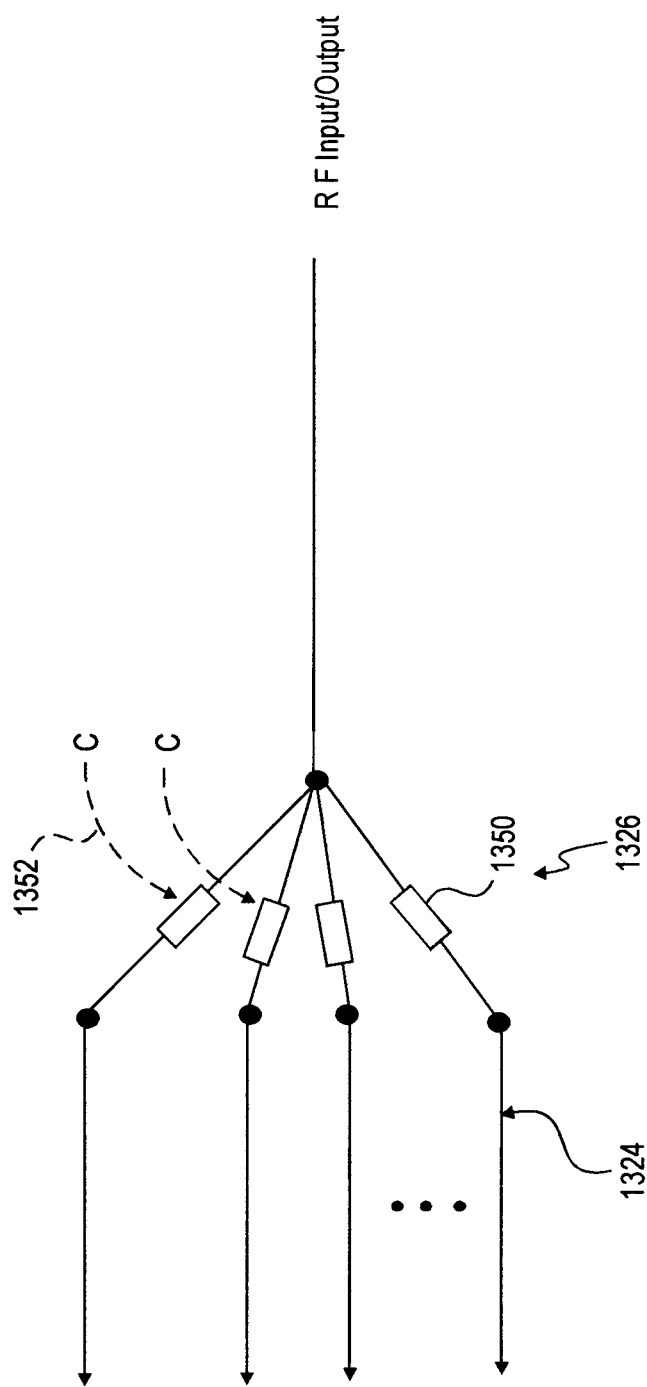
FIG. 68 is a simplified diagram of an RF switch of the system of FIG. 66.

FIG. 68 shows a simplified circuit diagram for the RF switch 1326. M RF transmission lines 1324 are each connected in parallel, via PIN diodes (or other transistor/solid state switching devices, for RF operational frequencies) 1350, to a single point. Each PIN diode 1350 is controlled via a control (C) or bias line 1352; acting as an electronic switching circuit. While only two control lines 1352 are shown, there are M control lines (C) in total, one for each PIN diode 1350. The M control lines 1352 can be operated from a single control line (not shown in FIG. 68) by use of a microcontroller (not shown in FIG. 68) or a TTL (binary) logic device (not shown).

Figure 69:
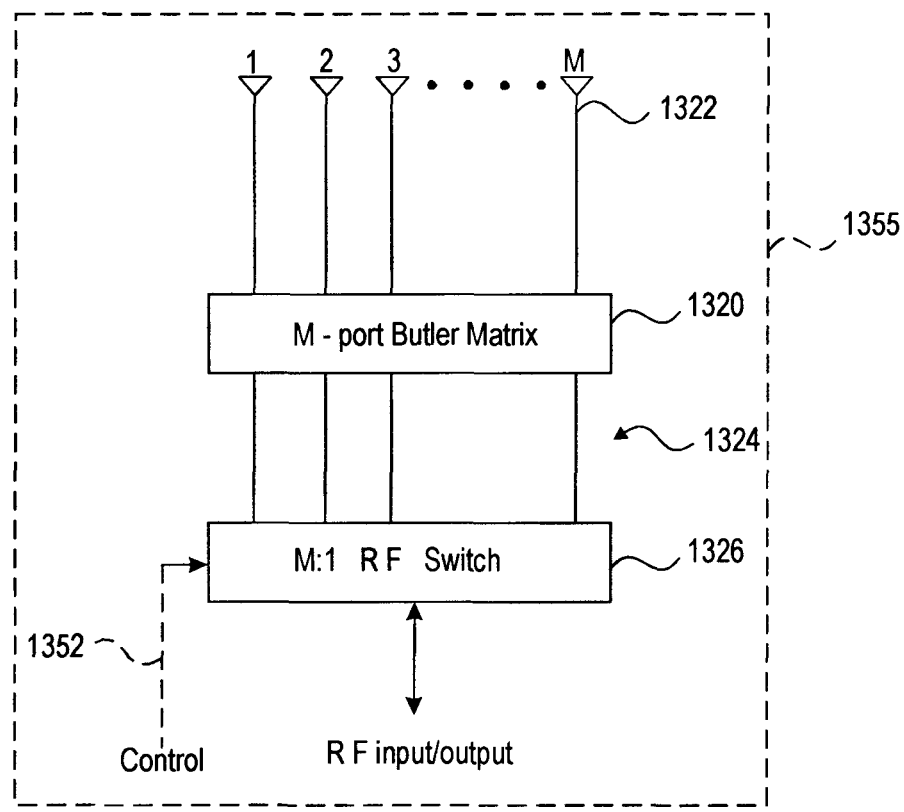
FIG. 69 is a block diagram of the circuit of FIG. 66.

FIG. 69 shows a block diagram of a system having components as described above with reference to FIG. 66. The control input 1352 to the M:1 RF switch 1326 can come from an RF to IF transceiver, or from a modem, determined by the beam selection criteria used. A common housing for the antennas 1322, Butler matrix 1320 and RF switch 1326, which may be mounted to one or more PCBs (see FIG. 66) is indicated by reference numeral 1355.

Figure 70:
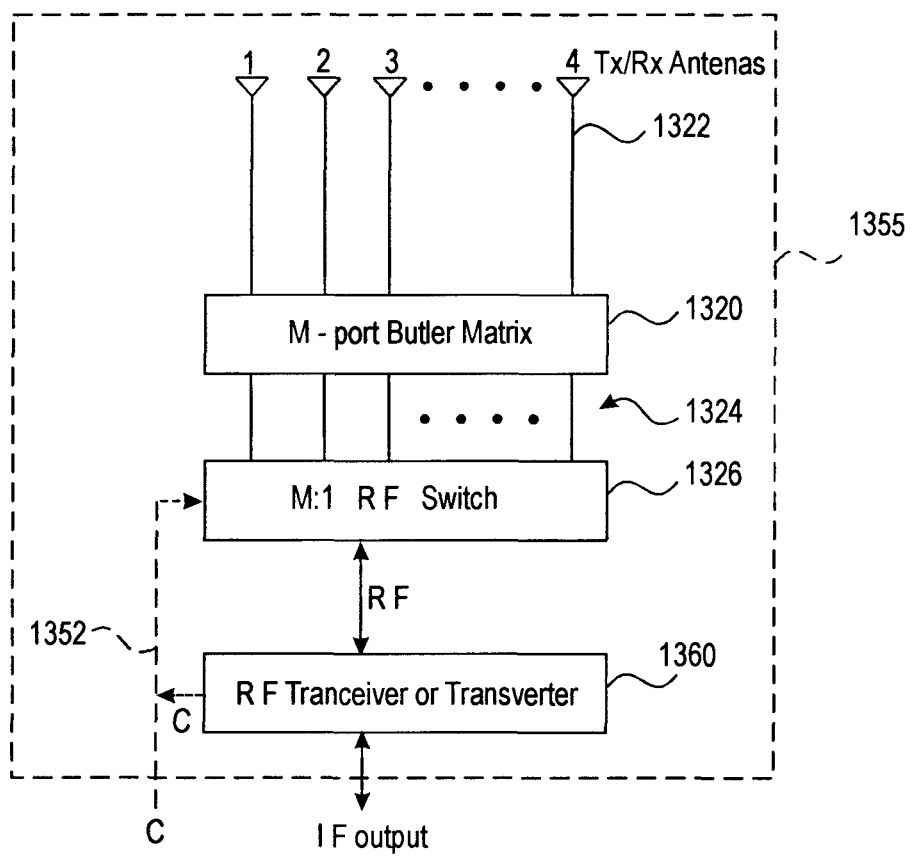
FIG. 70 is a block diagram similar to FIG. 69 with an RF to IF transceiver (transverter) added.

FIG. 70 shows a block diagram similar to FIG. 69, but with an RF to IF transceiver (or transverter, as called in MMDS) 1360 added (e.g., mounted on the same PC board 1325). The RF circuitry block could include the Butler matrix, the RF switch, and various transceiver components, all on the same PC board as the antenna, or on one or more separate boards, if desired, and in the same housing 1355.

Figure 71:
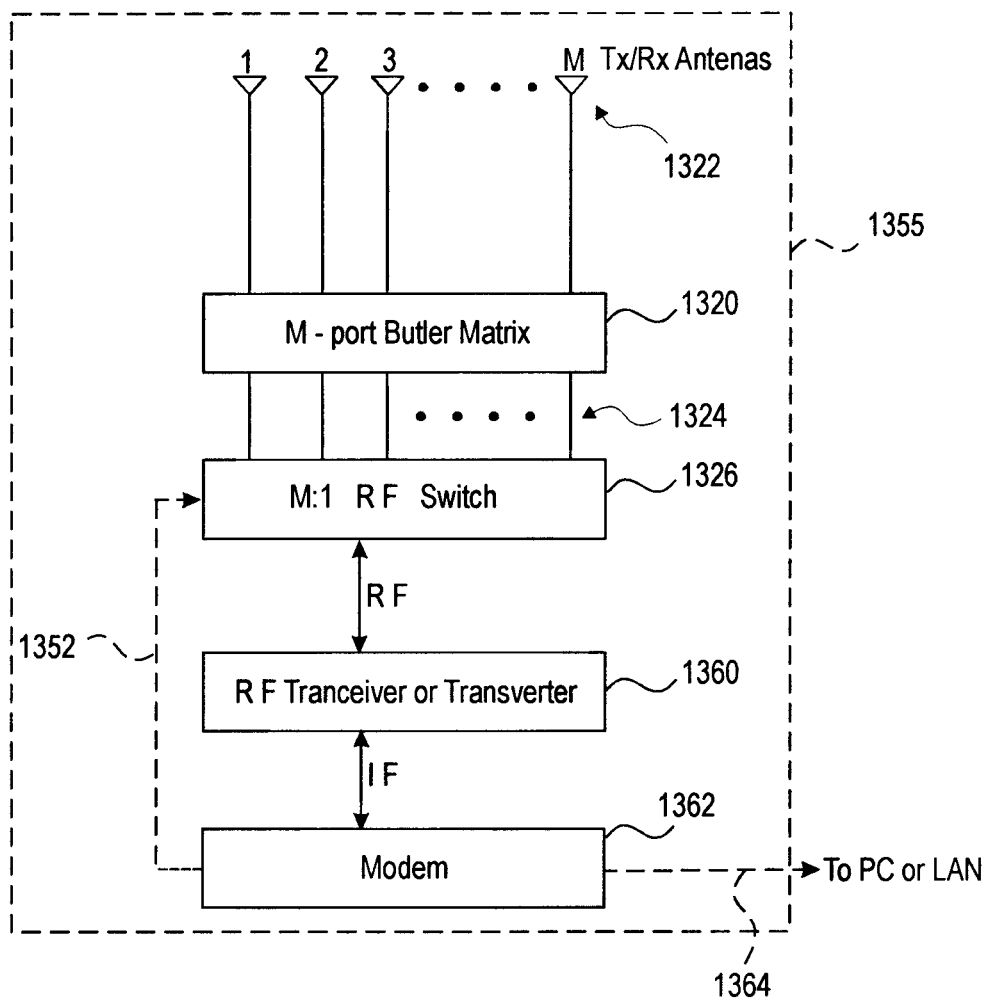
FIG. 71 is a block diagram similar to FIG. 70 with a modem added.

FIG. 71 shows a similar block diagram to FIG. 70, but with the modem 1362 added to the system. The modem 1362 would control the M:1 RF switch 1326, since it would likely have the most flexible capabilities to analyze the various antenna inputs (beams), and determine the optimal beam. All these components may be on one or more PCBs in a common housing 1355. The output from the modem could connect to a PC or LAN (not shown) via USB cable, ethernet, or LAN cable 1364.

Figure 72:
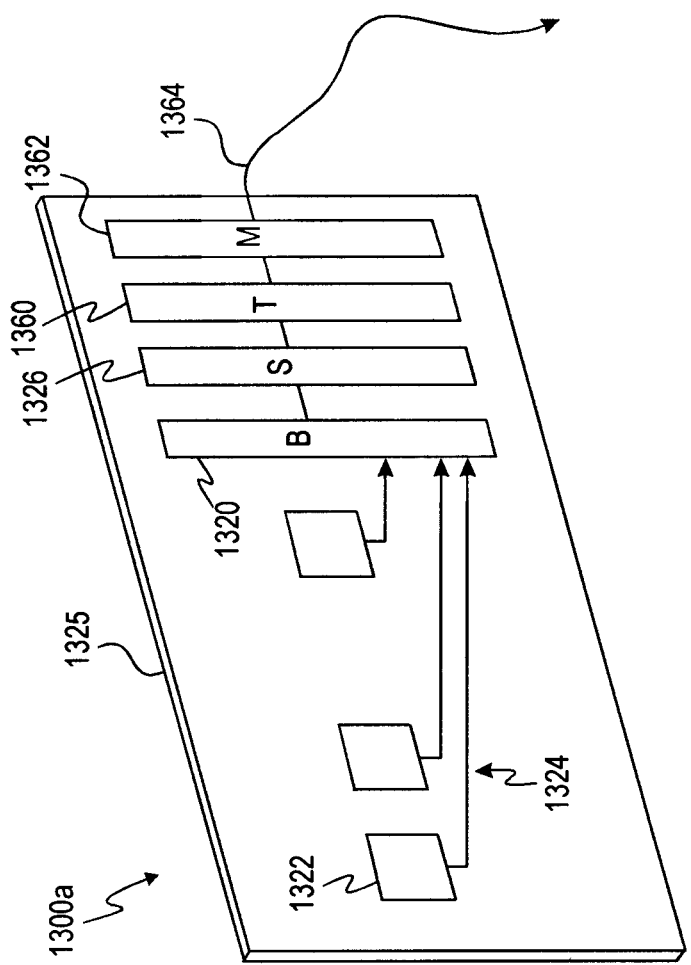
FIG. 72 is a simplified perspective view of a planar system (unit), indicating the elements of FIG. 71.

FIG. 72 shows a simplified perspective view of a physical embodiment of a planar system (unit) 1300a, of FIG. 71, with various elements (Butler matrix "B", RF switch "S", Transceiver "T", and Modem "M") all within the same housing (e.g., a relatively thin rectilinear structure) or on the same PC board 1325.

Figure 73:
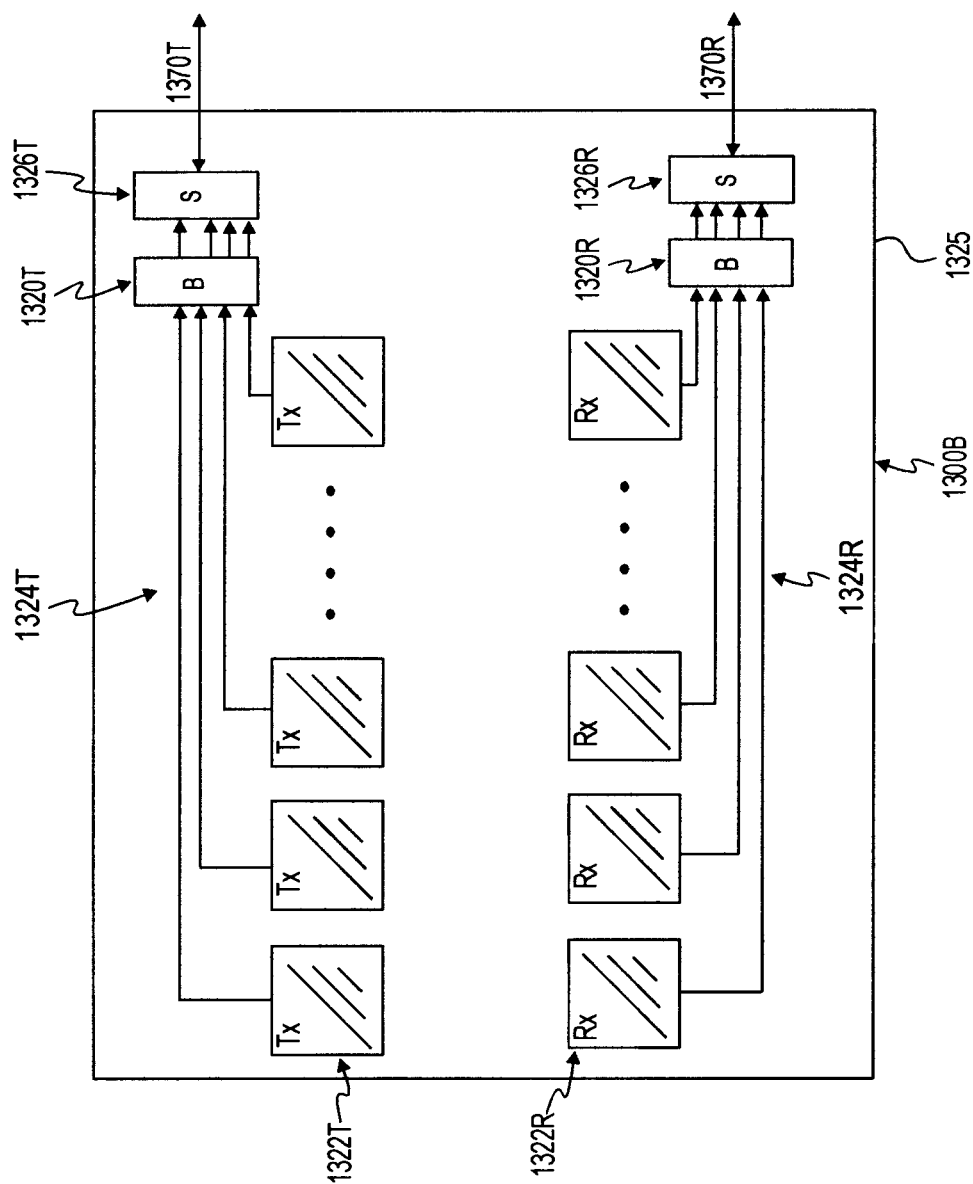
FIG. 73 is a view, similar in form to FIG. 66, showing an embodiment having separate transmit and receive antenna elements.

In the case where it is desirable to separate the transmit and receive systems, or if the transmit and receive bands are too far separated, in frequency, to occupy the same antenna elements (or Butler matrix components, or RF switch components), then they can be broken into two completely separate systems. Such a system 1300b is shown in FIG. 73, where a set of transmit mode patches 1322T connects to its own Butler matrix 1320T and RF switch 1326T, and similarly, for the receive mode, a set of equivalent antenna elements 1322R (in this case, shown as patches) tuned to the receive band, a Butler matrix 1320R and RF switch 1326R. The system input/output is two RF ports 1370T and 1370R. The whole system is contained on a single PC board 1325 and/or within a single housing (i.e., could be on more than one PC board in the housing).

Figure 74:
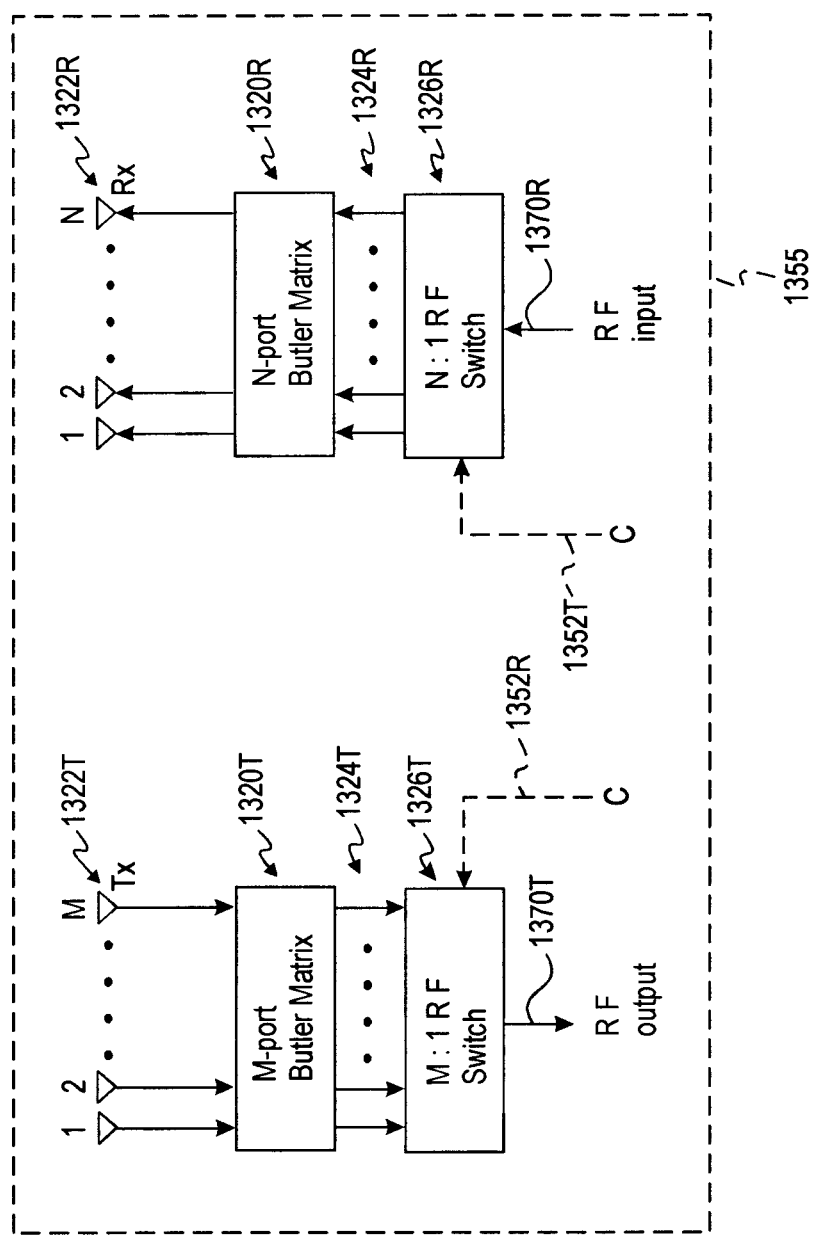
FIG. 74 is a block diagram of the circuit of FIG. 73.

FIG. 74 shows a block diagram for the system in FIG. 73. There are M receive band antenna elements 1322R, and N transmit band antenna elements 1322T. Generally speaking, M can, but does not have to equal N. Additionally, each system has a separate control input 1352R, 1352T for the respective RF switch. Indeed, this allows selection of different beams for the transmit and receive bands. This may be the case if a desired signal is to be received from a given direction, but the transmitted signal might be sent out in another direction.

Figure 75:
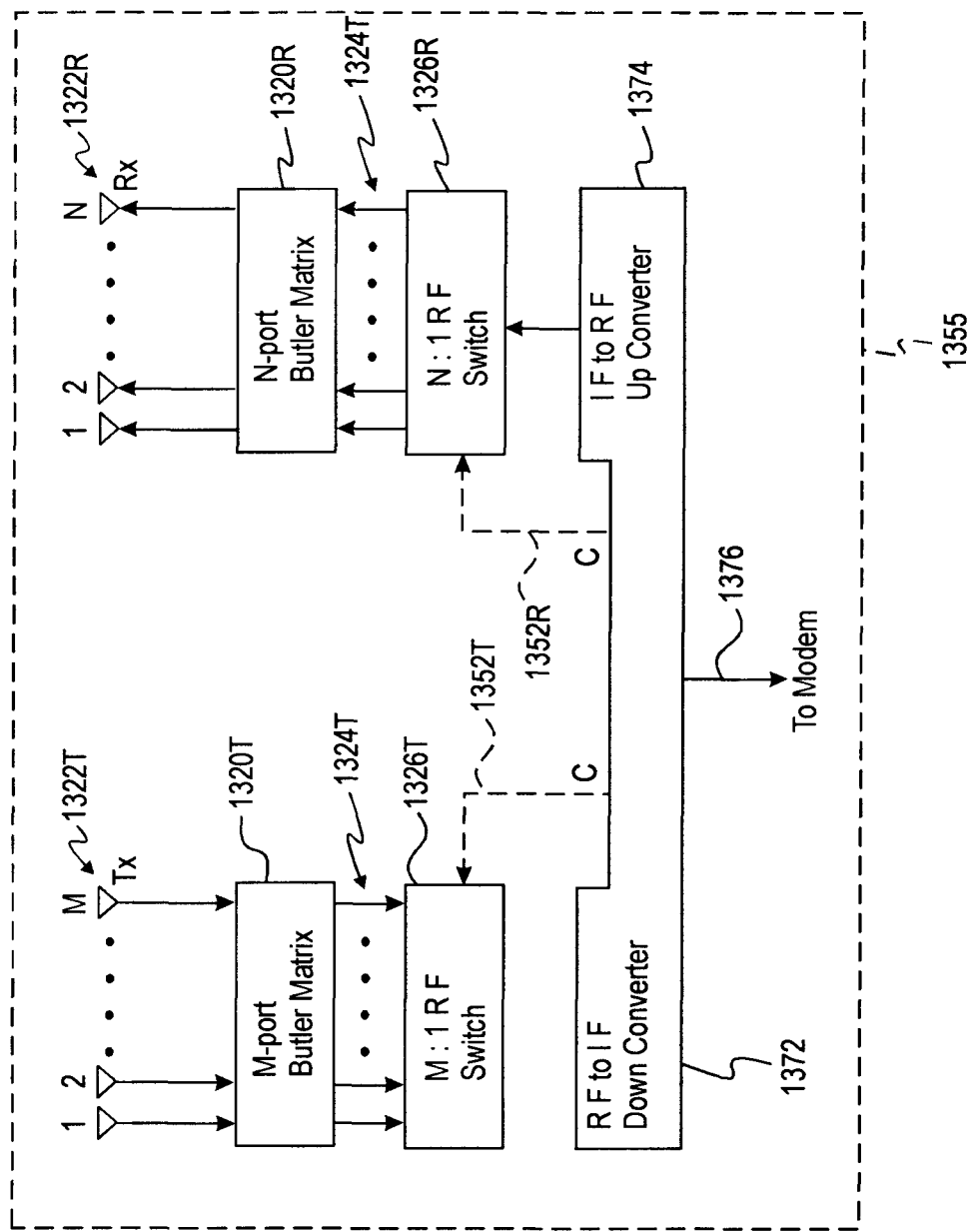
FIG. 75 shows the circuit of FIG. 74, adding an RF to IF downconverter (or receiver) for the receive mode, and IF to RF upconverter (or transmitter/exciter) for the transmit mode.

FIG. 75 shows the system of FIG. 74 with the addition of an RF to IF downconverter (or receiver) 1372 for the receive mode, and an IF to RF upconverter (or transmitter/exciter) 1374 for the transmit mode. The system can connect to an external modem (not shown) via coaxial cable(s) or twisted pair transmission line 1376. The system shown here uses a single cable; which assumes that the transmit and receive band signals are IF diplexed into a signal cable, from the transceivers.

Figure 76:
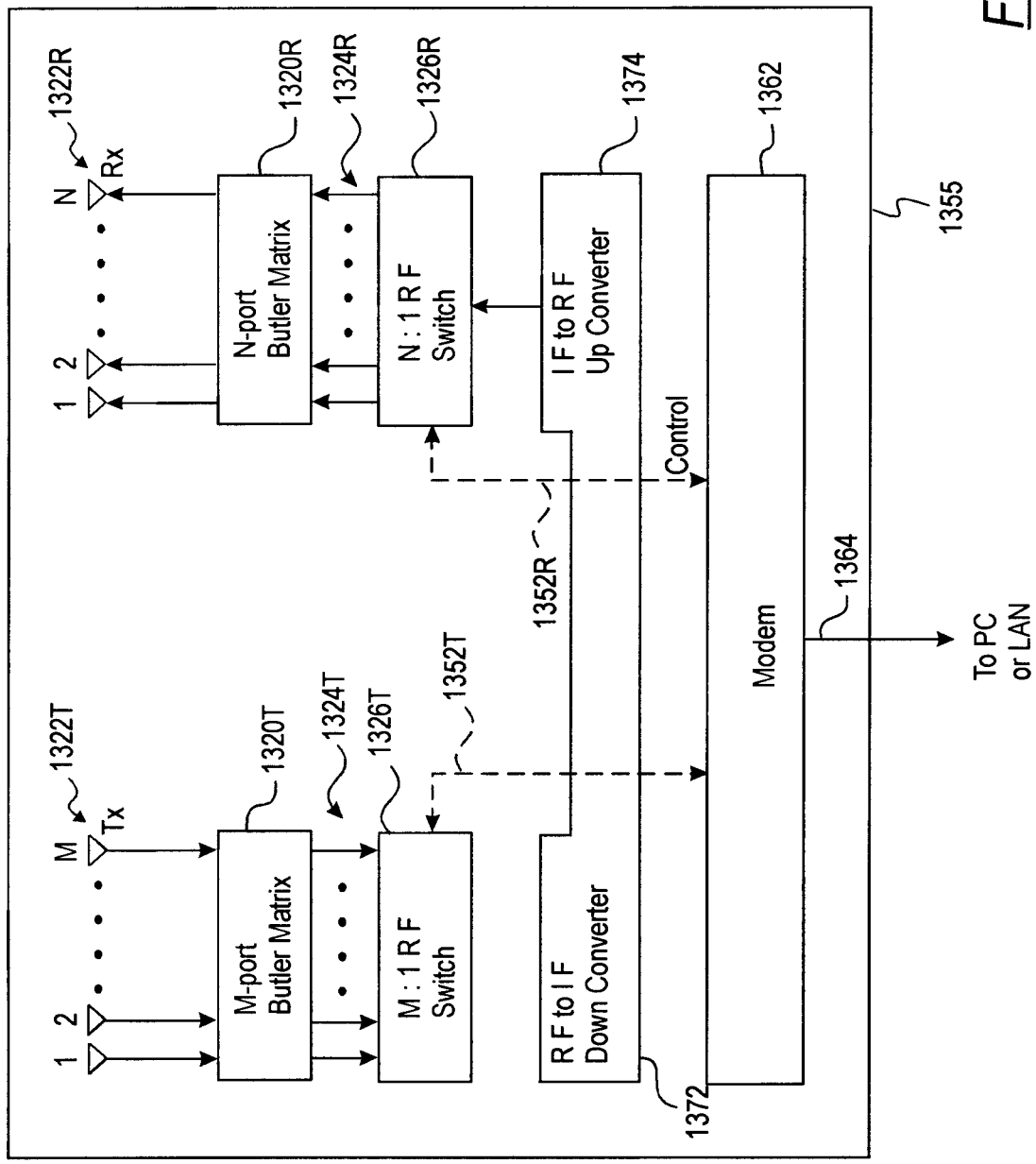
FIG. 76 shows the circuit of FIG. 75, adding a modem.

FIG. 76 shows the system of FIG. 75, and further including an embedded modem 1362. The modem 1362 can be, but does not have to be, included on the same PCB as either or both the antenna system, and/or transceivers. However, it is assumed that the systems shown in each of FIGS. 74-76 are contained within respective housings 1355, i.e., each of these drawings shows a system which is contained in its own housing 1355.

Figure 77:
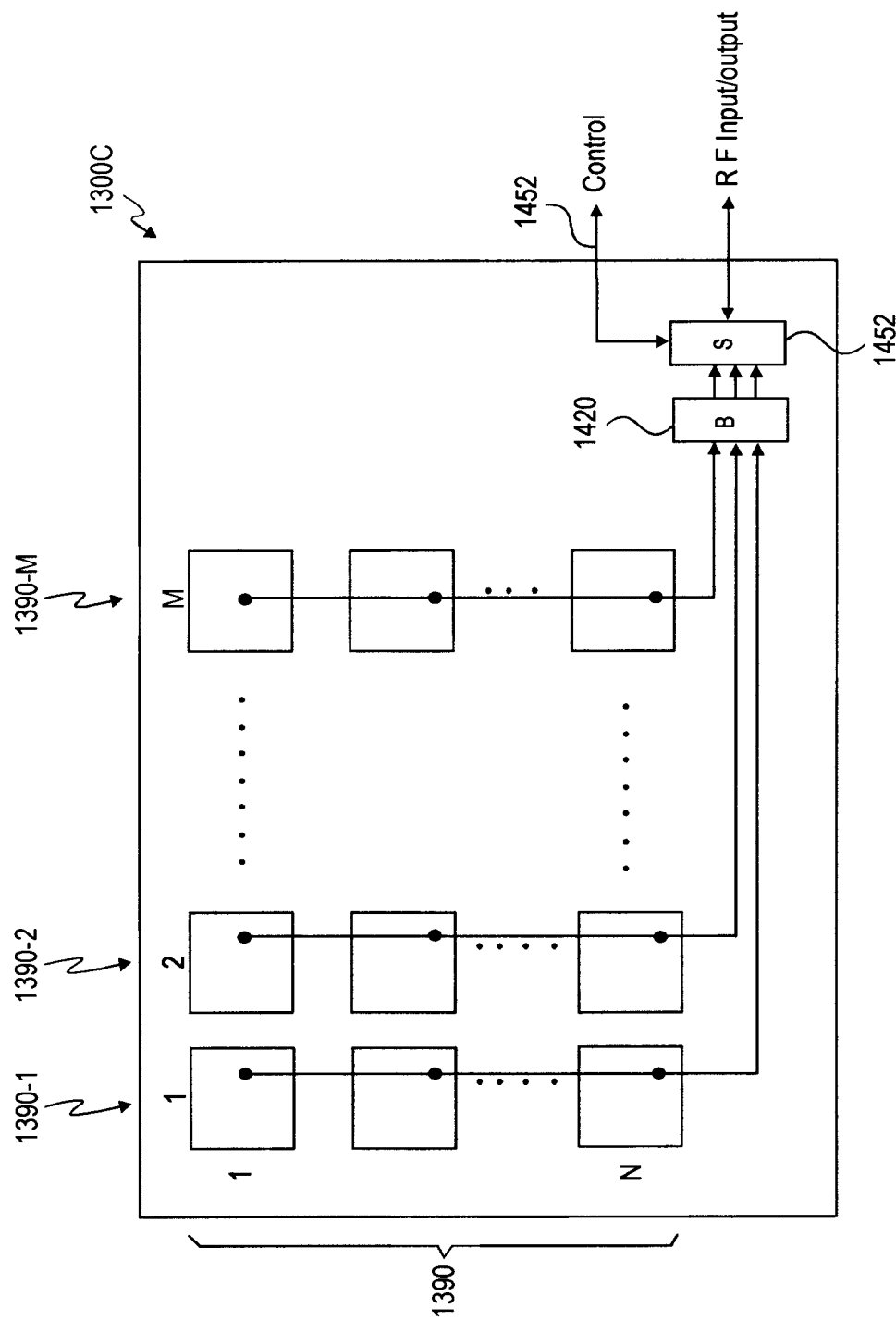
FIG. 77 shows a system similar to FIG. 66, using elevation arrays in place of single array elements.

FIG. 77 shows a system 1300c similar to that of FIG. 66, but using M elevation arrays 1390 of antenna elements 1420 in place of an array of M individual elements. Each column 1390-1, 1390-2, etc. of antenna elements, which form elevation beams, can be summed, using a parallel or corporate feed, and input to the Butler matrix 1420. This can similarly be done for the case of summed azimuth elements, i.e., horizontal arrays (not shown), with switched beams in the elevation plane.

Figure 78:
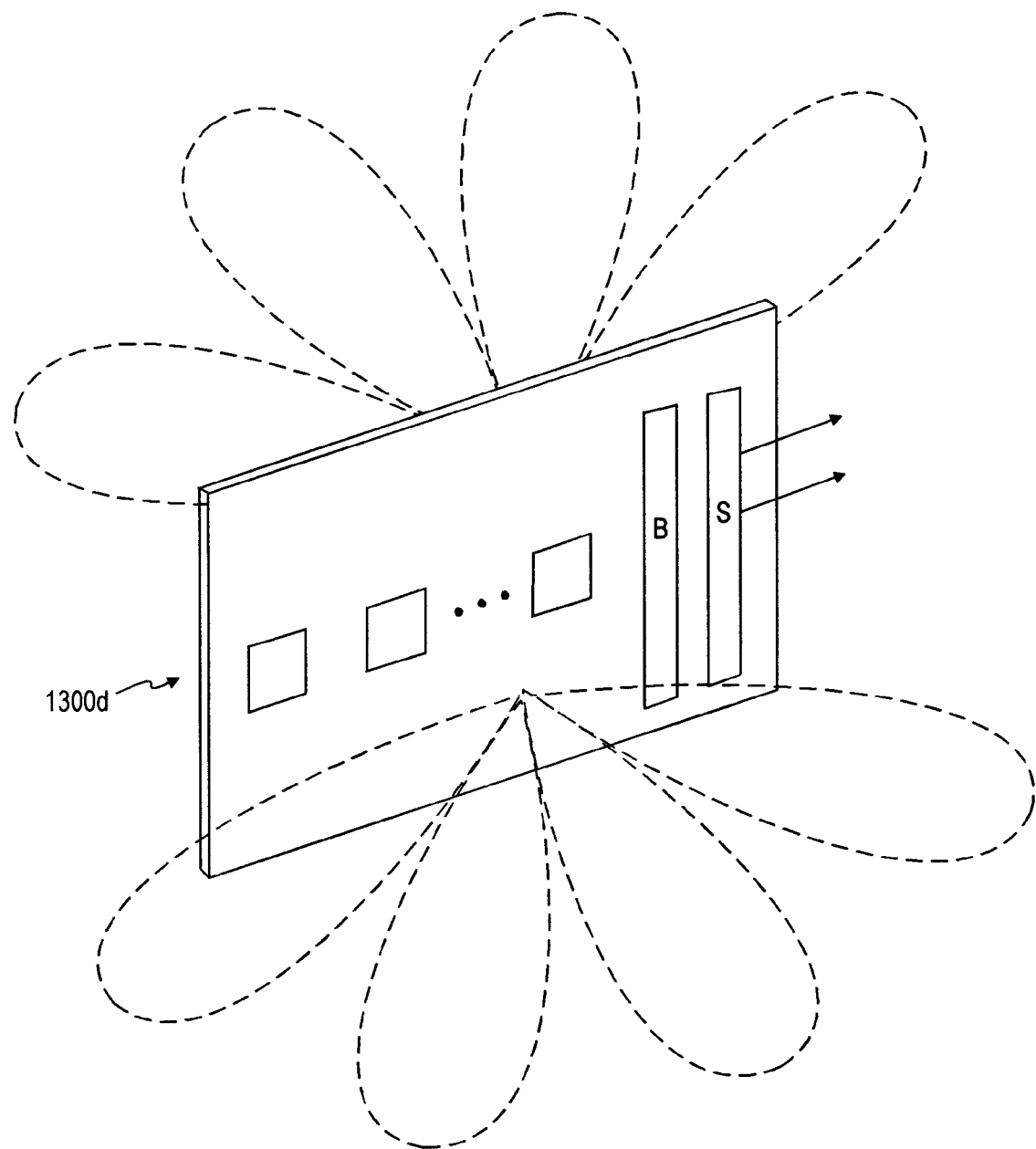
FIG. 78 is a simplified view in a form similar to FIG. 720, showing 360 degree coverage, employing two such systems, back to back, to generate, in effect, an omni-directional system.

The systems described thus far may utilize PC board technology (planar and thin), with patch or microstrip antenna elements. By design, a patch element has a real ground plane, and therefore each patch element only "sees" a 180 degree (half hemisphere) view. Thus, the systems shown so far, are generally "one-sided." An option to obtain full 360 degree coverage is to employ two such systems, back to back, to generate an effective omni-directional system 1300d, as shown in FIG. 78. These can be deployed within the same housing (structure). Each system generates a beam input/output; one for the "front" 0 to 180 degree view, and the other for the "back" 180 to 360 degree (azimuth) view. Thus, the system breaks up the 360 view angle into 2M beams, each with relative beamwidth about 360/2M degrees. Additionally, the two input/output beam ports can be connected to a 2:1 RF switch (with control), not shown, to obtain selection of the final (stationary) beam. However, with this approach, the beams in the endfire direction (towards the edges of the PCB) are highly attenuated (gain), due to the limited view angle for a patch antenna (element).

Figure 79:
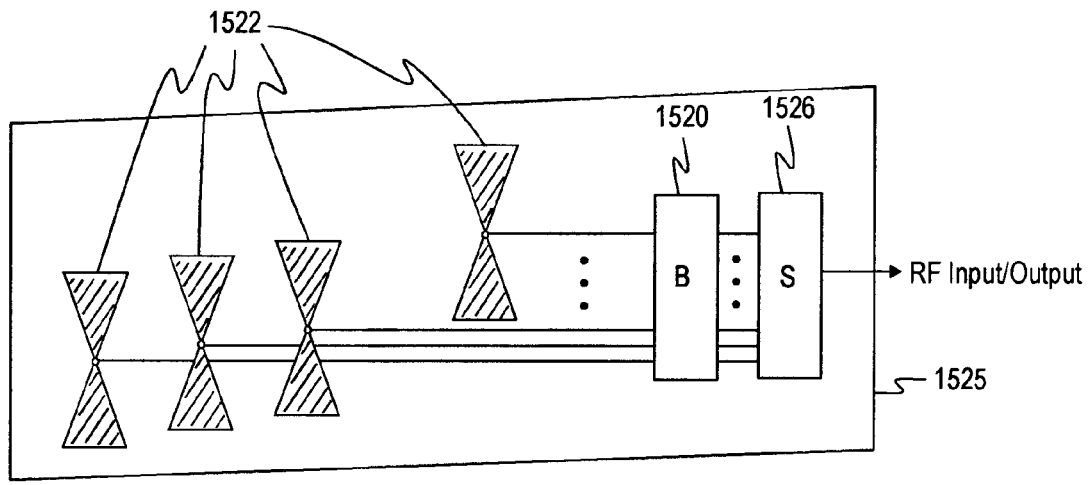
FIG. 79 shows an alternative structure for obtaining 360 degree coverage, using dipole antenna elements on a PCB.
Figure 80:
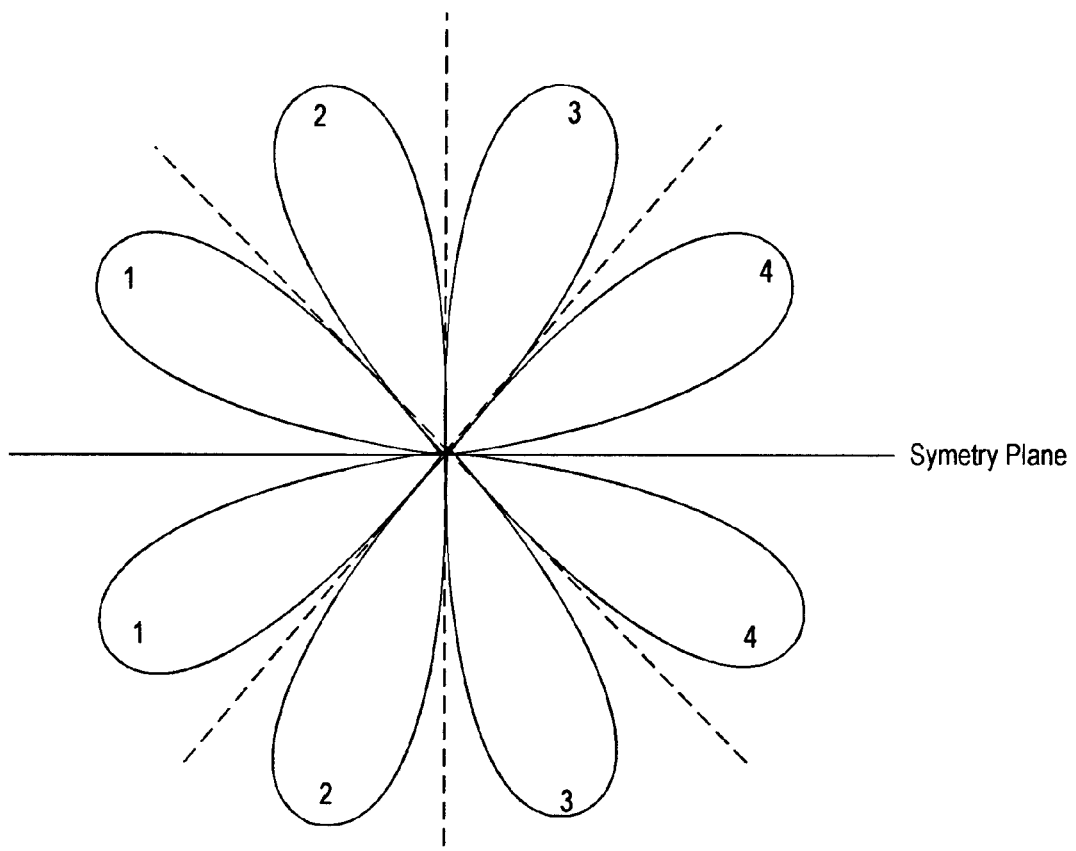
FIG. 80 shows approximate azimuth beams for the system of FIG. 79.

An alternative method to obtain a full 360 degree view angle is to use dipole (etched) antenna elements 1522, on a PCB 1525, as shown in FIG. 79. Each dipole (shown as "bow-tie" dipole elements, which have broadband characteristics) has a very symmetric azimuth pattern for a full 360 degree coverage. This system does not employ a backplane or ground, as do the patches. Similar to the previous designs, this system uses a Butler matrix 1520 and RF switch 1526, to generate a single RF input/output port 1570. However, along the symmetry plane of the printed circuit board (PCB) 1525, the dipoles 1522 have mirror azimuth beams, as shown in FIG. 80. Thus, selection of Beam #1 towards the back, also selects Beam #1 towards the front. In the example shown in FIG. 80, there are only 4 states to choose from, and switch 1526 selects two beams, in summation; one from each side of the symmetry plane.

Figure 81:
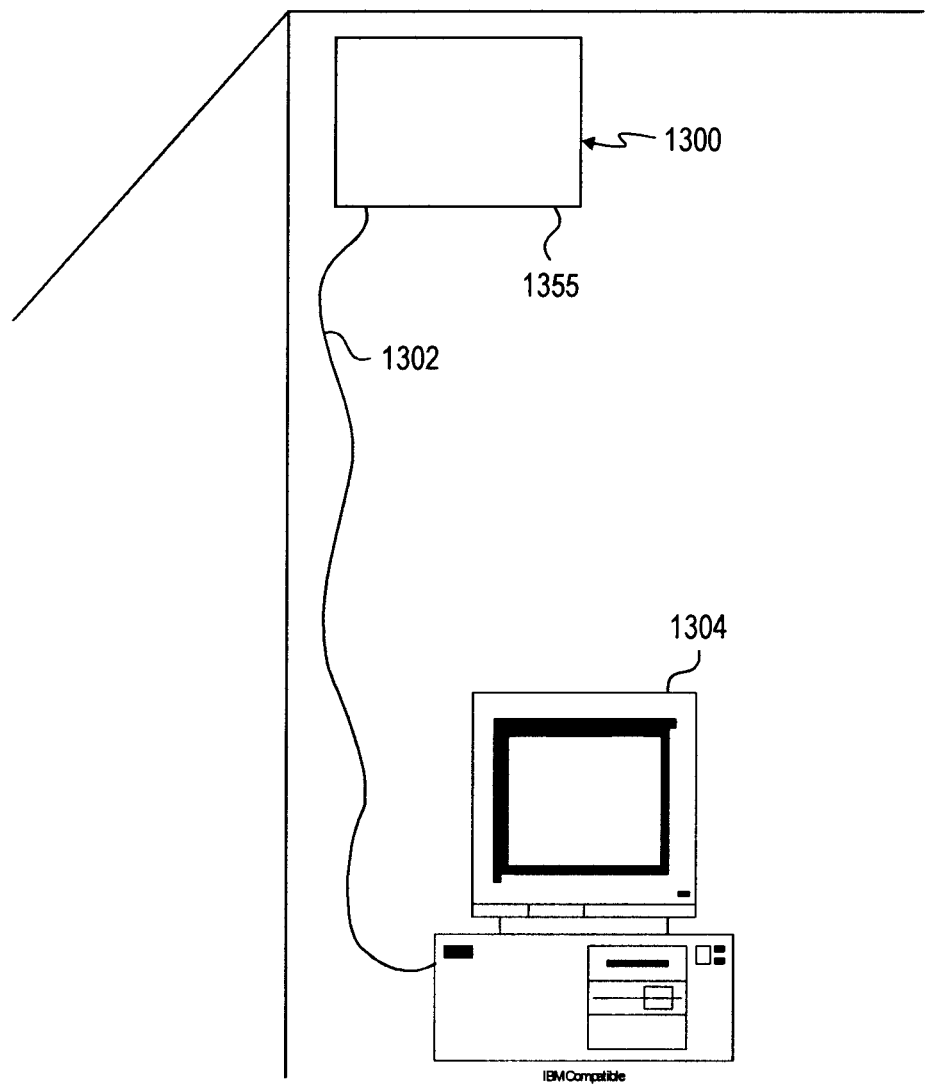
FIG. 81 is a simplified perspective view showing an indoor installation of a system in accordance with the invention.

FIG. 81 shows a typical installation, either in a home or office, with an antenna system 1300 in accordance with any of the embodiments described above located on a wall, with a cable run 1302 down the wall, to a PC or server 1304.

Figure 82:
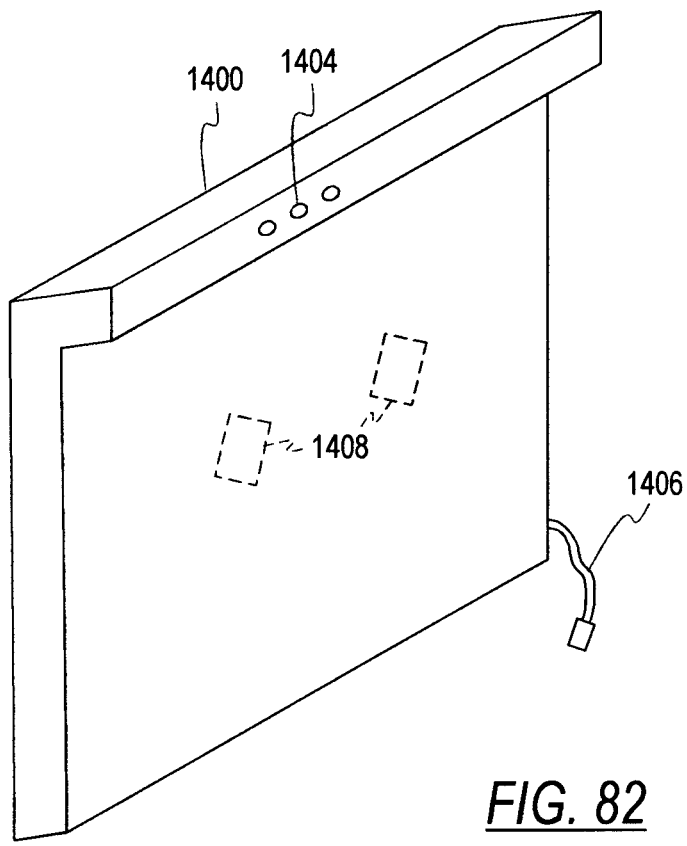
FIG. 82 is a perspective view of a flat panel antenna for a laptop or similar portable computer.
Figure 83:
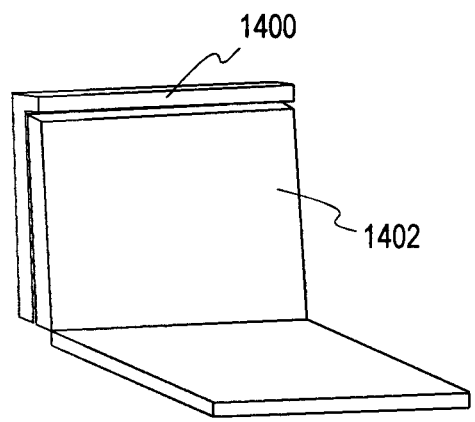
FIG. 83 is a perspective view showing a laptop computer with the flat panel antenna of FIG. 82.

FIGS. 82 and 83 show an antenna unit 1400, alone, and installed to a laptop computer 1402. Wireless internet systems require large bandwidths and data rates (over 50 kbps, up to 2000 kbps), much higher than conventional wireless voice systems (9.8 kbs). To achieve these rates requires much higher system gain levels. These gains can only be obtained by either reducing the distance from the base station (or picocell) to the remote (CPE unit, terminal unit) or by increasing the directive gains of the base station antenna and/or terminal equipment antenna. Antenna gain is a function of the physical size of the antenna. Aesthetics and zoning issues limits increasing the size of the base station antenna (to achieve additional directive gain). Thus, one alternative is to increase the gain of the terminal equipment antenna, which means increasing its physical size. Currently wireless voice systems (on a handset) use 2" stub (monopole) omni-directional antennas, with at best 0 dBi of gain. To satisfy the higher data rates, requires additional gain of at least 10 dB (20 dB desired).

The RF Switched Beam Planar Antenna described above is a good approach for this requirement, and is cost effective. This application would embed the RF electronics within the antenna 1400, and mount the system to the laptop unit. The switched beams would continually search for the best multipath signal, and lock on; transporting this signal to the modem. The envelop of the beams is within an ellipse; with the major axis of the ellipse in the directions perpendicular to the faces of the antenna system. Thus, the side (endfire) angles of the system would have much lower (reduced) gain. A series of LEDS 1404 or other suitable display elements could be used (shown at the top), which could aid the user to help orient the unit, to more optimally orient the antenna faces towards directions of greater signal power.

The flat panel antenna 1400 may further have a USB or other suitable connection 1406 to interface with the laptop computer 1402. The cable or other connector 1406 may also include a power cable to use battery or other power from the laptop computer 1402, or alternatively, on-board battery power may be included within the flat panel antenna unit 1400. If desired, the battery used may be a solar powered type of battery.

In the illustrated embodiment, the flat panel antenna 1400 has a generally L-shaped cross-sectional profile such that the LEDs 1404 or other display elements are readily visible over the top of the laptop computer 1402 when the antenna 1400 is installed thereupon, as indicated in FIG. 83. However, other shapes of the panel 1400 and other configurations and locations of LEDs or other display elements may be utilized without departing from the invention.

The flat panel antenna unit 1400 may be coupled with the case or housing of the laptop computer 1402 by using one or more velcro pads 1408, or "sticky" tape, or the like. Other arrangements of snap-on, snap-off fasteners or other mounting parts or mounting hardware may be utilized without departing from the invention.

The LEDs or other display elements 1404, as well as suitable circuitry for determining signal strength, or some other desirable measure of signal quality may be incorporated in the flat panel antenna 1400, or indeed in any antenna configured in accordance with the invention.

Figure 84:
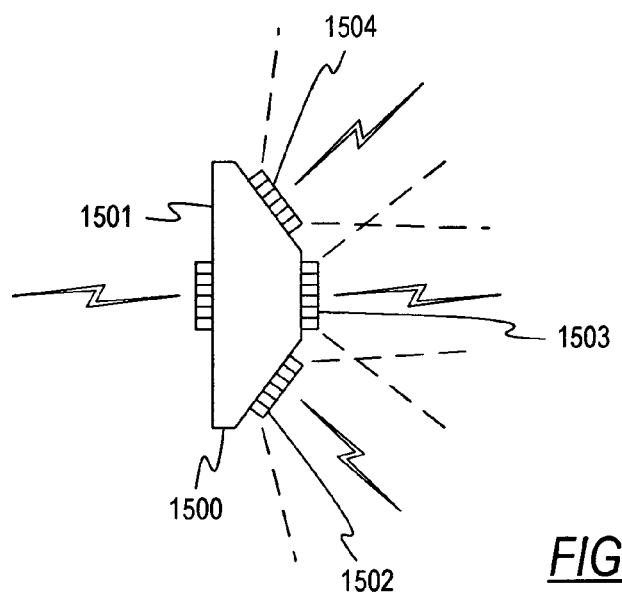
FIG. 84 is a diagrammatic top plan view of a repeater having multiple mobile-facing antennas to provide wider angle coverage.
Figure 85:
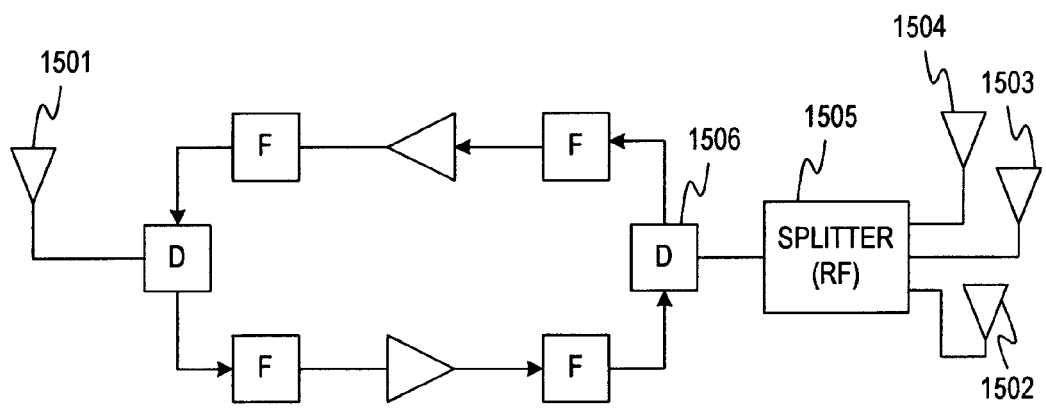
FIG. 85 is a schematic diagram of an electronic system for use in the repeater of FIG. 84.

Certain of the flat antennas described above may have azimuth and/or elevation beamwidths of 90.degree. or less, which can restrict or reduce coverage in the end-fire directions. To achieve wider angle coverage, multiple antennas may be used on one or both sides of the flat-panel repeater. One such embodiment is illustrated in FIG. 84, where a repeater 1500 has a single base-station-facing antenna 1501, and three mobile-facing antennas 1502, 1503 and 1504. The plane of the middle antenna 1503 is parallel to that of the base-station-facing antenna 1501, but the planes of the other two antennas 1502 and 1504 intersect the planes of antennas 1501 and 1503 at angles of about 45.degree. so as to produce beams that overlap the beam of the middle antenna 1503, as illustrated by the broken lines in FIG. 84. The azimuth beamwidth of the middle antenna 1503 is typically only about 80.degree., but the addition of the two angled antennas 1502 and 1504 provides wide angle coverage on the mobile side of the repeater. FIG. 85 illustrates how an RF splitter 1505 can be used to connect all three mobile-facing antennas 1502-1504 to the same diplexer 1506. It will be understood that the same arrangement illustrated in FIGS. 84 and 85 can also be used to provide wide-angle elevation coverage by simply rotating the structure 90.degree. so that FIG. 84 becomes a side elevation rather than a top plan view.

Figures 86, 87:
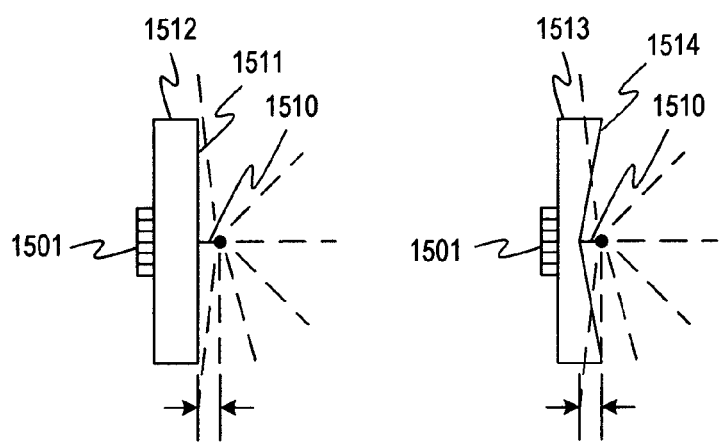
FIG. 86 is a diagrammatic top plan view of a repeater having a modified mobile-facing antenna for providing wide-angle coverage.
FIG. 87 is a diagrammatic top plan view of a repeater having another modified mobile-facing antenna for providing wide-angle coverage.

FIG. 86 illustrates an alternative technique for achieving wide-angle azimuth coverage by using a dipole 1510 as the mobile-facing antenna, with the adjacent surface 1511 of the flat-panel repeater 1512 serving as a flat reflector. The combination of the dipole 1510 and the reflector 1511 produces a wide-angle azimuth beamwidth. FIG. 87 illustrates a modified repeater 1513 which forms a shaped (concave) reflector 1514 on the mobile-facing side to further increase the azimuth beamwidth.

Figure 88:
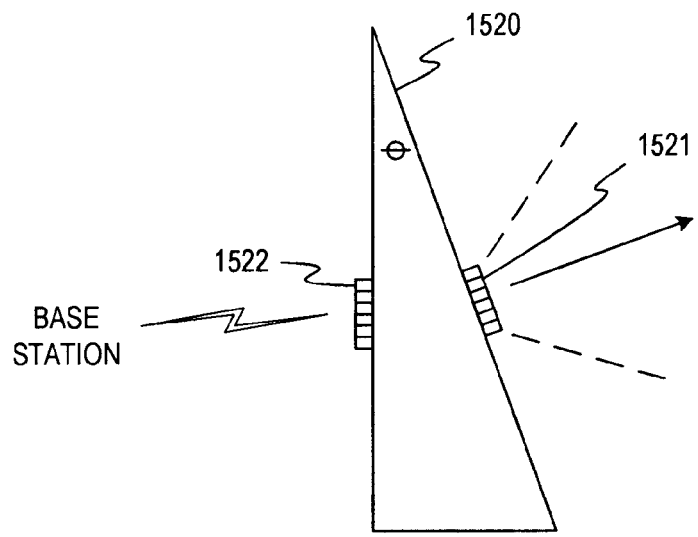
FIG. 88 is a diagrammatic top plan view of a repeater having a mobile-facing base-station-facing antennas in planes that are not parallel to each other.

The antennas on opposite sides of the flat-panel repeater may also be mounted in planes that are not parallel to each other to reach the desired coverage areas. For example, FIG. 88 illustrates a repeater 1520 having a mobile-facing antenna 1521 lying in a plane that intersects the plane of the base-station-facing antenna 1522 at an angle .theta. to service a mobile coverage area located in the direction of the beam axis 1523 of the antenna 1521.

Figure 89:
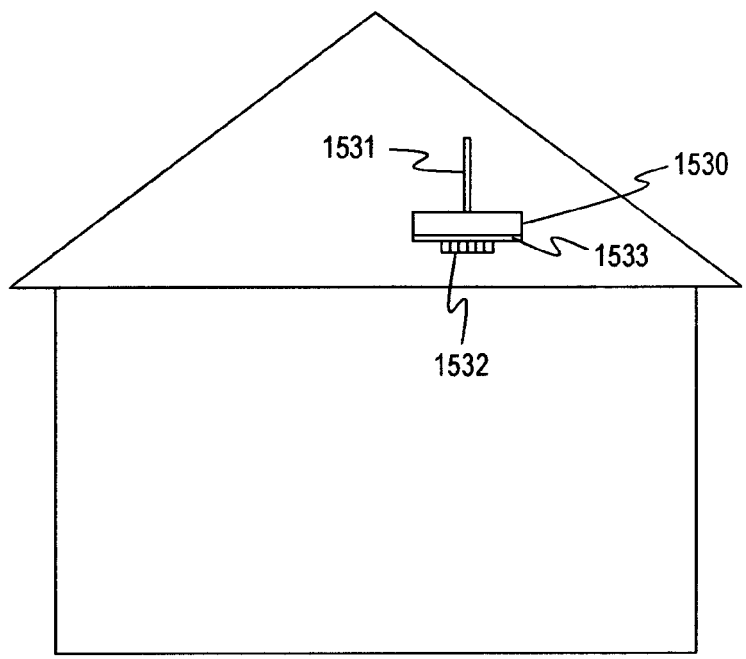
FIG. 89 is a diagrammatic side elevation of a building containing a repeater for re-transmitting signals in a direction orthogonal to the direction in which the signals are received.

The repeater may also be designed to re-transmit signals in a direction orthogonal to the direction in which the signals are received by the repeater. The orthogonal relationship of the two paths may be in azimuth, in elevation, or a combination of the two. For example, FIG. 89 illustrates a repeater 1530 designed to receive horizontally propagating signals and re-transmit them vertically downward. Such a repeater is useful, for example, when the repeater must be located above the intended coverage area, or where the signal-to-noise ration is best at a location higher than the intended coverage area. In the illustrative embodiment of FIG. 89, base station signals propagated along a horizontal path are received by a vertically polarized monopole (or dipole) 1531 extending upwardly from one side (top) of the flat-panel repeater 1530, and then re-transmitted vertically downward by a flat, horizontally polarized antenna 1532 on the opposite side (bottom) of the repeater. A ground plane 1533 for the antenna 1532 is provided on the lower surface of the repeater body which contains the electronics. The polarization difference between the two antennas 1531 and 1532 improves the isolation between the two antennas.

Figure 90:
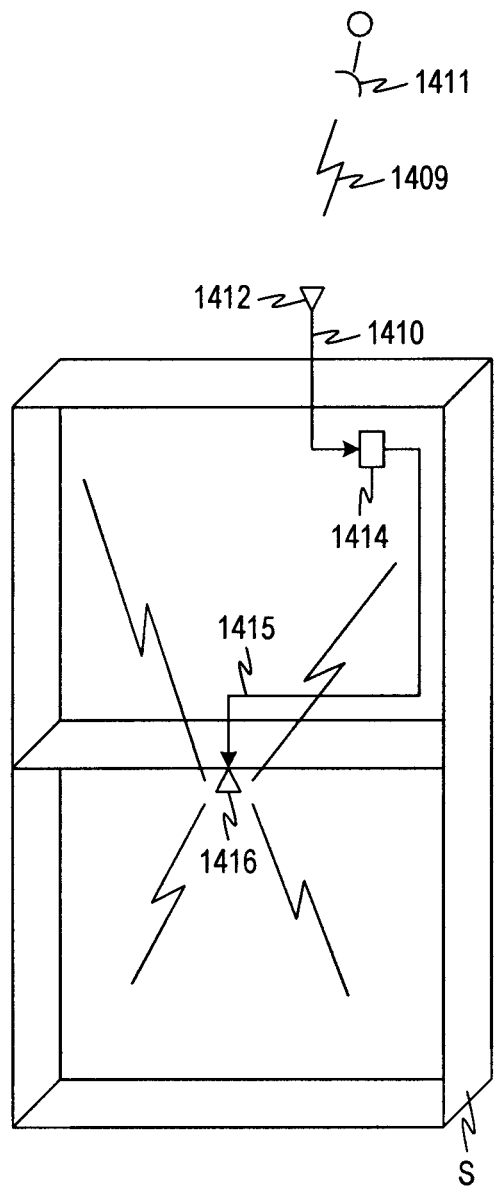
FIG. 90 is a structure that includes a GPS repeater system according to one embodiment of the invention.

Referring next to FIG. 90, there is shown an antenna system for re-transmitting a GPS signal 1409 inside a structure 5. The antenna system includes a link antenna 1412 for receiving the GPS signal 1409 from a GPS transmitting antenna 1411, a GPS repeater 1414 for amplifying the received GPS signal 1410 to produce a second GPS signal 1415 and a broadcast antenna 1416 for re-transmitting the second GPS signal 1415 inside the structure 5. This embodiment works best where the structure 5 has the dimensions of a two-story building.

The GPS repeater 1414 feeds the received GPS signal 1410 into the structure 5. In one embodiment, the external link antenna 1412 captures the GPS signal 1409 and feeds it to the GPS repeater 1414. The GPS repeater 1414 boosts the received GPS signal 1410 and drives an internal broadcast antenna 1416 that radiates the second GPS signal 1415 inside the structure 5.

The present invention overcomes the inability of GPS receivers to work inside a structure, which is a major shortcoming of the Global Positioning System. As the GPS is used in more commercial applications, the ability to overcome this shortcoming becomes very important. Examples of commercial uses of the GPS include: Enhanced 911 service; wireless phone services that provide an Internet connection; wireless services that provide the location of, e.g., hotels, restaurants, and businesses; services that provide assistance to the elderly and handicapped; and locator services (provide by, e.g., rental car companies) that provide location information that can be received inside structures such as parking garages, buildings and tunnels.

Figure 92:
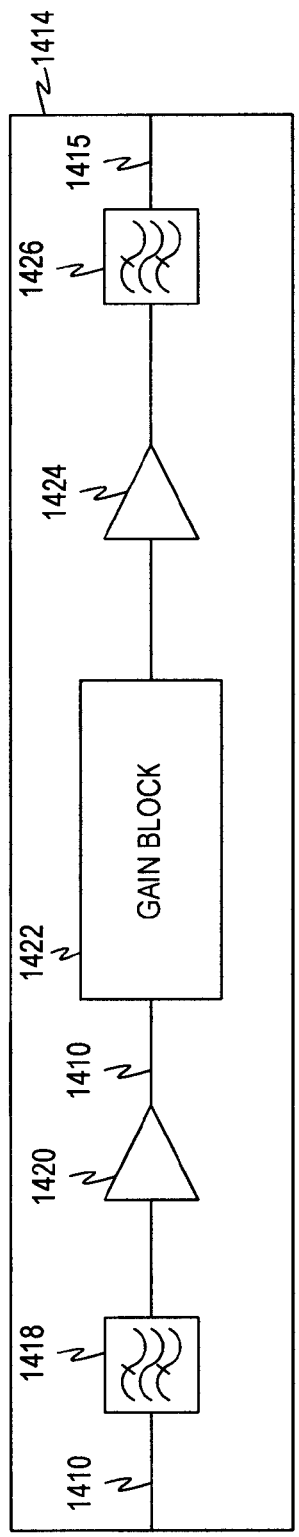
FIG. 92 is a block diagram of a primary GPS repeater used in the GPS repeater systems of FIGS. 90 and 91.
Figure 93:
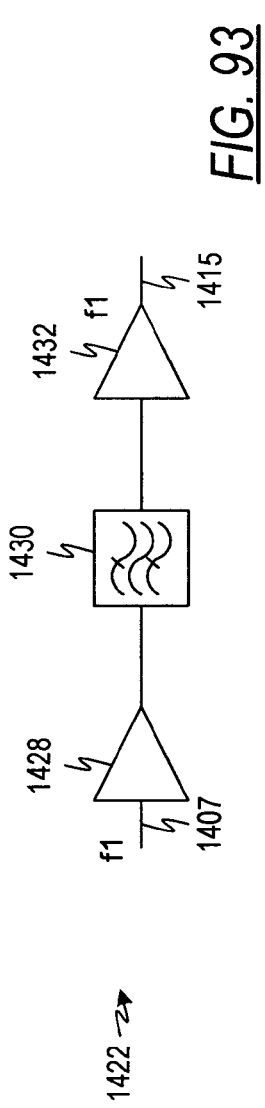
FIG. 93 is a block diagram of one embodiment of a gain block used in the primary GPS repeater of FIG. 92.

In one embodiment, the GPS repeater 1414 includes the components shown in FIG. 92. Those components include a band pass filter 1418, a low noise amplifier 1420, a gain block 1422, a power amp 1424 and second band pass filter 1426. The band pass filters 1418 and 1426 are selected so as to reduce the out-of-band signals. For a GPS repeater system, the pass band will usually be around 1575.42 MHz (+/−500 kHz). In one embodiment, the gain block 1422 includes a radio frequency (RF) amplifier 1428, a band pass filter 1430 and a second RF amplifier 1432, as shown in FIG. 93.

Figure 94:
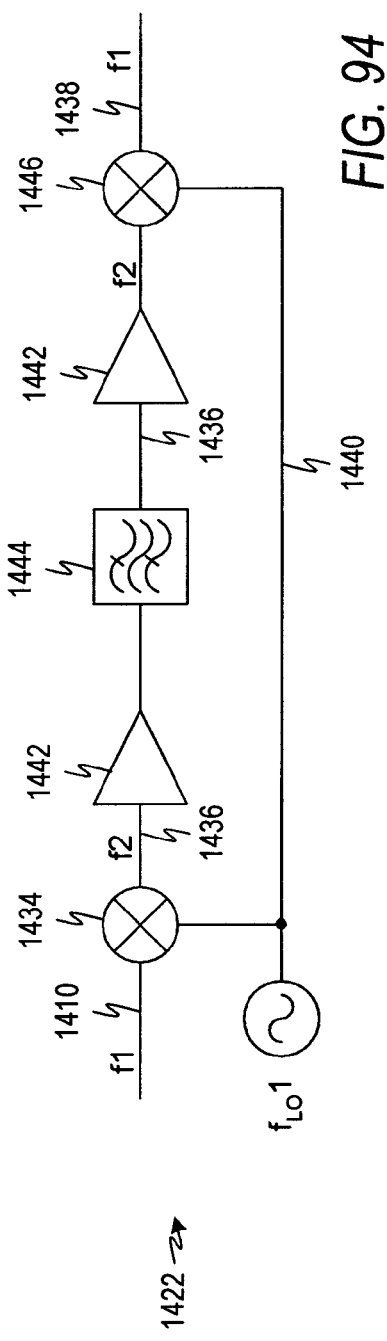
FIG. 94 is a block diagram of another embodiment of the gain block of FIG. 92.

In another embodiment shown in FIG. 94, the gain block 1422 includes a mixer 1434 for down converting the GPS signal 1410 to an intermediate frequency (IF) signal 1436. The GPS signal 1410 is combined by a mixer 1434 with a local oscillator (LO) signal 1440 to produce the IF signal 1436. In one embodiment, the IF is between about 140 MHz to 160 MHz, depending on the application. Thus, where the LO signal 1440 is 1640 MHz and the GPS signal 1410 is 1.5 GHz, then the IF signal would be 140 MHz. The IF signal 1436 is amplified by amplifiers 1442 and filtered by a band pass filter 1444. The band pass filter 1444 significantly reduces the complex components or images of the GPS signal 1410 and the LO signal 1440. A second mixer 1446 converts the IF signal 1436 to produce the RF signal 1438. The IF signal 1436 is combined by the second mixer 1446 with the LO signal 1440 to produce the RF signal 1438. In one embodiment, the IF is between about 140 MHz to 160 MHz, depending on the application. Thus, where the LO signal 1440 is 1640 MHz and the IF signal is 140 MHz, then the RF signal 1438 is 1.5 GHz. Therefore, in this embodiment, the RF signal 1438 is the second GPS signal 1415.

In one embodiment, the RF signal 1438 is an unlicensed frequency signal. The unlicensed frequency signal can be in any frequency range not licensed by the Federal Communications Commission (FCC). Some examples of unlicensed frequency bands include: 902-928 MHz and 2.4 GHz.

Figure 91:
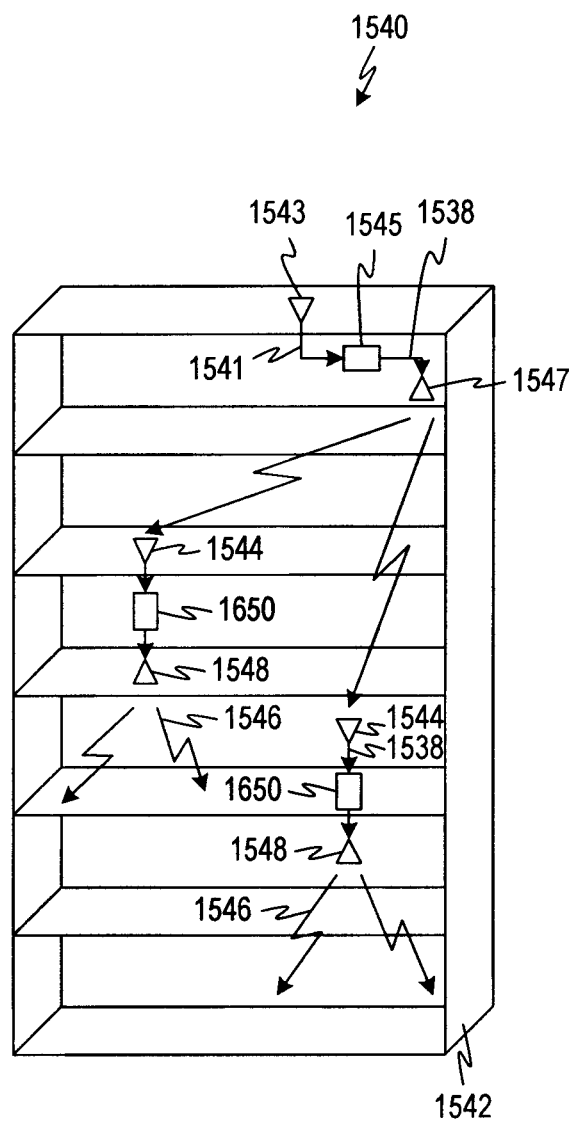
FIG. 91 is another structure that includes a GPS repeater system according to another embodiment of the invention.

Referring to FIG. 91, there is shown an antenna system 1540 for re-transmitting a received GPS signal 1541 inside a structure 1542. The antenna system 1540 includes a link antenna 1543 for receiving the GPS signal 1541, a primary GPS repeater 1545 for amplifying the GPS signal 1541 to produce an RF signal 1538, a first broadcast antenna 1547 to broadcast the RF signal 1538 to one or more secondary repeaters 1650 located to cover the intended coverage area inside the structure 1542. The RF signal 1538 is broadcast to the secondary repeater(s) 1650 at either the original GPS frequency or another available frequency. In one embodiment, the RF signal 1538 is in one of the unlicensed frequency bands such as the Instrumentation, Scientific and Medical (ISM) frequency band of 902 MHz-928 MHz. Each secondary repeater 1650 receives the RE signal 1538 via a link antenna 1544, amplifies the RF signal 1538 to produce a second GPS signal 1546 and re-transmits the second GPS signal 1546 via a second broadcast antenna 1548 inside the structure 1542. The secondary repeater(s) 1650 may be placed inside the structure 1542 or even placed external to the structure 1542 such that the RF signal 1538 can be re-transmitted into the structure through the windows or walls of the structure. This embodiment works best where the structure 1542 has the dimensions of a multi-story building.

Figure 95:
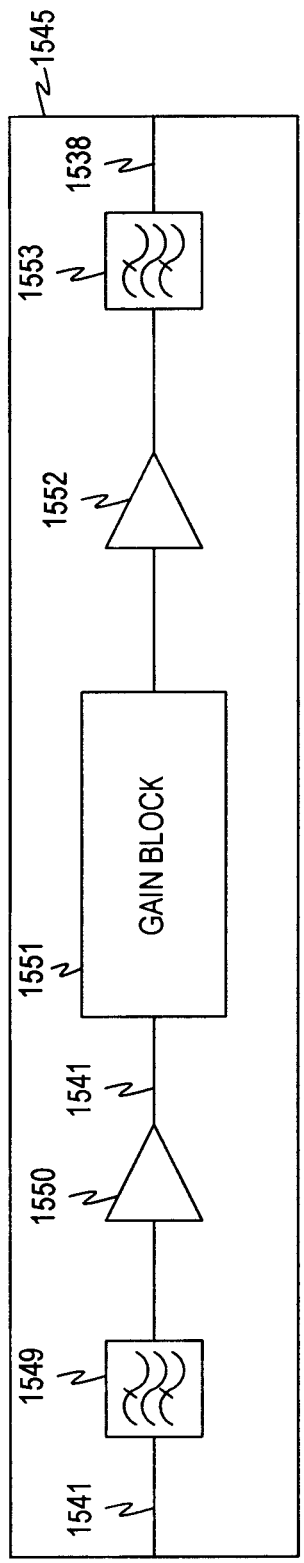
FIG. 95 is a block diagram of another primary GPS repeater used in the GPS repeater systems of FIGS. 90 and 91.
Figure 96:
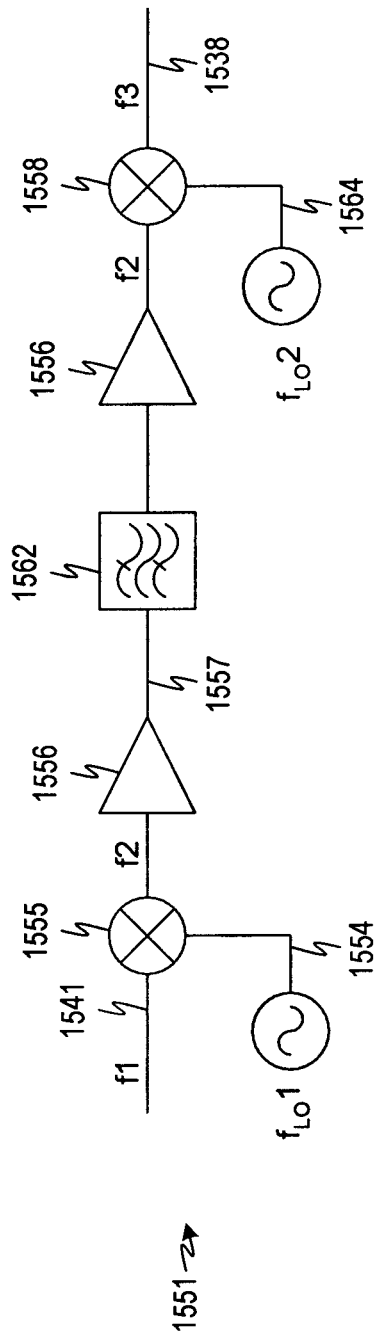
FIG. 96 is a block diagram of one embodiment of a gain block used in the primary GPS repeater of FIG. 95.

In one embodiment, the primary repeater 1545 includes the components shown in FIG. 95. Those components include a band pass filter 1549, a low noise amplifier 1550, a gain block 1551, a power amp 1552 and second band pass filter 1553. In one embodiment, the gain block 1551 includes, as shown in FIG. 96, a mixer 1555 for down converting the GPS signal 1541 to an IF signal 1557. The GPS signal 1541 is combined by a mixer 1555 with a local oscillator (LO) signal 1554 to produce the IF signal 1557. In one embodiment, the IF is between about 140 MHz to 160 MHz, depending on the application. Thus, where the LO signal 1540 is 1640 MHz and the GPS signal 1541 is 1.5 GHz, then the IF signal would be 140 MHz. The IF signal 1557 is amplified by amplifiers 1556 and filtered by a band pass filter 1562. The band pass filter 1562 significantly reduces the complex components or images of the GPS signal 1541 and the LO signal 1554. A second mixer 1558 up converts the IF signal 1554 to produce the RF signal 1538. The IF signal 1554 is combined by the second mixer 1558 with a second LO signal 1564 to produce the RF signal 1538. In one embodiment, the IF is between about 140 MHz to 160 MHz, depending on the application. Thus, where the second LO signal 164 is 762 MHz and the IF signal is 140 MHz, then the RF signal 1538 is 902 MHz.

Figure 97:
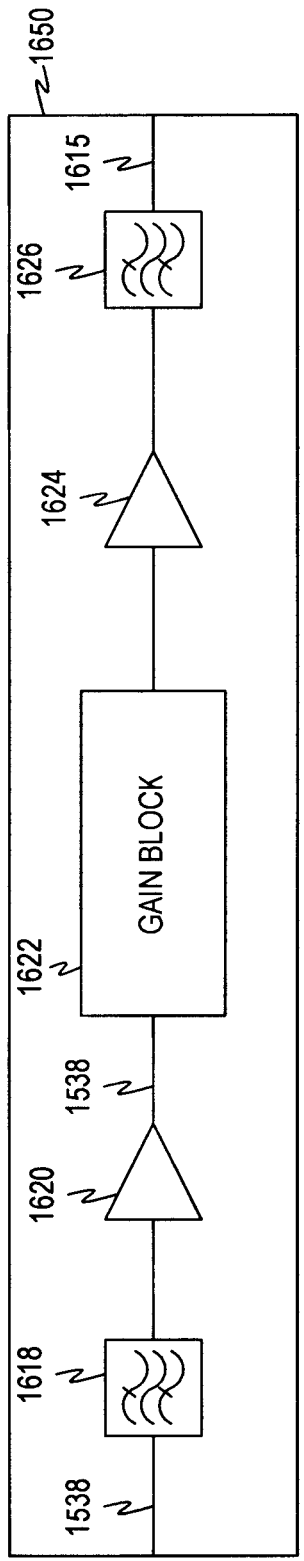
FIG. 97 is a block diagram of a secondary GPS repeater used in the GPS repeater system of FIG. 91.
Figure 98:
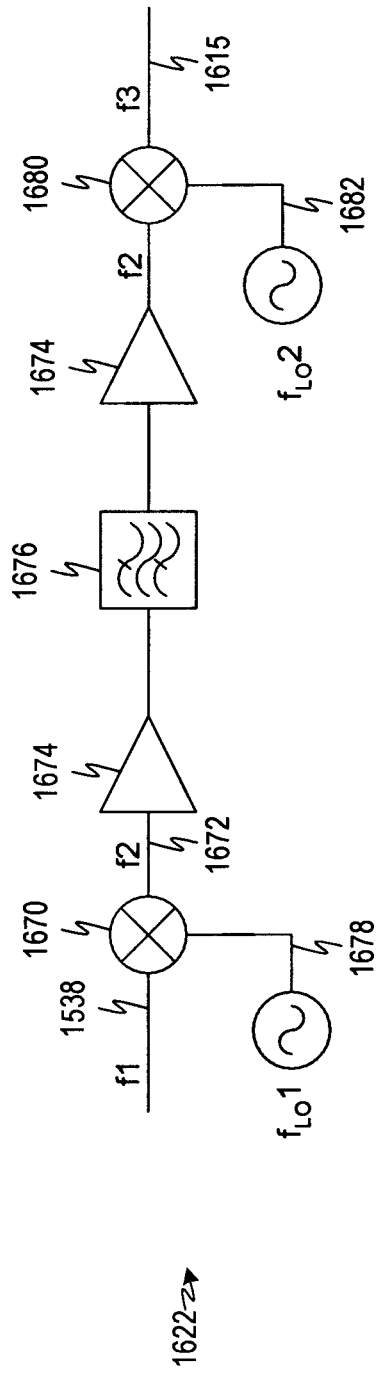
FIG. 98 is a block diagram of one embodiment of a gain block used in the secondary GPS repeater of FIG. 97.

In one embodiment, the secondary repeater 1650 includes the components shown in FIG. 97. Those components include a band pass filter 1618, a low noise amplifier 1620, a gain block 1622, a power amp 1624 and second band pass filter 1626. In one embodiment, the gain block 1622 includes, as shown in FIG. 98, a mixer 1670 for down converting the RF signal 1538 to an IF signal 1672. The RF signal 1538 is combined by a mixer 1670 with a local oscillator (LO) signal 1678 to produce the IF signal 1672. In one embodiment, the IF is between about 140 MHz to 160 MHz, depending on the application. Thus, where the LO signal 1540 is 742 MHz and the RF signal 1538 is 902 MHz, then the IF signal would be 160 MHz. The IF signal 1672 is amplified by amplifiers 1674 and filtered by a band pass filter 1676. The band pass filter 1676 significantly reduces the complex components or images of the RF signal 1538 and the first LO signal 1678. A second mixer 1680 converts the IF signal 1672 to produce the second GPS signal 1615. The IF signal 1672 is combined by the second mixer 1.680 with a second LO signal 1682 to produce the second GPS signal 1615. In one embodiment, the IF is between about 140 MHz to 160 MHz, depending on the application. Thus, where the second LO signal 1682 is 1340 MHz and the IF signal is 160 MHz, then the second GPS signal 1615 is 1.5 GHz.

Thus, the GPS repeater system of the present invention fills the GPS null or "blank" areas within structures. In this way, the GPS can be used to locate individuals inside buildings, tunnels, garages, etc.

In another embodiment, the repeater system of the present invention is used in satellite transmission applications such as digital radio. Like GPS applications, digital radio signals transmitted by satellites can be obstructed from receiving antennas by structures such as buildings, car garages, tunnels, etc. Therefore, the claimed repeater is capable of re-transmitting a satellite signal inside a structure such that an uninterrupted satellite signal can be transmitted to a receiver.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A repeater comprising:
    at least one antenna element for communicating in one direction and at least one antenna element for communicating in another direction;
    circuitry establishing a radio frequency uplink path and a radio frequency downlink path coupled between said antennas; and
    an adaptive cancellation circuit in at least one of said radio frequency uplink path and said radio frequency downlink path, the adaptive cancellation circuit operable to use a radio frequency input signal and a radio frequency output signal from the at least one uplink path or downlink path to generate a cancellation signal for reducing feedback signals present in a radio frequency signal in one of the uplink path or the downlink path;
    the adaptive cancellation circuit including a digital signal processing circuit that samples and digitally processes a radio frequency input signal from the at least one uplink path or downlink path to generate the cancellation signal.

2. The repeater of claim 1 wherein the digital signal processing circuit generates an intermediate signal and further including:
    a modulator circuit which receives said intermediate signal and a sample of a radio frequency output signal from said one of said radio frequency uplink and downlink paths and generates said cancellation signal.

3. The repeater of claim 2 wherein said digital signal processing circuit comprises a radio frequency downconverter which converts said incoming radio frequency signal to a lower frequency signal for digital sampling, an analog-to-digital converter coupled to the radio frequency downconverter, which digitizes said lower frequency signal, and a processor coupled to the analog-to-digital converter which computes a desired intermediate signal for the modulator.

4. The repeater of claim 2 further comprising a summing junction which receives and sums said cancellation signal and said radio frequency input signal.

5. The repeater of claim 4 wherein said digital signal processing circuit receives an output of said summing junction.

6. The repeater of claim 2 wherein said modulator circuit comprises a controllable attenuator which receives and attenuates the radio frequency output signal and an I/Q modulator coupled to said attenuator and to said digital signal processing circuit.

7. The repeater of claim 1 wherein said repeater comprises:
    a housing having a pair of oppositely facing surfaces;
    at least one antenna element mounted with respect to each of said surfaces for radiating energy in a direction opposite to that of the antenna element mounted to the other of said surfaces; and
    the circuitry for establishing the uplink path and downlink path mounted to said housing and operatively coupling signals between at least one antenna element on each of said pair of surfaces of said housing.

8. The repeater of claim 7 wherein a single antenna element is mounted to each of said oppositely facing surfaces of said housing and wherein said circuitry includes a frequency diplexer operatively coupled with each of said antennas and signal transmission circuits coupled between said frequency diplexers.

9. The repeater of claim 7 wherein two antenna elements are mounted to each side of said housing, one for transmitting communications signals and one for receiving communications signals.

10. The repeater of claim 1 further comprising beamforming circuitry coupled with at least one of the antennas for creating a desired antenna pattern for the antenna.

11. The repeater of claim 10 wherein the at least one antenna comprises an antenna array having a plurality of antenna elements.

12. The repeater of claim 10 wherein said antennas each comprise an antenna array having a plurality of antenna elements and the beamforming circuitry is coupled with each antenna.

13. The repeater of claim 10 further including a memory for storing angle and elevation information for use by the beamforming circuitry.

14. The repeater of claim 10 wherein said antennas each comprise an antenna array having a plurality of antenna elements and wherein said beamforming circuitry includes a plurality of phase shifting elements respectively coupled with the antenna elements and each of said antenna arrays, and a controller for controlling operation of said phase shifting elements.

15. The repeater of claim 1 wherein said antennas are mounted on a printed circuit board.

16. The repeater of claim 1 further comprising at least one of a modem and a transceiver.

* * * * *